United States Patent
Nachum et al.

(10) Patent No.: US 11,861,849 B2
(45) Date of Patent: Jan. 2, 2024

(54) SYSTEMS AND METHODS FOR ENHANCED MOTION DETECTION, OBJECT TRACKING, SITUATIONAL AWARENESS AND SUPER RESOLUTION VIDEO USING MICROSCANNED IMAGES

(71) Applicant: ELBIT SYSTEMS ELECTRO-OPTICS ELOP LTD, Rehovot (IL)

(72) Inventors: Avishay Nachum, Rehovot (IL); Peikin Yotam, Rehovot (IL); Binder Shalom, Rehovot (IL); Rozenbaum Denis Andre, Rehovot (IL)

(73) Assignee: ELBIT SYSTEMS ELECTRO-OPTICS ELOP LTD, Rehovot (IL)

( * ) Notice: Subject to any disclaimer, the term of this patent is extended or adjusted under 35 U.S.C. 154(b) by 0 days.

(21) Appl. No.: 17/923,185

(22) PCT Filed: Apr. 28, 2021

(86) PCT No.: PCT/IL2021/050494
§ 371 (c)(1),
(2) Date: Nov. 3, 2022

(87) PCT Pub. No.: WO2021/224908
PCT Pub. Date: Nov. 11, 2021

(65) Prior Publication Data
US 2023/0196585 A1    Jun. 22, 2023

(30) Foreign Application Priority Data

May 3, 2020 (IL) .......................................... 274418

(51) Int. Cl.
*G06K 9/32* (2006.01)
*G06T 7/20* (2017.01)
(Continued)

(52) U.S. Cl.
CPC .................. *G06T 7/20* (2013.01); *G06T 3/40* (2013.01); *G06T 3/4053* (2013.01); *G06T 7/215* (2017.01);
(Continued)

(58) Field of Classification Search
CPC ....... G06T 3/0093; G06T 3/40; G06T 3/4007; G06T 3/4023; G06T 3/4038;
(Continued)

(56) References Cited

U.S. PATENT DOCUMENTS

| | | | |
|---|---|---|---|
| 5,712,685 | A | 1/1998 | Dumas |
| 6,005,682 | A | 12/1999 | Wu et al. |

(Continued)

FOREIGN PATENT DOCUMENTS

| | | |
|---|---|---|
| EP | 1198119 A2 | 4/2002 |
| GB | 2270230 A | 3/1994 |
| WO | 9846007 A1 | 10/1998 |

OTHER PUBLICATIONS

Search Report—Israeli Patent Office—For Application No. 274418.
(Continued)

*Primary Examiner* — Eric Rush
(74) *Attorney, Agent, or Firm* — Brown Rudnick LLP; Matthew P. York

(57) ABSTRACT

Method for displaying super-resolution video of at least one-moving object without image artifacts, including the procedures of acquiring microscanned images of at least one moving object, a first and second subset of the images respectively forming a first and second data set, for each data set, analyzing at least a portion of the sub-set of the images for spatial and temporal information, determining a respective movement indication of the moving object according to the spatial and temporal information, in parallel to the procedure of analyzing, forming a respective super-resolu- (Continued)

tion image from each data set and designating a respective bounded area surrounding the moving object, and repeatedly displaying each super-resolution image outside the bounded area a plurality of times at a video frame rate and displaying during those times within the respective bounded area, a plurality of consecutive microscanned images of the moving object at the video frame rate.

21 Claims, 17 Drawing Sheets

(51) Int. Cl.
| | |
|---|---|
| *G06T 7/70* | (2017.01) |
| *G06V 10/25* | (2022.01) |
| *H04N 23/695* | (2023.01) |
| *G06T 3/40* | (2006.01) |
| *H04N 7/01* | (2006.01) |
| *G06T 7/215* | (2017.01) |
| *G06V 10/26* | (2022.01) |

(52) U.S. Cl.
CPC ............... *G06T 7/70* (2017.01); *G06V 10/25* (2022.01); *G06V 10/26* (2022.01); *H04N 7/013* (2013.01); *H04N 7/014* (2013.01); *H04N 7/0137* (2013.01); *H04N 23/695* (2023.01)

(58) Field of Classification Search
CPC ......... G06T 3/4053; G06T 5/00; G06T 5/001; G06T 5/002; G06T 5/50; G06T 7/10; G06T 7/11; G06T 7/20; G06T 7/215; G06T 7/30; G06T 7/70; G06T 7/97; G06T 2207/10004; G06T 2207/10016; G06T 2207/20172; G06T 2207/20182; G06T 2207/20201; G06T 2207/20212; G06T 2207/20221; G06V 10/10; G06V 10/12; G06V 10/16; G06V 10/20; G06V 10/22; G06V 10/25; G06V 10/26; G06V 10/30; G06V 10/62; H04N 3/02; H04N 3/04; H04N 3/06; H04N 7/01; H04N 7/0102; H04N 7/0117; H04N 7/0125; H04N 7/0127; H04N 7/013; H04N 7/0135; H04N 7/0137; H04N 7/014; H04N 7/015; H04N 7/0152; H04N 7/0157; H04N 23/58; H04N 23/61; H04N 23/68; H04N 23/681; H04N 23/6811; H04N 23/682; H04N 23/68369; H04N 23/695; H04N 23/698; H04N 23/80; H04N 23/81; H04N 23/815; H04N 23/683; H04N 23/69

USPC ....... 382/100, 103, 107, 173, 181, 195, 205, 382/206, 234, 236–239, 254, 275, 276, 382/282–284, 291, 293–296, 298–300, 382/302–304, 312, 325; 348/135, 142, 348/144–147, 154, 155, 169–172, 208.1, 348/208.4, 208.5, 208.6, 208.7, 208.11, 348/208.13, 208.14, 222.1, 241, 369, 348/384.1, 387.1, 390.1, 397.1, 399.1, 348/416.1, 425.1, 425.2, 497, 575, 576, 348/580, 581, 583, 607, 699; 386/263, 386/264; 375/240, 240.01, 240.02, 375/240.08, 240.18, 240.21, 240.26, 375/240.27; 345/619, 621, 622, 625–630, 345/634, 638, 648, 649, 660, 666–669, 345/671

See application file for complete search history.

(56) References Cited

U.S. PATENT DOCUMENTS

| | | | | |
|---|---|---|---|---|
| 8,279,341 | B1* | 10/2012 | Bozinovic | ............. G06T 3/4053 |
| | | | | 382/299 |
| 9,848,167 | B1* | 12/2017 | Christian | ............. H04N 7/0117 |
| 9,894,292 | B2* | 2/2018 | Binder | .................... G01J 5/061 |
| 9,898,803 | B2* | 2/2018 | Kajimura | ............. G06T 3/4053 |
| 2010/0123792 | A1* | 5/2010 | Nagumo | ................. H04N 23/80 |
| | | | | 348/E5.022 |
| 2013/0050526 | A1 | 2/2013 | Keelan | |
| 2016/0203610 | A1 | 7/2016 | Lee et al. | |
| 2017/0359596 | A1* | 12/2017 | Kim | .................... H04N 19/132 |
| 2018/0160056 | A1 | 6/2018 | Binder et al. | |

OTHER PUBLICATIONS

Notice before Allowance (NBA) received from the Israeli Patent Office in Israeli Patent Application No. 274418, dated Sep. 13, 2020.

* cited by examiner

SYSTEMS AND METHODS FOR ENHANCED MOTION DETECTION, OBJECT TRACKING, SITUATIONAL AWARENESS AND SUPER RESOLUTION VIDEO USING MICROSCANNED IMAGES

CROSS-REFERENCE TO RELATED APPLICATIONS

The present application is a national stage entry of PCT/IL2021/050494 with an international filing date of Apr. 28, 2021, which claims the benefit of and priority to Israeli Patent Application No. 274418, filed May 3, 2020, the content of each of which is incorporated herein in its entirety.

FIELD OF THE DISCLOSED TECHNIQUE

The disclosed technique generally relates to image detectors having a two-dimensional sensor array for microscanning images, and to the enhancement of motion detection, object tracking, situational awareness and super-resolution video using microscanned images in particular.

BACKGROUND OF THE DISCLOSED TECHNIQUE

An infrared (IR) image detector forms an image by detecting radiation in the infrared portion of the electromagnetic spectrum from the imaged scene. A passive infrared detector operates by measuring infrared radiation emitted by a source, particularly thermal energy in the far infrared range, as opposed to active IR detectors which first illuminates objects with IR radiation and then captures the reflections of the illuminations. The inherent spatial resolution of a detector with a two-dimensional matrix array is a function of the size and number of pixels within the array (the pixel density). For many types of image sensors, such as complementary metal-oxide-semiconductor (CMOS)-based or charge-coupled device (CCD)-based sensors, it is fairly straightforward to increase the resolution by adding more pixels within a fixed space and/or decreasing pixel size in the array. However, for IR sensors such an approach would be prohibitively difficult and expensive as IR sensors are prone to issues of self-emission thus requiring vacuum-sealed and cryogenically cooled Dewars to house the sensors. IR radiation, which has wavelengths that are longer than visible light, thus also carries less energy as compared to visible light. Adding more pixels to an IR detector array will lead to increased costs, such as requiring a larger Dewar having higher energy requirements for maintaining the Dewar at cryogenic temperatures. Decreasing the pixel size of an IR array will lead to decreases in the signal-to-noise ratio as IR carries less energy than visible light thus requiring longer integration times to accumulate enough phones to generate an effective image. Longer integration times can also cause more noise to be collected with the signal. Furthermore, IR detectors are prone to receiving scarce light (particularly with passive IR detectors), and usually require manipulations or treatment in order to enhance the amount of radiation collected by the detector to enable effective imaging in the IR wavelength range.

U.K. Patent No. 2,270,230 to Hirose, entitled "Two dimensional image detector", discloses masking the pixels of a sensor array such that a subdivided region is imaged by each pixel. A mask is provided in opposition to a surface of the sensor array, where the mask includes windows having a smaller area than the array pixels. A mask shifter changes the positions of the windows at pitches smaller than those between the pixels. Light passing through the mask window and into each pixel in the sensor array is divided into a desired number of subdivisions as the mask changes position, thus increasing the spatial resolution of the image relative to the pixel size. The mask may be implemented via a metal mask or via electronic manipulation of a substance having polarizing characteristics, such as liquid crystals.

European Patent No. 1,198,119 to Parsons, entitled "Improved resolution for an electric image sensor array", discloses introducing a partially occluding mask/light source between the sensor array and the image. Resolution improvement is obtained by displacement between the array and the mask/light source and calculating grey scale values for the improved resolution from the different changes in the charges of the individual array sensors.

PCT Application Publication No. 98/46007 to Bone, entitled "Imaging system and method", is directed to improving the resolution of a charge coupled device having a two-dimensional array of light sensitive detector elements. Discrete areas of each detector element are sequentially masked with an apertured opaque mask chosen so as to allow for square (n×n) arrays of aperture elements for each detector and so that the apertures can be arranged as an embedded set which facilitate hierarchical refinement of the resolution.

U.S. Pat. No. 6,005,682 to Wu et al., entitled "Resolution enhancement by multiple scanning with a low-resolution, two-dimensional sensor array", is directed to high-resolution imaging with low-resolution two-dimensional imagers whose sensors are only a fraction of a selected pixel area. Sensors are stepped across an image with an optical or mechanical stepper to acquire an image at each sensor position. Multiple images are obtained from individual sensors, which have a sensed area substantially less than the area of the pixels of the sensor array. The rescanning is accomplished by movable mirrors or lenses that are disposed between an illuminated specimen and a sensor area.

U.S. Pat. No. 5,712,685 to Dumas, entitled "Device to enhance imaging resolution", is directed to improving resolution of a Focal Plane Array (FPA) image sensor with microscanning methodology. A mask having a checkerboard pattern of opaque and transparent areas is located in front of and adjacent to the FPA onto which an image of a scene is optically focused. The mask and FPA are displaced with respect to each other in a number of micro-steps that extend in the same direction as the columns/rows of the FPA grid. The micro-steps are of equal lengths and are each a fraction of the length of a detector element. Opaque areas of the mask progressively cover equal areas of detector elements in discrete steps for each micro-step movement in one direction at the same time as transparent areas of the mask progressively uncover equal areas of other detector elements for each discrete step. Outputs from the detector elements provide signals for sample slices of the scene for each micro-step, and an image of the scene is reconstructed from the signals.

SUMMARY OF THE DISCLOSED TECHNIQUE

The disclosed technique provides for systems and methods for using microscanned images to generate and display super-resolution video tracks in real-time. The disclosed technique also provides for systems and methods for using microscanned images to extract both spatial and temporal information for enhancing motion detection, object tracking, situational awareness and super-resolution video.

In accordance with one aspect of the disclosed technique, there is thus provided a method for displaying super-resolution video of at least one moving object without image artifacts using a plurality of microscanned images. The video is displayed having a video frame rate higher than a video frame rate of super-resolution video. The method includes the procedures of acquiring a plurality of microscanned images of the moving object, with a first subset of the microscanned images forming a first data set and a second subset of the microscanned images forming a second data set and for each respective data set, analyzing at least a portion of the respective subset of the microscanned images for spatial and temporal information. The method also includes the procedures of determining a respective movement indication of the moving object according to the spatial and temporal information and in parallel to the procedure of analyzing, forming a respective super-resolution image from each respective data set. The method further includes the procedures of for each respective super-resolution image, designating a respective bounded area surrounding the moving object and repeatedly displaying each respective super-resolution image outside the respective bounded area a plurality of times at the video frame rate and displaying during the plurality of times within the respective bounded area, a plurality of consecutive microscanned images of the moving object at the video frame rate. The plurality of consecutive microscanned images of the moving object is displayed at a low image resolution within the respective bounded area.

In accordance with another aspect of the disclosed technique, there is thus provided a method for displaying super-resolution video of at least one moving object without image artifacts using a plurality of microscanned images. The video is displayed having a high image resolution. The method includes the procedures of acquiring a plurality of microscanned images of the moving object, with a first subset of the microscanned images forming a first data set and a second subset of the microscanned images forming a second data set and for each respective data set, analyzing at least a portion of the respective subset of the microscanned images for spatial and temporal information. The method also includes the procedures of determining a respective movement indication of the moving object according to the spatial and temporal information and in parallel to the procedure of analyzing, forming a respective super-resolution image from each respective data set. The method further includes the procedures of for each respective one of the microscanned images, designating a respective bounded area surrounding the moving object, determining a corrected position of the moving object in each respective super-resolution image according to the spatial and temporal information and displaying the moving object in each respective super-resolution image according to a combination of the moving object in each respective bounded area of each respective one of the microscanned images at the corrected position.

In accordance with a further aspect of the disclosed technique, there is thus provided a method for displaying super-resolution video of at least one moving object without image artifacts using a plurality of microscanned images. The video is displayed having a high image resolution. The method includes the procedures of acquiring a plurality of microscanned images of the moving object, with a first subset of the microscanned images forming a first data set and a second subset of the microscanned images forming a second data set and for each respective data set, analyzing at least a portion of the respective subset of the microscanned images for spatial and temporal information. The method also includes the procedures of determining a respective movement indication of the moving object according to the spatial and temporal information and in parallel to the procedure of analyzing, forming a respective super-resolution image from each respective data set. The method further includes the procedures of for each respective one of the microscanned images in each respective data set, designating a respective bounded area surrounding the moving object and for each respective data set, determining a respective position of the moving object in each respective one of the microscanned images according to the spatial and temporal information. The method furthermore includes the procedures of resampling each respective bounded area using each determined respective position of the moving object and displaying the moving object in each respective super-resolution image according to each resampled respective bounded area at each determined respective position.

In accordance with another aspect of the disclosed technique, there is thus provided a video display system for displaying super-resolution video of at least one moving object without image artifacts using a plurality of microscanned images, with the video being displayed having a video frame rate higher than a video frame rate of super-resolution video. The system includes an image detector, a processor and a display generator. The processor is coupled with the image detector and the display generator is coupled with the processor. The image detector is for acquiring a plurality of microscanned images of the moving object and the processor is for designating a first subset of the microscanned images as a first data set and a second subset of the microscanned images as a second data set. For each respective data set, the processor analyzes at least a portion of the respective subset of the microscanned images for spatial and temporal information and the processor also determines a respective movement indication of the moving object according to the spatial and temporal information. In parallel, the processor forms the first subset into a respective first super-resolution image and the second subset into a respective second super-resolution image. For each respective super-resolution image, the processor designates a respective bounded area surrounding the moving object. The display generator repeatedly generates each respective super-resolution image outside the respective bounded area a plurality of times at the video frame rate and generates during the plurality of times within the respective bounded area, a plurality of consecutive microscanned images of the moving object at the video frame rate. The plurality of consecutive microscanned images of the moving object is displayed at a low image resolution within the respective bounded area.

In accordance with a further aspect of the disclosed technique, there is thus provided a video display system for displaying super-resolution video of at least one moving object without image artifacts using a plurality of microscanned images, with the video being displayed having a high image resolution. The system includes an image detector, a processor and a display generator. The processor is coupled with the image detector and the display generator is coupled with the processor. The image detector is for acquiring a plurality of microscanned images of the moving object and the processor is for designating a first subset of the microscanned images as a first data set and a second subset of the microscanned images as a second data set. For each respective data set, the processor analyzes at least a portion of the respective subset of the microscanned images for spatial and temporal information and also determines a respective movement indication of the moving object according to the spatial and temporal information. The processor combines the first subset into a respective first super-resolution image and the second subset into a respective second super-resolution image. For each respective one of the microscanned images the processor designates a respective bounded area surrounding the moving object and also determines a corrected position of the moving object in each respective super-resolution image according to the spatial and temporal information. The display generator generates the moving object in each respective super-resolution image according to the processor combining the moving object in each respective bounded area of each respective one of the microscanned images at the corrected position and the display generator also generates consecutive respective super-resolution images.

In accordance with another aspect of the disclosed technique, there is thus provided a video display system for displaying super-resolution video of at least one moving object without image artifacts using a plurality of microscanned images, with the video being displayed having a high image resolution. The system includes an image detector, a processor and a display generator. The processor is coupled with the image detector and the display generator is coupled with the processor. The image detector is for acquiring a plurality of microscanned images of the moving object and the processor is for designating a first subset of the microscanned images as a first data set and a second subset of the microscanned images as a second data set. For each respective data set, the processor analyzes at least a portion of the respective subset of the microscanned images for spatial and temporal information and also determines a respective movement indication of the moving object according to the spatial and temporal information. The processor combines the first subset into a respective first super-resolution image and the second subset into a respective second super-resolution image. For each respective one of the microscanned images the processor designates a respective bounded area surrounding the moving object. For each respective data set, the processor determines a position of the moving object in each respective one of the microscanned images according to the spatial and temporal information and also resamples each respective bounded area using each determined respective position of the moving object. The display generator generates the moving object in each respective super-resolution image according to the resampling of the processor of each respective bounded area of each respective one of the microscanned images at each determined respective position.

In accordance with a further aspect of the disclosed technique, there is thus provided a method for motion detection of at least one moving object using a plurality of microscanned images. The method includes the procedures of acquiring a plurality of microscanned images of the moving object, for generating a super-resolution image and forming at least one data set from a subset of the microscanned images. The method also includes the procedures of respectively analyzing at least one portion of the microscanned images forming the data set for extracting spatial and temporal information of the moving object and determining at least one movement indication of the moving object according to the spatial and temporal information.

In accordance with another aspect of the disclosed technique, there is thus provided a method for enhanced motion detection of at least one moving object using a plurality of microscanned images. The method includes the procedures of acquiring a plurality of microscanned images of the moving object for forming at least two data sets from at least two subsets of the microscanned images, with a first subset of the microscanned images forming a first data set and a second subset of the microscanned images forming a second data set of the moving object and forming a respective super-resolution image from each one of the first subset and the second subset of the microscanned images. The method also includes the procedures of analyzing each respective super-resolution image for extracting spatial and temporal information of the moving object and determining a respective first movement indication of the moving object according to the spatial and temporal information derived from the procedure of analyzing each respective super-resolution image. In parallel to the procedure of forming each respective super-resolution image, the method further includes the procedures of for each one of the first data set and the second data set, respectively analyzing at least one portion of the microscanned images forming each data set for extracting spatial and temporal information of the moving object and determining a respective second movement indication of the moving object according to the spatial and temporal information derived from the procedure of respectively analyzing the portion of the microscanned images. The method furthermore includes the procedure of combining the respective first movement indication and the respective second movement indication for enhancing motion detection of the moving object.

In accordance with a further aspect of the disclosed technique, there is thus provided a system for motion detection of at least one moving object using a plurality of microscanned images. The system includes an image detector and a processor, coupled with the image detector. The image detector is for acquiring the microscanned images of the moving object for generating a super-resolution image, where a subset of the microscanned images forms at least one data set. The processor respectively analyzes at least one portion of the data set for extracting microscan spatial and temporal information of the moving object and also determines at least one movement indication of the moving object according to the spatial and temporal information.

In accordance with another aspect of the disclosed technique, there is thus provided a system for enhanced motion detection of at least one moving object using a plurality of microscanned images. The system includes an image detector and a processor, coupled with the image detector. The image detector is for acquiring the microscanned images of the moving object and for forming at least two data sets from at least two subsets of the microscanned images, a first subset of the microscanned images forming a first data set and a second subset of the microscanned images forming a second data set of the moving object. The processor is for forming a respective super-resolution image from each one of the first subset and the second subset and for analyzing each respective super-resolution image for extracting super-resolution spatial and temporal information of the moving object. The processor is also for respectively analyzing, in parallel, at least one portion of the microscanned images forming each data set for extracting microscan spatial and temporal information of the moving object. The processor determines a respective first movement indication of the moving object according to the super-resolution spatial and temporal information and also determines a respective second movement indication of the moving object according to the microscan spatial and temporal information. The processor furthermore combines the respective first movement indication and the respective second movement indication for enhancing motion detection of the moving object.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
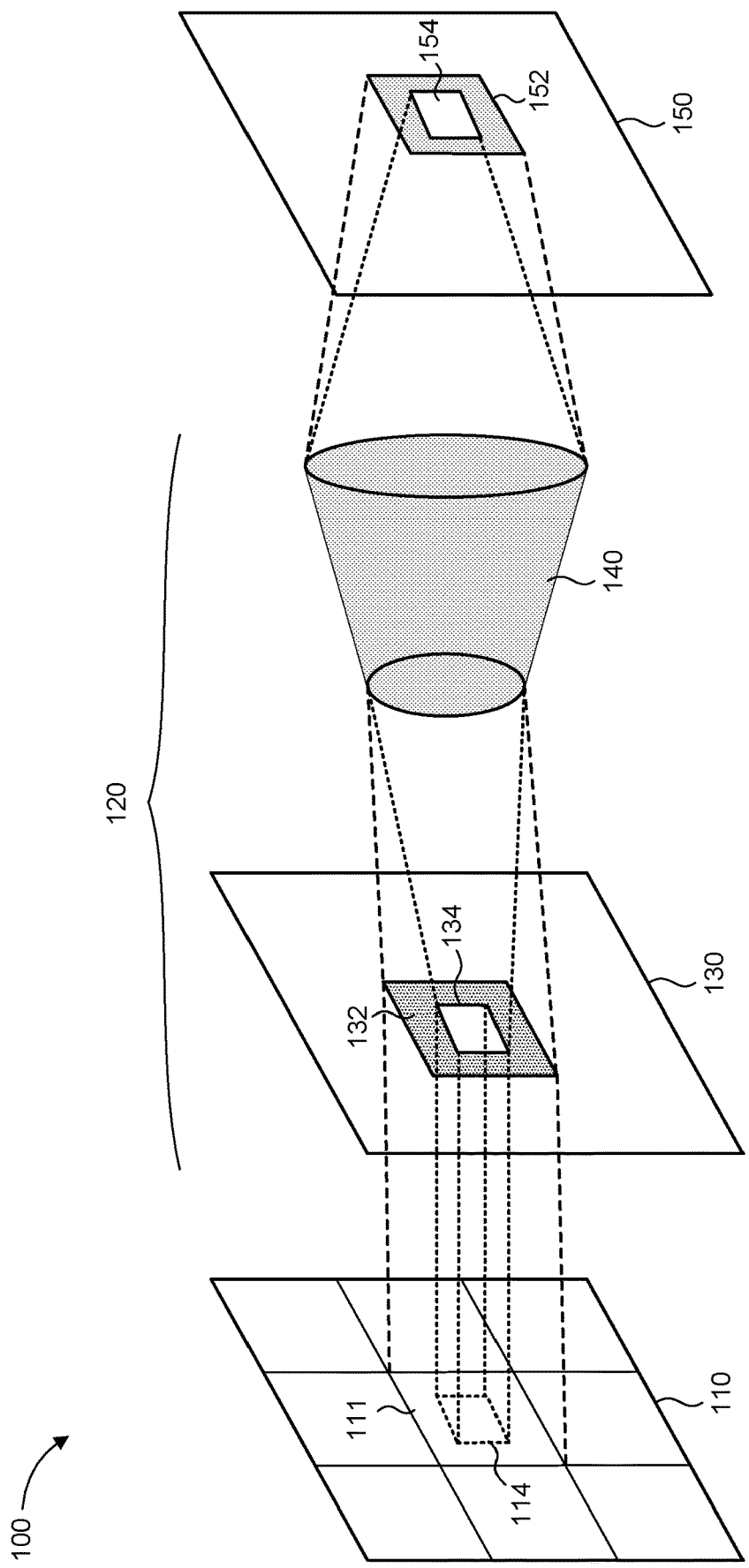
FIG. 1 is a perspective view schematic illustration of an apparatus for increasing the resolution of an infrared imaging detector, constructed and operative in accordance with an embodiment of the disclosed technique.

The disclosed technique overcomes the disadvantages of the prior art by providing a method and apparatus for increasing the intrinsic resolution of an infrared (IR) imaging detector without increasing the total size or the pixel density of the detector array. Instead, the effective spatial resolution of the IR detector is enlarged by reducing the active region within the individual pixels of the detector array (i.e., reducing the "fill factor"). Multiple imaging samples of the same image scene are acquired, in which only a portion of each pixel of the image scene is imaged onto the corresponding pixel of the detector array. The image scene is successively shifted relative to the detector array to provide imaging of different configurations of sub-pixel regions in each of the imaging samples. A higher resolution image frame is then reconstructed from the individual imaging samples.

The disclosed technique also provides systems and methods for using microscanned images to extract both spatial and temporal information for enhancing motion detection, object tracking, situational awareness and super-resolution video. Whereas prior art systems use microscanned images to directly improve image resolution, no consideration is given to temporal information contained within microscanned images. According to the disclosed technique, since microscanned images contain slightly different information about an imaged scene, a temporal analysis of consecutive microscanned images can be used to detect moving objects in an imaged scene thereby enhancing object tracking. As microscanned images can be acquired at a higher rate than the rate required for constructing a super-resolution image, temporal analysis of microscanned images can be used to detect even very fast moving objects in an imaged scene. A temporal and spatial analysis of microscanned images can also be used to improve the accuracy of velocity estimates of detected moving targets and objects and can also generally improve existing detection algorithms such as track, detect, learn (herein abbreviated TDL), image differencing, background subtraction algorithms and background modeling and foreground detection algorithms including mixture of Gaussians (herein abbreviated MOG), MOG2, kernel density estimation (herein abbreviated KDE), global minimum with a guarantee (herein abbreviated GMG), running average, temporal median, principal component analysis (herein abbreviated PCA) and Bayesian background modeling, optical flow estimation algorithms including the Lucas-Kanade method and the Horn-Schunck method, combinations of optical flow and image differencing algorithms, motion detection based on objection detection and recognition algorithms including machine learning approaches, support vector machines (herein abbreviated SVMs), deep learning algorithms and convolutional neural networks (herein abbreviated CNNs), image registration algorithms for background modeling and image subtraction including correlation based registration algorithms, feature based registration algorithms including SIFT (Scale-Invariant Feature Transform), SURF (Speeded Up Robust Features) and BRIEF (Binary Robust Independent Elementary Features) and pyramidal image registration.

Also according to the disclosed technique, microscanned images can be used to generate super-resolution images. By combining a detection system for generating super-resolution images with a pan-and-tilt system, a panoramic super-resolution image can be generated thus increasing the situational awareness capabilities of a detection system. Further according to the disclosed technique, microscanned images can be combined to form a super-resolution video track. By only updating portions of a microscanned image wherein object motion is detected, microscanned images can be combined into a super-resolution video track in real-time.

The disclosed technique comes to improve both moving target detection systems and methods as well as display systems and methods for displaying moving targets. The disclosed technique simultaneously analyzes acquired microscanned images for an indication of a moving target while also constructing a super-resolution image and analyzing the super-resolution image for an indication of a moving target. The indications of a moving target from both the analysis of acquired microscanned images as well as the analysis of a super-resolution image are combined to improve the overall performance of movement detection methods and systems. The simultaneous analyses of acquired microscanned images as well as of a super-resolution image constructed from the acquired microscanned images enables various types of moving objects to be detected that would otherwise not be detected if only one analysis were used. For example, analyzing acquired microscanned images for a movement indication enables the detection of very fast moving objects, as defined below, which might otherwise be undetected as the same individual moving object by an analysis of the super-resolution image constructed from the acquired microscanned images due to the rapid movement of such objects and the generally lower resolution of acquired microscanned images. Analyzing a super-resolution image for a movement indication enables the detection of moving objects exhibiting small movements, as defined below, which might otherwise be undetected by an analysis of the acquired microscanned images due to the small amount of movement of such objects and the generally lower resolution of the microscanned images.

Beyond that, the simultaneous analysis of movement indications improves the probability of detection (herein abbreviated PD) for moving objects and targets while also lowering the false alarm rate (herein abbreviated FAR). As explained below in greater detail, the simultaneous analysis of movement indications allows for an initial determination of the position, velocity and acceleration of a moving object in a single image frame (such as a single super-resolution image frame), which can be used to improve the performance of target tracking algorithms (such as TDL), thus lowering the delay in warning for an identified moving target or threat.

In addition, the disclosed technique can be used to improve display systems and methods for displaying image data acquired from microscanned images and displayed as super-resolution images. The disclosed technique enables image data acquired from microscanned images to be displayed as hybrid super-resolution video, combining low-resolution, high frame rate video with high-resolution, low frame rate video. In the case of very fast moving objects, the disclosed technique enables super-resolution images to be constructed from acquired microscanned images and displayed without blurring and shown as low frame rate video. According to the disclosed technique, the position of a detected fast moving object in a plurality of acquired microscanned images can be adjusted such that each acquired microscanned image positions the fast moving object at a specified position for all microscanned images used to construct a single super-resolution image. The result of such an adjustment enables a super-resolution image to be constructed without blurring of the fast moving object and also displayed as low frame rate video. Such an adjustment can be achieved using an image processing algorithm involving pixel interpolation as described below. According to another embodiment of the disclosed technique, a super-resolution image can be constructed from acquired microscanned images of a fast moving object wherein within a bounded area in the super-resolution image, the acquired microscanned images are played consecutively as high frame rate video (albeit at the lower image resolution of microscanned images) thus enabling a hybrid super-resolution image to be constructed with increased resolution in the periphery while also showing the movement of a fast moving object at a high frame rate.

Reference is now made to FIG. 1, which is a perspective view schematic illustration of an apparatus, generally referenced 100, for increasing the resolution of an infrared imaging detector, constructed and operative in accordance with an embodiment of the disclosed technique. Apparatus 100 includes an IR detector array 110 and a fill factor reduction means 120 made up of a masking filter 130 and an optical element 140. Masking filter 130 and optical element 140 are disposed in between detector array 110 and the focal plane 150 of a scene to be imaged by the detector. Detector array 110 is made up of a lattice or matrix pattern of photosensitive pixels arranged in rows and columns (e.g., a 320×240 array, which includes 320 pixels along the array width and 240 pixels along the array height). The pixels in array 110 may be any suitable size or area, where the individual pixel size is generally substantially consistent across all pixels of the array. Fill factor reduction means 120 is operative to selectively reduce the active (i.e., photosensitive) region of the pixels of detector array 110, by masking or blocking a portion of the photosensitive region of the pixels from receiving radiation from the image scene, such that only a portion of the image scene pixel is imaged onto the corresponding detector array pixel. The active region and masked region of the pixels are then progressively shifted during subsequent imaging samples of the scene. In particular, optical element 140 projects an image region 152 of image scene 150 onto masking filter 130, which in turn blocks out a portion of image region 152 from reaching the corresponding pixel 111 of detector array 110 while allowing only the remaining portion 154 of image region 152 to reach pixel 111. Consequently, pixel 111 includes an imaged region 114 that is less than the total area (i.e., potential photosensitive area) of array pixel 111. Masking filter 130 includes a masking region 132 and a non-masking region 134, such that radiation incident onto masking region 132 (via optical element 140) is prevented from passing through (toward detector array 110), while radiation incident onto non-masking region 134 is passed through. For example, masking region 132 may be embodied by a substantially opaque or non-transmissive portion of filter 130 or a non-transmissive coating disposed at the required portion, whereas non-masking region 134 may be embodied by a substantially transmissive portion of filter 130, such as a window or opening thereat.

It is noted that any of the components of fill factor reduction means 120 may be fully or partially integrated with the IR imaging detector in accordance with the disclosed technique, or may be separate therefrom. For example, masking filter 130 may be situated within the housing enclosing the IR detector, while optical element 140 may be situated outside of the housing, provided optical element 140 and masking filter 130 function to implement the aforementioned masking operation of image scene 150 onto detector array 110.

Figure 2A:
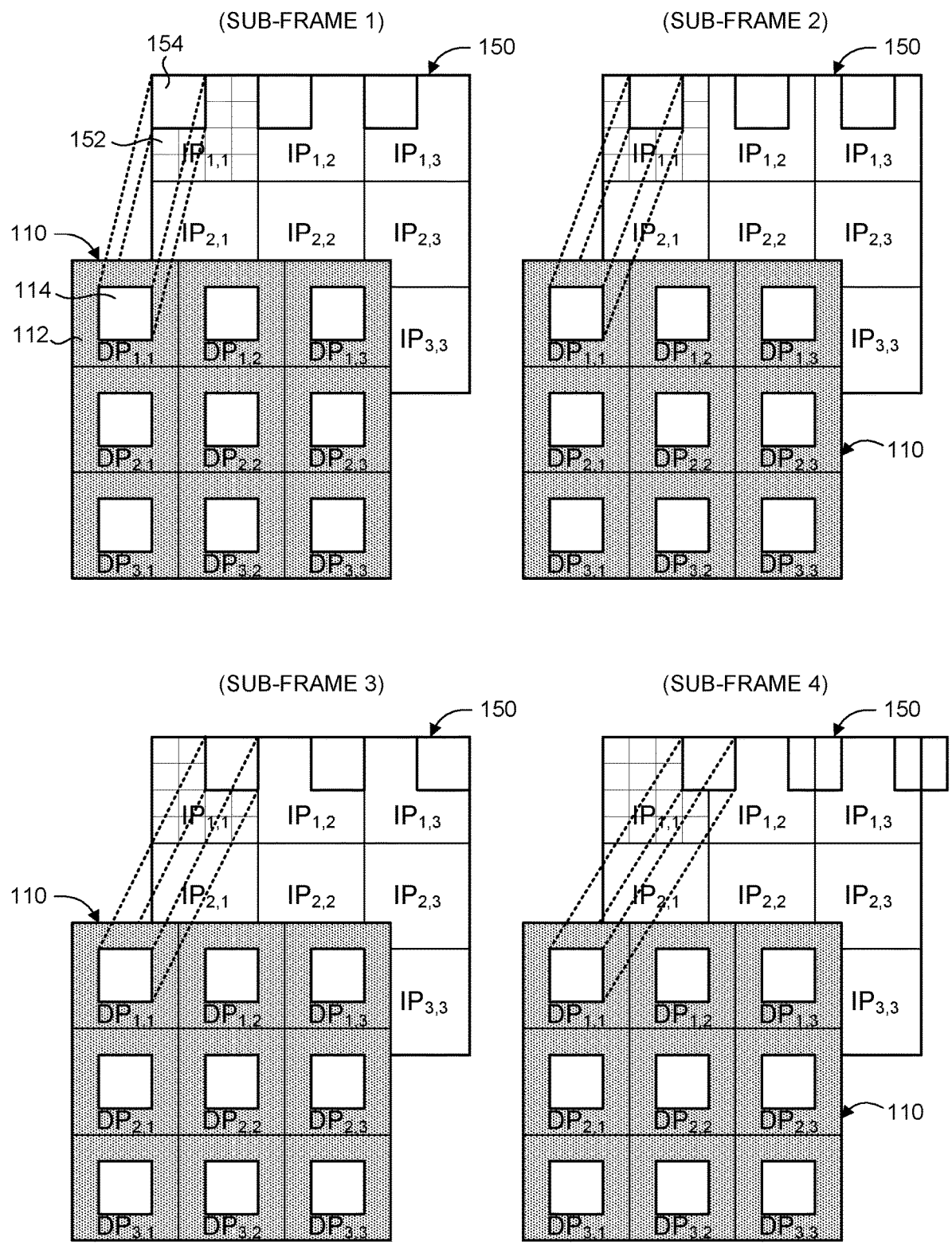
FIG. 2A is a perspective view schematic illustration of an initial set of image sub-frames acquired over successive imaging samples with the apparatus of FIG. 1.
Figure 2B:
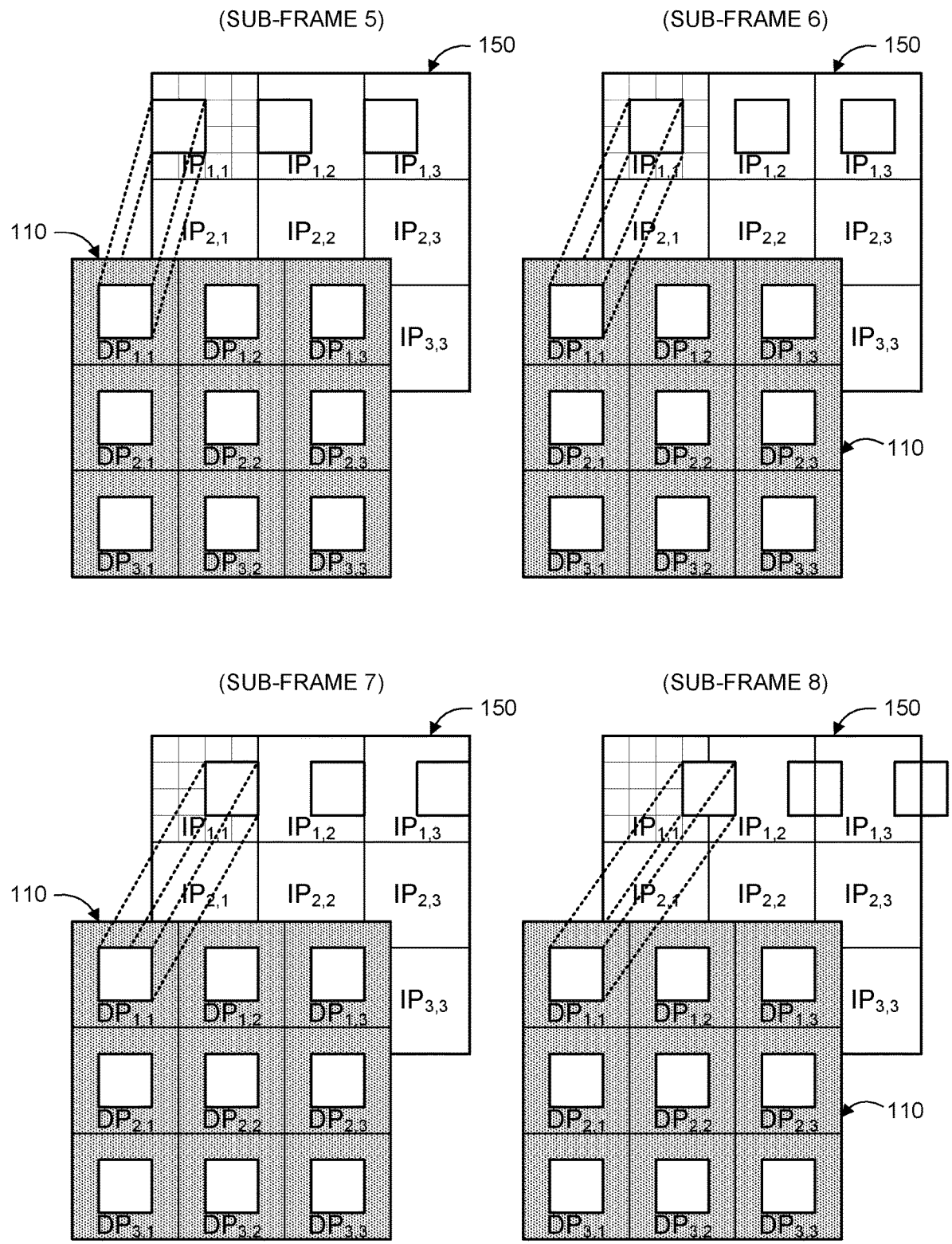
FIG. 2B is a perspective view schematic illustration of a subsequent set of image sub-frames acquired over successive imaging samples with the apparatus of FIG. 1.
Figure 2C:
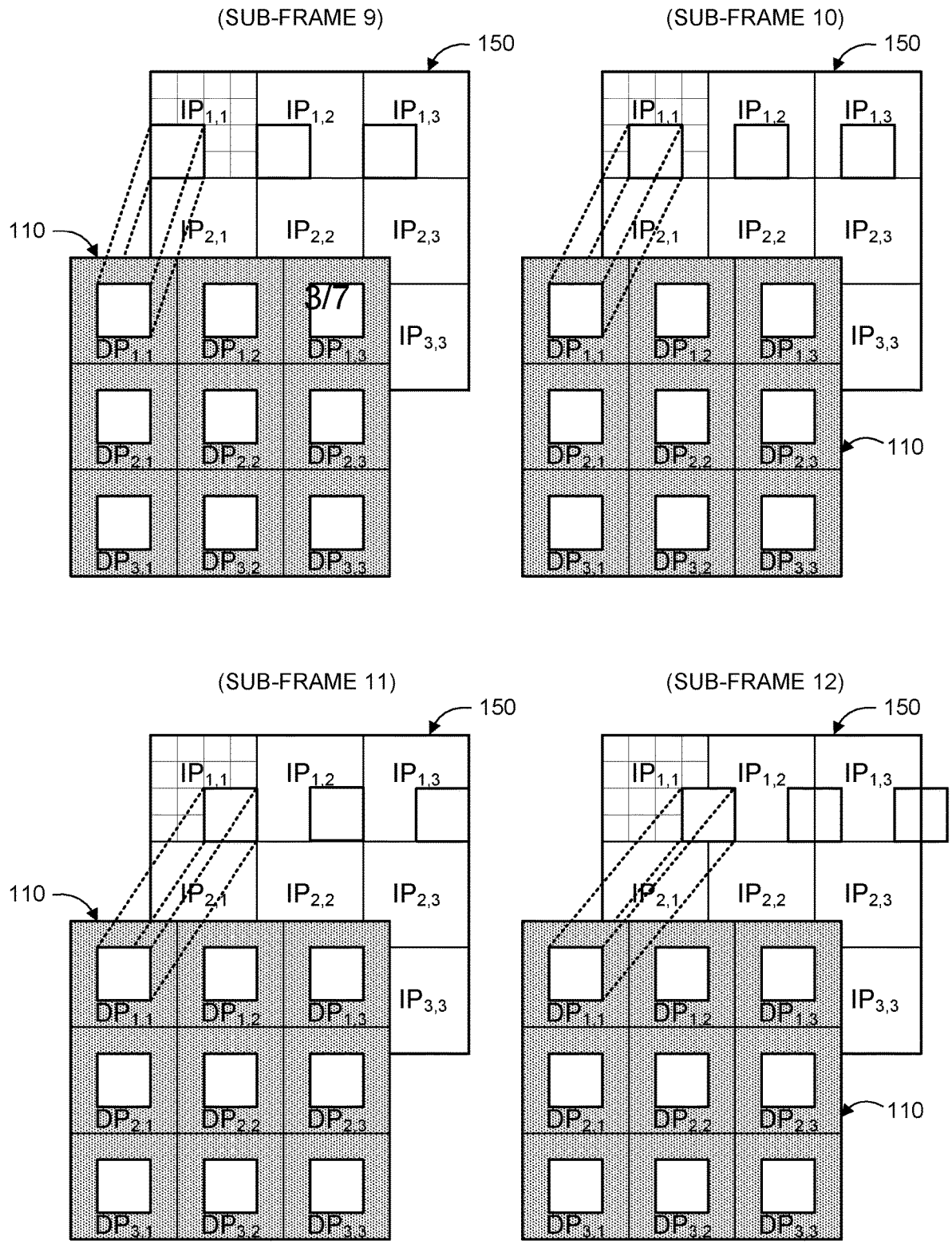
FIG. 2C is a perspective view schematic illustration of another subsequent set of image sub-frames acquired over successive imaging samples with the apparatus of FIG. 1.
Figure 2D:
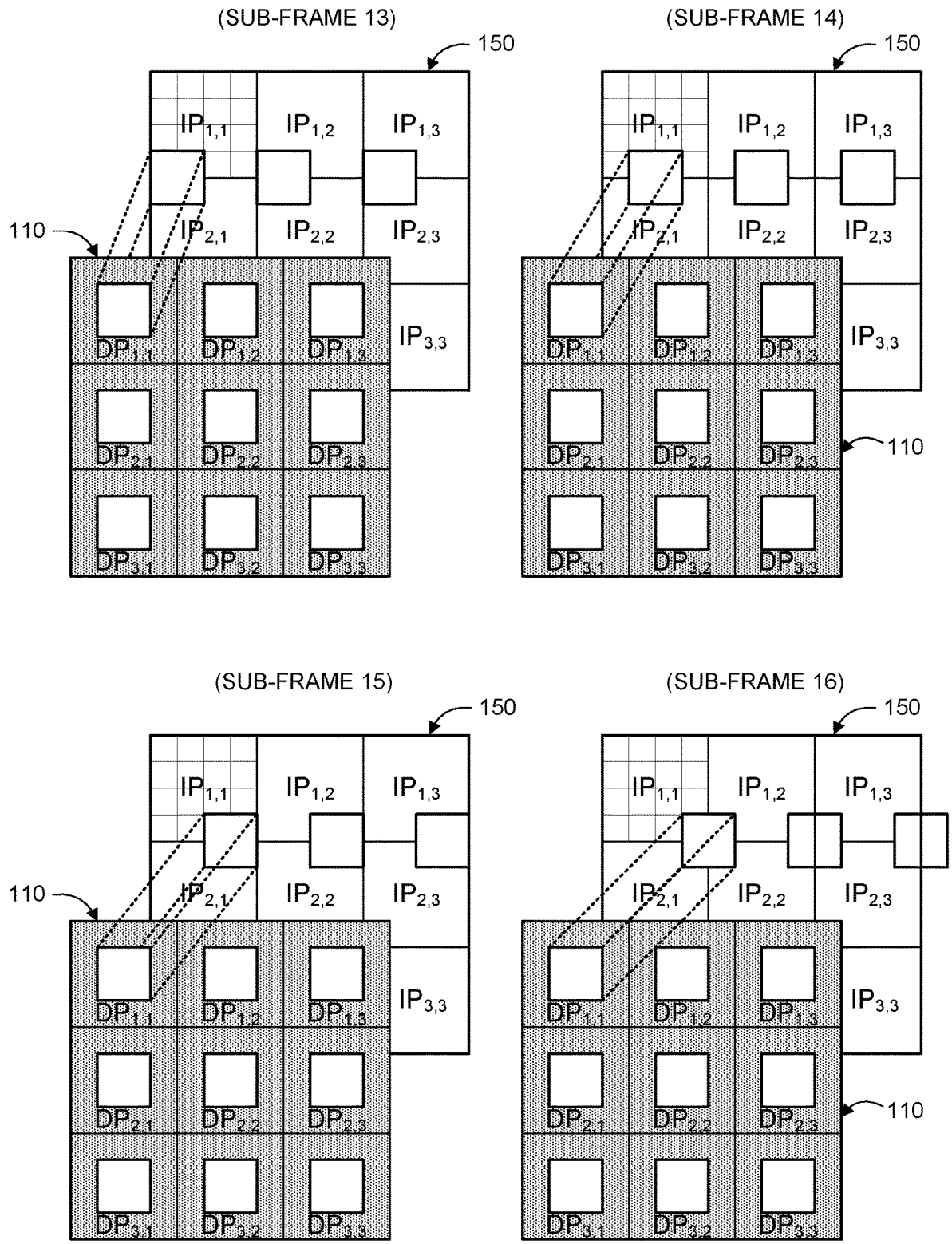
FIG. 2D is a perspective view schematic illustration of a final set of image sub-frames acquired over successive imaging samples with the apparatus of FIG. 1.

Reference is now made to FIGS. 2A, 2B, 2C and 2D. FIG. 2A is a perspective view schematic illustration of an initial set of image sub-frames acquired over successive imaging samples with the apparatus of FIG. 1. FIG. 2B is a perspective view schematic illustration of a subsequent set of image sub-frames acquired over successive imaging samples with the apparatus of FIG. 1. FIG. 2C is a perspective view schematic illustration of another subsequent set of image sub-frames acquired over successive imaging samples with the apparatus of FIG. 1. FIG. 2D is a perspective view schematic illustration of a final set of image sub-frames acquired over successive imaging samples with the apparatus of FIG. 1. Detector array 110 is depicted with nine (9) pixels arranged in a three-by-three (3×3) matrix. Masking filter 130 is disposed directly on array 110 and includes nine windows (i.e., non-masking regions 134) situated on a sub-region of each of the detector pixels ($DP_{x,y}$) of detector array 110, while the remaining area of masking filter 130 is made up of masking regions 132. The image scene 150 is similarly divided into nine image pixels ($IP_{x,y}$) arranged in a three-by-three (3×3) matrix (i.e., each image pixel representing the region of image scene 150 that would ordinarily be projected onto a corresponding detector pixel during regular image acquisition).

A first set of sub-frames of image scene 150 is acquired in FIG. 2A. The light (IR radiation) emitted from image scene 150 is directed toward detector array 110 through masking filter 130 via optical element 140 (not shown), such that only the radiation passing through the windows 134 of masking filter 130 reaches detector array 110. In particular, each detector pixel of detector array 110 captures a portion of a corresponding image pixel of image scene 150. For example, referring to the first imaging sample ("sub-frame 1") in FIG. 2A, radiation corresponding to an upper-left corner image pixel ($IP_{1,1}$) is directed toward a detector pixel ($DP_{1,1}$) situated at the upper-left corner of detector array 110. A portion of the radiation (154) passes through the masking filter window and is incident onto a sub-region 114 of detector pixel $DP_{1,1}$. The rest of the radiation (152) from image pixel $IP_{1,1}$ is blocked by masking region 132 such that it does not reach detector pixel $DP_{1,1}$. Consequently, detector pixel $DP_{1,1}$ includes an imaged region 114 and a non-imaged region 112. Similarly, the next image pixel ($IP_{1,2}$) in the top row of image scene 150 reaches detector pixel $DP_{1,2}$ after passing through the masking filter window such that only a portion of image pixel $IP_{1,2}$ is incident onto a sub-region of detector pixel $DP_{1,2}$. Fill factor reduction means 120 is shown implementing an exemplary fill factor reduction of 25% (i.e., "25% FF"), denoting that each imaged region 114 occupies approximately one-quarter of the area of the respective pixel, while each non-imaged region 112 occupies an area of approximately three-quarters of the respective pixel. The remaining pixels ($DP_{x,y}$) of detector array 110 are imaged in an analogous manner during the first imaging sample (sub-frame), resulting in each detector pixel acquiring an imaged region 114 at its upper-left quadrant, while the remainder of the detector pixel is not imaged.

Following acquisition of the first imaging sample, the portion of each image pixel imaged onto detector array 110 is shifted for the subsequent imaging samples. The shifting increment between each imaging sample is selected in accordance with the fill factor reduction amount and is generally equal to a fraction of the pixel width (defined as the distance between the midpoint of adjacent pixels of the detector array). In this example, the fill factor reduction amount is 25% (25% FF), and so the shifting increment is also selected to be 25%, or approximately one quarter of the pixel width of the detector pixels. The shifting may be implemented by adjusting the line-of-sight (herein abbreviated LOS) of fill factor reduction means 120 relative to detector array 110 (e.g., by suitable adjustment of masking filter 130 and/or of optical element 140). Referring to the second imaging sample ("sub-frame 2") in FIG. 2A, each detector pixel $DP_{x,y}$ receives incident radiation from another portion of image pixel $IP_{x,y}$, such that the imaged region 114 corresponds to an upper-middle quadrant of the corresponding image pixel $IP_{x,y}$ (e.g., the imaged quadrant of "sub-frame 1" being shifted to the right by a quarter of the pixel width, such that the second image quadrant partially overlaps the first image quadrant). Referring to the third imaging sample ("sub-frame 3"), the line-of-sight is shifted again such that the imaged region 114 of each detector pixel $DP_{x,y}$ corresponds to an upper-right quadrant of the corresponding image pixel $IP_{x,y}$ (e.g., the imaged quadrant of "sub-frame 2" being shifted to the right by a quarter of the pixel width).

Additional imaging samples are acquired in an analogous manner, covering remaining overlapping portions (e.g., quadrants) of each image pixel, by successively adjusting the line-of-sight systematically over the same shifting increment (e.g., a quarter pixel width) along both the vertical axis and the horizontal axis of image scene 150, applying a technique called "microscanning", known in the art. For example, referring to the fifth imaging sample ("sub-frame 5") in FIG. 2B, the line-of-sight is shifted downwards by the shifting increment with respect to the first imaging sample, such that imaged region 114 of each detector pixel $DP_{x,y}$ corresponds to an middle-left quadrant of the corresponding image pixel $IP_{x,y}$ (e.g., the imaged quadrant of "sub-frame 1" being shifted downwards by a quarter of the pixel width). The remaining imaging samples ("sub frame 6" through "sub-frame 16") result in additional image pixel portions being acquired (i.e., imaging a respective portion that was not acquired in a previous sub-frame).

The line-of-sight alignment of fill factor reduction means 120 relative to detector array 110 may be successively shifted using any suitable mechanism (i.e., a shift mechanism) or technique, in order to obtain the desired imaged sub-region on the detector pixels for each imaging sample. For example, masking filter 130 and detector array 110 may remain in a fixed position, and thus the positions of masking regions 132 and non-masking regions 134 remain stationary, while optical element 140 is successively repositioned for each imaging sample to shift the directional angle at which optical element 140 directs the radiation from image scene 150. Alternatively, masking filter 130 and detector array 110 are jointly repositioned relative to optical element 140 (i.e., where masking filter 130 remains fixed with respect to detector array 110), for adjusting the optical path of image scene 150 for each imaging sample. The structure of such a mechanism for shifting the line-of-sight may include for example a group of optical elements, such as at least one lens, prism and/or mirror, and at least one actuator for shifting at least one of the group of optical elements. At least one of optical element 140, masking filter 130 and detector array 110 may be moved or displaced by an actuator for shifting the line-of-sight. The structure of such a shift mechanism may also be a pixel shift unit or a micro-optical mechanical device. The pixel shift unit or micro-scanning mechanism can be implemented using a motorized mirror having a 45° configuration (i.e., a folding mirror). In general, in such a setup two mirrors are used, each providing a shift in a separate single axis. Others examples of such an implementation can include a dual-axis microelectromechanical system (herein abbreviated MEMS) mirror in which a single controller is used to provide a shift in two axes. Another example is a motorized lens, specifically designed in the optical design of the system to have a transmission ratio (i.e., linear motion to line-of-sight) that is suitable for mechanical motion, while maintaining good optical performance of the overall system. The mechanical movement of the pixel shift can be done using an electrical mechanism such as a DC motor, a stepper motor, a piezoelectric motor and the like. Further examples of a pixel shift unit or micro-optical mechanical device can include a moving mirror, a fast steering mirror, a motorized steering mirror and the like, which can be used to shift the LOS for adjusting the optical path of image scene 150 to the detector array for each imaging sample. Another option would be to use a lens or an optical element (i.e., an optical system including at least one lens and at least one other optical element but without mirrors) in which either the lens or the other optical element is moved slightly thereby changing the LOS of the optical path. Specific optical configurations can include prisms and wedges, for example Risley prisms. The option of a lens or other optical element generally requires an opto-mechanical design in which the at least one optical element or lens is moved to change the optical path. The optical element or lens can be moved using for example an electric motor, a DC motor, a stepper motor, a piezoelectric motor and the like.

It is noted that the actual size of the imaged regions on the detector pixels may be varied, such as by adjusting the characteristics of masking filter 130 (e.g., size, amount, and/or relative positions of non-masking regions 134) and/or adjusting the optical characteristics of optical element 140. In some detectors, such as vacuum-sealed detectors and/or cryogenically-cooled detectors, it is very difficult to reposition a masking filter relative to the detector array, since the two components should be arranged as close as possible to one another. Consequently, a mechanism for repositioning a movable masking filter would need to be situated within the cryogenic storage Dewar (vacuum flask) along with the masking filter and detector array. This requires such a mechanism to be exceptionally miniature and fast moving, while being capable of operating in cryogenic temperatures. Furthermore, the cryogenic storage Dewar would require significant enlargement, as well as an enhanced cooling mechanism to support the additional heating load. Thus, even if the implementation of a movable masking filter is feasible, the aforementioned issues would yield a detector with minimal practical applications due to the resultant high cost, higher power consumption, greater volume and lower reliability. Therefore, according to an embodiment of the disclosed technique, a stationary masking filter is maintained at a fixed position and orientation relative to the detector array, while the optical path of the image scene is successively adjusted relative to the stationary masking filter between imaging samples. In this embodiment, the shift mechanism for adjusting the optical path may be positioned outside the cryogenic storage Dewar thereby not requiring any changes (e.g., size, cost, power consumption, volume and the like) to the Dewar itself.

The different sub-regions of the image pixels $IP_{x,y}$ of image scene 150 may be imaged in any order or permutation. For example, a bottom row of image pixel portions may be imaged first (i.e., the four sub-frames depicted in FIG. 2D), followed by a higher row, and so forth; or alternatively, a first column of image pixel portions may be imaged in a first group of sub-frames, followed by an adjacent column, and so forth. Furthermore, the imaged sub-regions may be nonconsecutive within a given sub-frames (e.g., an upper-left quadrant and lower-right quadrant of the image pixel may be simultaneously acquired in one sub-frame, while an upper-right quadrant and lower-left quadrant of the image pixel are simultaneously acquired in a subsequent sub-frame).

Figure 3:
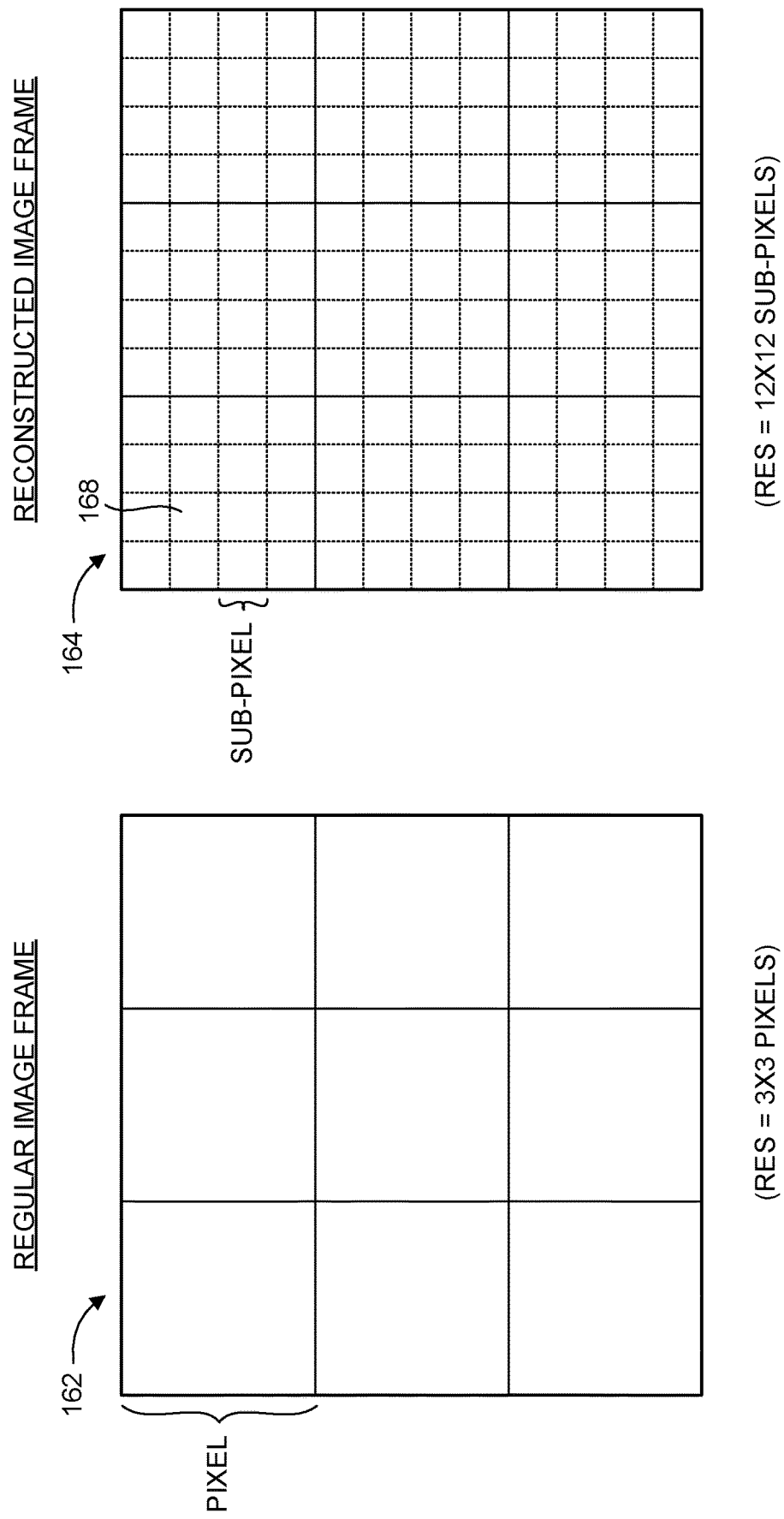
FIG. 3 is a schematic illustration of a reconstructed image frame, formed from the image sub-frames of FIGS. 2A, 2B, 2C and 2D, compared with a regular image frame of the imaging detector.

After all the sub-frames are acquired over successive imaging samples, where each individual sub-frame corresponds to a different imaged sub-region of each image pixel of image scene 150, a final image frame is constructed from all of the acquired sub-frames. Namely, all of the imaged sub-regions for each image pixel are processed and combined, in accordance with a suitable image processing scheme. Reference is now made to FIG. 3, which is a schematic illustration of a reconstructed image frame, referenced 164, formed from the image sub-frames of FIGS. 2A, 2B, 2C and 2D, compared with a regular image frame, referenced 162, of the imaging detector. Regular image frame 162 includes a total of 9 pixels (3×3), whereas reconstructed image frame 164 includes a total of 144 sub-pixels (12×12)), providing a 16-fold increase in resolution (i.e., increasing the number of pixels by a factor of four along each of the horizontal and vertical axes). In particular, each individual pixel in reconstructed image frame 164 (corresponding to a pixel of image frame 162) is made up of 16 pixels arranged in a 4×4 matrix (each of which can be referred to as a sub-pixel in comparison to the pixels in image frame 162). Each sub-pixel of reconstructed image frame 164 is formed from a combination of the respective sub-frames in which that sub-pixel was imaged. For example, sub-pixel 168 of image frame 164 is formed based on sub-frames 1 and 2 (FIG. 2A) and sub-frames 5 and 6 (FIG. 2B), in which that particular sub-pixel portion of image scene 150 was acquired (in different configurations).

Reconstructed image frame 164 represents a 16-fold increase in resolution with respect to image frame 162, which is an image frame that would result from regular imaging with detector array 110 (i.e., without application of the disclosed technique). The intrinsic resolution of detector array 110 is represented by a 3×3 pixel array (i.e., 3 rows by 3 columns of pixels=9 total pixels), as depicted in image frame 162, whereas reconstructed image frame 164 includes 12×12) sub-pixels within the same fixed area of array 110. As a result, the final image frame contains greater image detail (i.e., by a factor of sixteen) as compared to a standard image frame, as each pixel of the reconstructed image frame is made up of sixteen individual sub-pixels which provides four times the detail or information along each axis as would be contained in the corresponding pixel of the standard image frame.

It is appreciated that alternative resolution increase factors (i.e., the amount by which the image resolution is increased) may be obtained by varying the shifting increment between sub-frames, as well as the fill factor reduction amount (i.e., the amount by which the active region of the detector pixels is reduced). For example, to increase the image resolution based on the surface area of the detector array by a factor of 9 (along each of the horizontal and vertical axes), then the shifting increment would be set to be approximately one-third (⅓) of the detector pixel width, while each imaging sample would image a sub-region occupying an area of approximately one-ninth (⅑) of the image pixels (i.e., corresponding to a fill factor reduction factor of ⅑ or approximately 11%). As an example, a masking filter having windows or non-masking regions 134 that are one-third (⅓) the size of the detector pixels, may be used to provide imaging of the desired image pixel sub-region size, instead of masking filter 130 shown in FIGS. 2A-2D which includes windows that are one-quarter (¼) the detector pixel size. A total of 9 sub-frames would be acquired via microscanning (following a shifting increment of one-third (⅓) the detector pixel width between sub-frames), from which an alternative final higher-resolution image frame can be reconstructed.

It is noted that the fill factor reduction of the detector pixels serves to reduce the overall detector sensitivity, as only a fraction of the entire radiation from the image scene reaches the detector array. According to one embodiment of the disclosed technique, to compensate for this effect, the f-number (also known as the "focal ratio", defined as the ratio between the entrance pupil diameter and the lens focal length) of the detector optics is decreased by a factor corresponding to the fill factor reduction amount (or to the shifting increment between imaging samples). Consequently, more radiation is received from the image scene, which offsets the reduction in received radiation resulting from the fill factor reduction. The f-number decrease also provides an improved optical Modulation Transfer Function (MTF), generally representing the ability of the detector to distinguish between details in the acquired image, thereby allowing the detector to support the enhanced spatial resolution of the reconstructed image frame. Thus, the disclosed technique enhances the performance of the IR imaging detector by essentially reducing the detector sensitivity (by reducing the fill factor) and compensating for this reduction by providing suitable detector optics that will provide an adequate level of overall sensitivity together with a substantially higher image spatial resolution. According to the disclosed technique, the f-number of the detector optics may also be reduced in order to lessen any effects of diffraction of an incoming light beam onto the detector array. In general, as the detector pixel size (i.e., the size of the active pixel area) decreases, the f-number of the detector optics should also be decreased correspondingly. According to other embodiments of the disclosed technique other methods can be used to compensate for the reduced amount of radiation reaching the detector array. For example, an increased integration time could be used or a larger detector array with larger pixel dimensions could be used. Furthermore, depending on the wavelength range of radiation being detected by the detector array, for example in the range of 8-12 μm, the amount of radiation might be sufficiently strong such that no compensation is needed and sufficient radiation is received by the detector array. In the range of 8-12 μm, if the masking filter covers a sufficient area of the detector array such that the active pixel size is small, the f-number of the detector optics should be reduced, regardless of whether the overall detector sensitivity is reduced or not.

Figure 4:
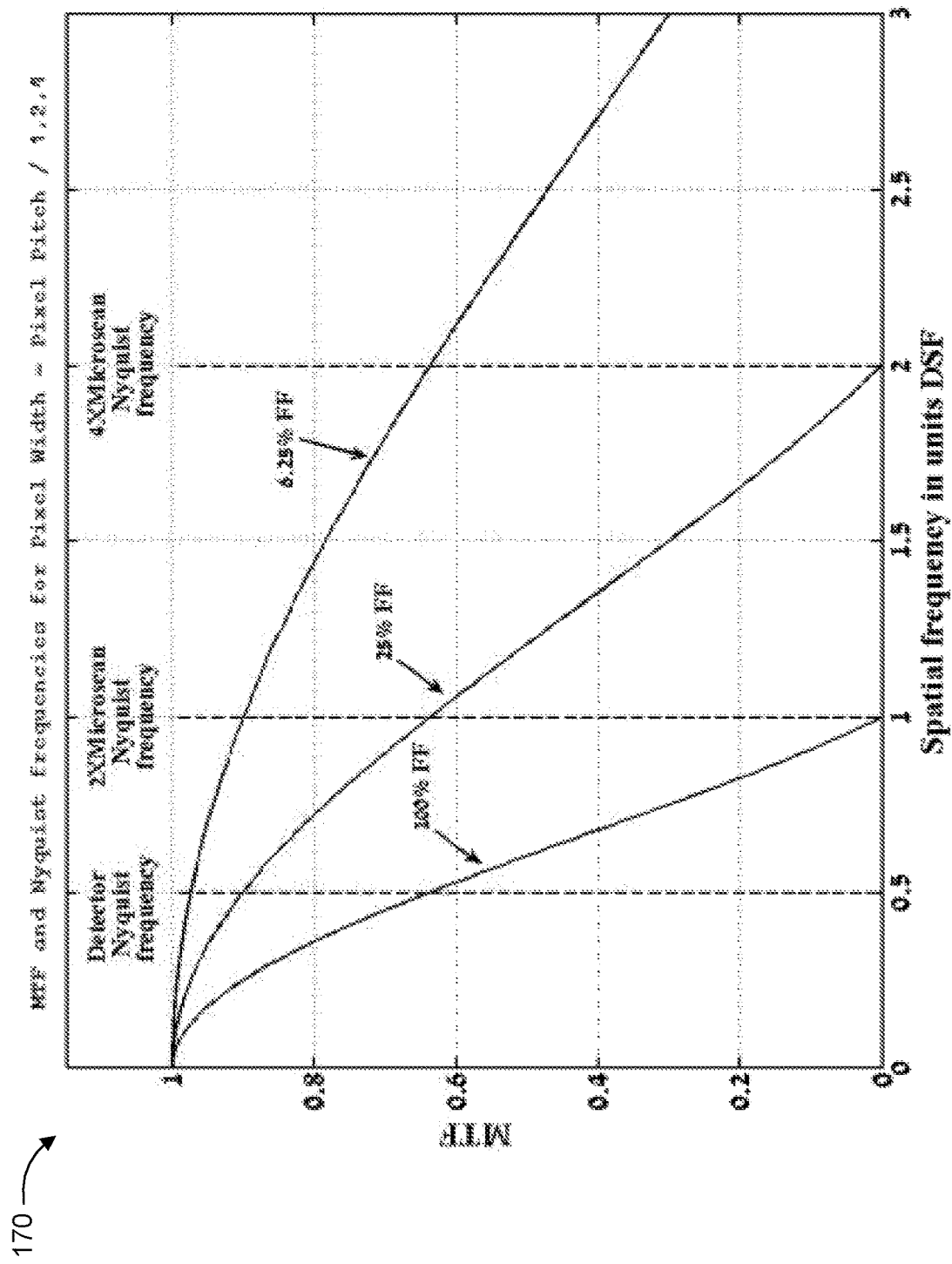
FIG. 4 is a schematic illustration of a graph showing Modulation Transfer Function (MTF) as a function of spatial frequency for different fill factor reduction amounts in accordance with the disclosed technique.

Reference is now made to FIG. 4, which is a schematic illustration of a graph, generally referenced 170, showing Modulation Transfer Function (MTF) as a function of spatial frequency for different fill factor reduction amounts in accordance with the disclosed technique. Graph 170 depicts the detector MTF as a function of spatial frequency or "detector sampling frequency" (corresponding to a normalized representation of the spatial resolution). When implementing "regular microscanning" to increase the resolution of the detector (i.e., without reducing the fill factor of the detector pixels), then the resolution increase (additional information that can be derived from the image) is limited by the detector MTF, which approaches zero at a frequency of $$\frac{1}{\text{active pixel size}}.$$

For example, when imaging without any fill factor reduction (i.e., "100% FF"), shifting between each microscan at increments of less than half the detector pixel pitch would not increase the overall image resolution beyond a factor of ×2 (since the MTF reaches zero beyond the "2× Microscan" frequency point on the graph and is thus essentially unusable for imaging purposes). In contrast, when implementing microscanning in conjunction with fill factor reduction, then the spatial resolution of the detector image can be increased by a larger factor (i.e., not limited by the detector MTF) while still deriving additional information from the image. For example, if the fill factor is decreased to 25% of the total active pixel area ("25% FF"), it is possible to microscan at shifting increments of up to ¼ of the detector pixel pitch (thereby increasing image resolution by x4 along each axis=×16 total), while still being able to distinguish between the additional information (since the MTF is still above zero). It is noted that in one embodiment the shifting increment can be determined by the following equation:

$$\text{Microscan\_Shift} = \frac{\sqrt{FF}}{2} \quad (1)$$

and that in the case of a fill factor reduction of 25%, a shifting increment of ¼ is possible however for other fill factor reduction amounts, the relationship between the shifting increment and the fill factor reduction amount is not a 1:1 relationship. Equation (1) shows the maximum fill factor reduction amount for a given shifting increment. Thus a fill factor reduction of 25% or less (such as 20% or 15%) can be used with a shifting increment of ¼ and in general, a lower fill factor reduction (i.e., lower than the maximum for a given shifting increment) may lead to better results and is a matter of optimization. It is further noted however that in general there is no direct relationship between the shifting increment and the fill factor and thus Equation (1) should be taken as merely an example. Whereas the shifting increment and the fill factor are related, the relationship is only indirect as applied to the spatial resolution of the detector image. Thus the masking filter and the shifting increment might be any given size compared to the size of individual pixels of the detector array. In general, the size of the masking filter (i.e., the fill factor reduction amount) is a continuous parameter whereas the size of the shifting increment is a discrete parameter (e.g., such as fractions of a pixel as listed below). As an example, given a pixel size of 15 µm, to achieve a specific spatial resolution, a shift increment of 3.75 µm can be used (thus 25% of a pixel) however the fill factor reduction might be 40%, thus resulting in an active area of 6 µm being illuminated for each pixel based on the masking filter. However in another example, a similar spatial resolution can be achieved using a shift increment of 3 µm (thus 20% of a pixel) with a fill factor reduction of 50%. In general, the shift increment is a rational number expressed as a fraction of a pixel, such as ½ pixel, ⅓ of a pixel, ¼ pixel, ⅕ pixel and the like. As another example, four microscans per axis per pixel may be executed, as per the example given above in Equation (1) however with a shifting increment of ⅕ instead of ¼ (i.e., less than the maximum fill factor reduction amount for a given shifting increment). By reducing the fill factor even further, it is possible to microscan at higher frequencies/smaller shifting increments to provide an even larger resolution increase. It is noted that the potential fill factor reduction amount (and thus the potential resolution increase) that can actually be implemented for a given imaging detector is generally limited by opto-mechanical design constraints. Such limitations in the ability to design and manufacture the suitable high resolution optics may vary according to a particular system design and requirements.

Referring back to FIG. 1, fill factor reduction means 120 may be implemented using any suitable device, mechanism or technique operative for reducing the fill factor of the detector pixels by the desired amount. For example, fill factor reduction means 120 may alternatively be implemented by only a masking filter, which is successively repositioned and/or reoriented to obtain different imaging samples, or by only an optical element, which adjusts the optical path of the radiation from the image scene 150 over successive increments for each imaging sample. Further alternatively, fill factor reduction means 120 may be implemented by configuring detector array 110 such that the active (photosensitive) region of the pixels is less than the potentially maximum active region. For example, the pixels may be electronically configured such that only a selected sub-pixel region is active during each imaging sample.

The disclosed technique is applicable to all types of IR detectors, operative anywhere within the wavelength range of approximately 1-15 µm, encompassing LWIR, MWIR and SWIR wavelengths. The disclosed technique is particularly applicable to thermal imaging cameras, and particularly vacuum-sealed and cryogenically-cooled thermal imagers, where the term "cryogenically-cooled" as used herein encompasses different types of low-temperature detectors, including those operating at temperatures above what may be considered cryogenic temperatures under some definitions (for example, including temperatures between approximately −150° C. (123K) and approximately −120° C. (153K)).

In accordance with the disclosed technique, there is provided a method for increasing the resolution of an IR imaging detector comprising a two-dimensional detector array of photosensitive pixels arranged in a matrix. The method includes the procedure of successively exposing the detector array to an image scene, to acquire multiple imaging samples of the image scene, where for each imaging sample, the region of the pixels collecting incident radiation from the image scene is reduced such that only a portion of the pixel area of the imaged scene is imaged onto the corresponding pixel of the detector array. The method further includes the procedure of successively shifting the image scene relative to the detector array by a shifting increment equal to a fraction of the pixel width of the array pixels, to provide imaging of successive sub-pixel regions in each of the imaging samples. The method further includes the procedure of reconstructing an image frame having a resolution greater, by a factor defined by the shifting increment, than the intrinsic resolution of the detector, from the acquired imaging samples.

The disclosed technique also comes to address a number of problems in the field of object tracking and motion detection, also referred to as video motion detection (herein abbreviated VMD) or target tracking, using acquired microscanned images. Object tracking and motion detection relates to the analysis of a plurality of images in order to identify objects of interest in the images and to track their movement without human intervention. The objects of interest may be moving vehicles, persons, animals or other objects that change position over the course of a plurality of images. The objects of interest are contextually sensitive, thus different types of objects in an image will be considered objects of interest in a given implementation context of the disclosed technique. For example, in the field of security and surveillance, objects of interest may include vehicles, people as well as objects that people may carry which can be used as a weapon. Such objects may be referred to as potential threats. Object tracking and motion detection in this respect thus relates to the identification of potential threats, tracking their movement and generating a warning or alarm if such potential threats become real threats.

In general, object tracking and motion detection comprises two main procedures, a) detection of a moving object or target in an image frame and b) correlating the movement of the moving object or target over consecutive image frames. Procedure or step a) involves determining differences between consecutive image frames to determine which pixels in the image frames represent possible moving objects. Procedure or step b) involves correlating the determined differences between consecutive image frames to establish a path of movement of a possible moving object after which it can be ascertained that the identified possible moving object in step a) was indeed a moving object. Whereas step a) is computationally simple, step b) is significantly more complex as differences in each image frame must be correlated to determine a possible path of a moving object. In real-world applications an image frame may include a plurality of moving objects, thus the complexity of step b) is expressed as determining the differences between consecutive image frames for each moving object and correlating the differences correctly for each moving object, thus obtaining a reasonable and logical path of movement for each moving object. Algorithms, referred to as path management, path movement, detection or tracking algorithms, are known in the art for executing step b).

Figure 5A:
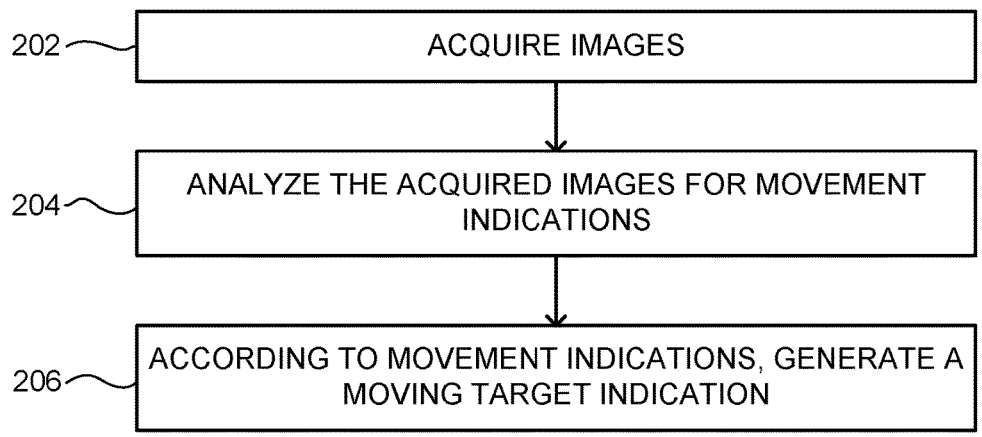
FIG. 5A is a schematic illustration of a method for object tracking and motion detection, as is known in the art.

Reference is now made to FIG. 5A, which is a schematic illustration of a method for object tracking and motion detection, generally referenced 200, as is known in the art. In a procedure 202, images of a scene of observation are acquired. The images may be visible light images or infrared images and are usually taken from a camera of sorts such that there is a plurality of consecutive images of a scene of observation in which there may be objects to track. In a procedure 204, the acquired images are analyzed for movement indications. This procedure is similar to step a) as mentioned above and generally involves comparing subsequent images for differences in the location and intensity of pixels between subsequent images. Not all movement indications necessarily correlate to a moving object or target but represent a difference between at least two subsequent images which can potentially indicate a moving object. In a procedure 206, based on the movement indications in procedure 204, a moving target indication is generated. This procedure is similar to step b) as mentioned above and generally involves using a detection or tracking (i.e., path movement) algorithm for correlating the movement indications of subsequent or consecutive images to determine a path of a moving object. If a path for a potential moving object can be determined then a moving target indication can be generated for the moving object. The method shown in FIG. 5A is known in the art and many algorithms exist for implementing such a method.

Figure 5B:
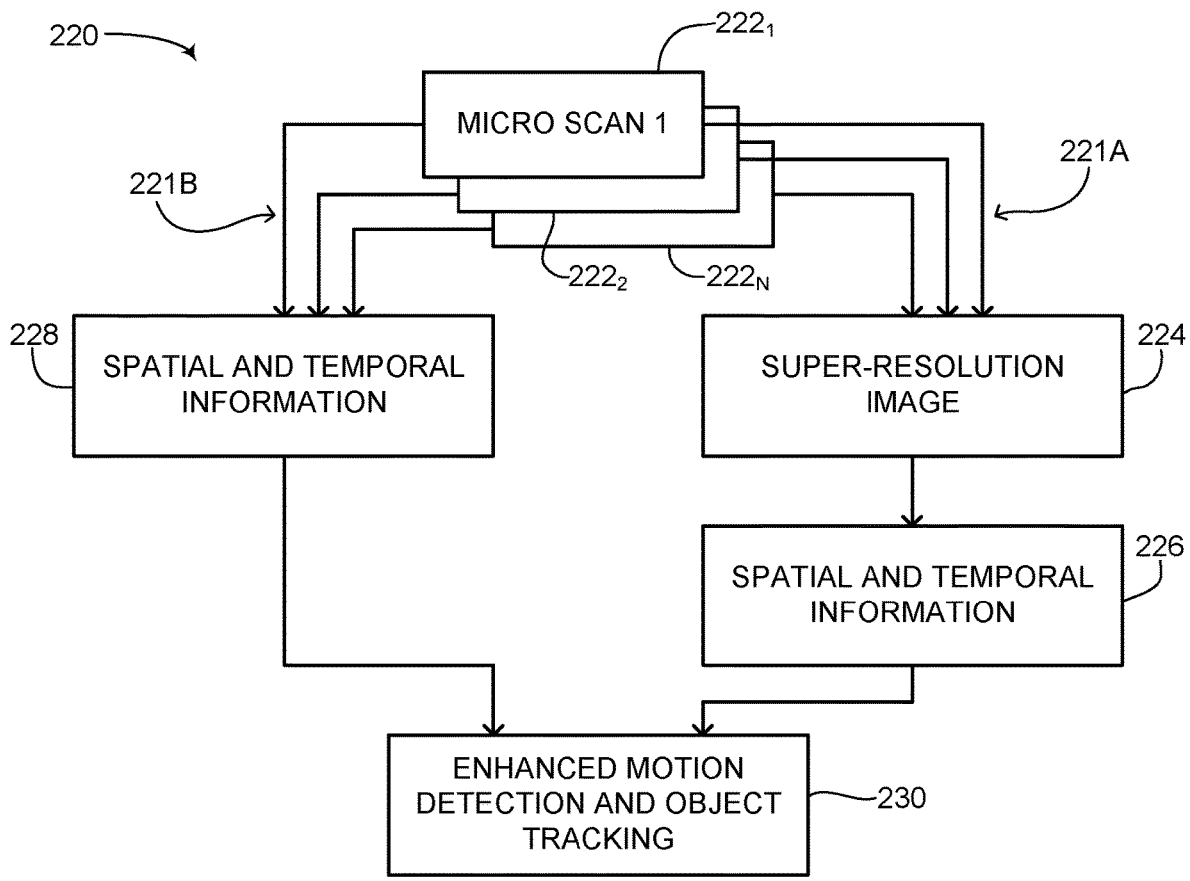
FIG. 5B is a block diagram illustration of a method for enhancing motion detection and the tracking of objects using microscanned images, operative in accordance with another embodiment of the disclosed technique.

Reference is now made to FIG. 5B, which is a block diagram illustration of a method for enhancing motion detection and the tracking of objects using microscanned images, generally referenced 220, operative in accordance with another embodiment of the disclosed technique. Block diagram 220 shows the general steps of how microscanned images can be used to enhance motion detection as well as object tracking. As shown, a plurality of microscanned images $222_1$-$222_N$ is acquired. Plurality of microscanned images $222_1$-$222_N$ can represent M sets of microscanned images where each set is sufficient for constructing a super-resolution image. For example, each set may include at minimum two microscanned images or as many as N microscanned images for forming a super-resolution image. As described in greater detail below, microscanned images $222_1$-$222_N$ can be acquired in a number of different ways and do not necessarily need to come from a microscanner. Furthermore, microscanned images $222_1$-$222_N$ may be captured from a visible light detector, an infrared light detector, an ultraviolet light detector and the like. In one embodiment, the detector (i.e., visible light, IR, UV and the like) may be a high frequency detector capable of capturing images at a capture rate of 180 Hz or even higher. Microscanned images $222_1$-$222_N$ are not the same as the acquired images referred to in FIG. 5A, as they are not representative of the captured light rays from a scene of observation on an entire detector array (not shown). As is known in the art, microscanned images can be combined into a super-resolution image to form an image of a scene of observation however each microscan image by itself is not considered a full image of the scene of observation. According to the disclosed technique, microscanned images $222_1$-$222_N$ are used for two simultaneous sets of procedures shown by a first plurality of arrows 221A and a second plurality of arrows 221B. It is noted that both sets of procedures can occur in parallel in the sense that the time required for each set of procedures may be different however regardless they occur in parallel. In the set of procedures following first plurality of arrows 221A, microscanned images $222_1$-$222_N$ are combined into a super-resolution image 224. It is noted that in one embodiment, only a portion of microscanned images $222_1$-$222_N$ are combined into super-resolution image 224. For example, if a super-resolution image with increased resolution in only the horizontal axis is desired, then only a portion of microscanned images $222_1$-$222_N$ need to be combined to form super-resolution image 224. The portion of microscanned images $222_1$-$222_N$ may be microscanned images from a shift increment over a single axis, such as in the case of 4×4 microscans per super-resolution image, only a single row/axis (i.e., four microscans) may be used to form the super-resolution image. As mentioned above, combining microscanned images into a super-resolution image is known in the art. Super-resolution image 224 schematically represents the super-resolution images formed from the M sets of microscanned images schematically shown as microscanned images $222_1$-$222_N$. Thus super-resolution image 224 represents at least two super-resolution images. Once combined into super-resolution images, known object motion detection and tracking algorithms (such as TDL) can be used on the super-resolution images to determine spatial and temporal information as shown by a block 226. The spatial and temporal information derived from the super-resolution images can include an analysis of movement indications between consecutive super-resolution images as well as moving target indications, as described above as steps a) and b) in standard object tracking. As described below in further detail, performing object tracking and motion detection on super-resolution images is a slower process than standard object tracking and motion detection on regular images since the refresh rates for super-resolution images is slower than the refresh rate of regular images. Regular image frames may have a refresh rate of 30 Hz whereas super-resolution images can have refresh rates between 1-10 Hz depending on how many microscanned images are used to construct the super-resolution image. In the case of a pan and tilt system for generating super-resolution images, as described below in FIGS. 9-10B, the refresh rates can be even lower as such a system cycles through a number of different non-overlapping or slightly overlapping stare positions before returning to its original position. As used herein, a pan and tilt system or mechanism as used with the disclosed technique can include any imaging system in which the imaging detector of the system can change its LOS via a mechanical means or an optical means. A mechanical means may include any setup or mechanism capable of mechanically changing the LOS of the imaging detector. An optical means may include any setup or mechanism for shifting the optical path of the imaging detector. The change in LOS can be a change in one axis of the imaging detector or in two axes of the imaging detector.

Simultaneously, or in parallel, as shown by second plurality of arrows 221B, microscanned images $222_1$-$222_N$ are also individually analyzed for spatial and temporal information, as shown by a block 228. In this set of procedures, microscanned images $222_1$-$222_N$ are not formed into a super-resolution image but are individually analyzed as separate images for spatial and temporal information using object motion detection and tracking algorithms. This includes determining potential moving objects between consecutive microscanned images and also determining movement paths of potential moving objects to determine that a potential moving object is indeed a moving target. As described below in further detail, performing object motion detection and tracking on microscanned images is a faster process than standard object motion detection and tracking on regular images since the refresh rate for a single microscanned image is higher than the refresh rate of a single regular image frame. Thus performing object motion detection and tracking on microscanned images according to the disclosed technique enables the detection of rapidly moving and/or short-lived targets. Individual microscanned images can be refreshed or scanned at a rate of, for example, 180 Hz. Also, as described below in further detail, the spatial and temporal information derived from at least two microscan images can include information about the velocity and with at least three microscan images, the acceleration of the identified moving target(s) in block 228.

The result of block 226 is a first at least one moving target indication as derived from a movement analysis of the super-resolution images of block 224. The result of block 228 is a second at least one moving target indication derived from a movement analysis of the microscanned images of blocks 222$_1$-222$_N$. The second moving target indication(s) can also include an estimate of the velocity and acceleration of identified moving targets even after the analysis of only two or three individual microscanned images. As shown in FIG. 5B, the spatial and temporal information derived in blocks 226 and 228 can be combined, as shown by a block 230, for generating enhanced motion detection and object tracking. Block 230 thus represents a combination of the moving target indications of both block 226 and block 228. In one embodiment of the disclosed technique, the results of blocks 226 and 228 can be combined using a weighted calculation, such as by a Kalman filter and the like. Various criteria and parameters of a motion detection and object tracking system (not shown) can be used to determine what weight each moving target indication from blocks 226 and 228 receives in the combined moving target indication of block 230. Examples of possible weights as factors could be the detected size of the target, the signal-to-noise ratio resulting from the set of procedures shown by plurality of arrows 221A and 221B, the type of determined movement/path of the target in each of blocks 226 and 228, the presence of obstacles and/or obscuration in the determining of a moving target indication in each of blocks 226 and 228 (for example, if block 226 always determines a moving target indication but block 228 sometimes does and sometimes does not, for whatever reason) and the like. The weights can also include the outputted certainty level of each motion detection algorithm (i.e., the resulting moving target indication from blocks 226 and 228) based on several parameters such as the signal-to-noise ratio, the target size, the target contour, the continuity of detections, the number of past detections, the estimated velocity and acceleration of the target and the like.

The two simultaneous and in parallel procedures shown by first plurality of arrows 221A and second plurality of arrows 221B according to the disclosed technique enables enhanced motion detection and object tracking for a few reasons. For the purposes of explanation, the procedure shown by first plurality of arrows 221A can be referred to as motion detection on super-resolution images (as described above, and below in FIG. 6) and the procedure shown by second plurality of arrows 221B can be referred to as motion detection on microscanned images (as described above, and below in FIG. 6). One understanding of the enhanced nature of the motion detection and object tracking of the disclosed technique is that each of the two described procedures can detect moving objects which might not be detectable by use of the other procedure. Each of the moving detection procedures shown in FIG. 5B provides spatial and temporal information at different spatial and temporal resolutions. Therefore a combination of the two improves the overall ability of a motion detection system to detect moving targets by enlarging the possible spatial and temporal resolutions at which targets can be detected and then tracked. Due to the nature of how super-resolution images are constructed, motion detection on super-resolution images allows for the detection of small and slow moving targets which may be only detectable in a high resolution image. Due to the nature of how microscanned images are acquired, motion detection on microscanned images allows for the detection of large moving targets, fast or rapid moving targets or short-lived targets which can be detectable in lower resolutions but might only be detectable in images (such as microscanned images) that can be processed very quickly. Thus a combination of the motion detection in both super-resolution images and acquired microscan images according to the disclosed technique allows for target detection and tracking wherein targets are fast moving, slow moving, requiring a high resolution for detection and detectable even at low resolution, thereby enhancing motion detection and object tracking. Another benefit of the combination of the motion detection in both super-resolution images and acquired microscan images according to the disclosed technique is that it allows for lowering the number of false positive detections of targets (i.e., reducing the FAR).

An example of a fast moving target only detectable by motion detection of acquired microscanned images would be a moving object that has less than 50% overlap in pixel location between consecutive whole image frames. Such a moving object does not need to be physically moving fast (let's say at 100 km/h) but within the imaged scene of observation needs to move fast enough that between consecutive whole image frames, it is difficult for a detection or tracking algorithm to establish a correlation between movements of the object per image frame and to determine that the moving object in two consecutive image frames is indeed the same moving object or different moving objects. This may be the case if less than 50% of the pixels representing the moving object do not overlap between consecutive image frames, thus making it difficult to correlate a path of movement of the object. Phrased in another way, a fast moving object may be any object wherein the movement of the object between consecutive frames is significantly larger than the size of the object in each frame or significantly larger than the size of the frame itself. In either case a detection or tracking algorithm will have difficulty establishing the detection of the moving object in the consecutive image frames as the same object. Since microscanned images are acquired at a very fast rate, such as 180 Hz, unless the moving object is moving at extremely high speeds (e.g., 1000 km/h or 50 rad/sec), there will be sufficient overlap between consecutive microscanned images to easily correlate the movements of the moving object between consecutive microscanned images. Another consideration in this respect relates to the perceived distance of a moving target in an acquired image. A moving object which appears close in a series of acquired images might not have its movements correlated whereas a moving object which appears far in the same series of acquired images, which might even be moving faster than the close moving object, might have its movements easily correlated to form a movement path. This may be based on the number of pixels of the moving object which overlap between consecutive acquired images. A fast moving target may be also a short-lived target which may only appear in a small number of image frames (for example less than 50 image frames). Since microscanned images are acquired at a very fast rate, thus even short-lived targets can be detected and an accurate estimate of their motion can be performed according to the disclosed technique. Analyzing the movement of such fast moving targets may yield no detection of a moving object if a movement analysis of consecutive super-resolution images is used as there may be no overlap whatsoever of the moving object between consecutive super-resolution images due to the longer time is takes to generate a super-resolution image. Such short-lived objects might also not appear as objects in a super-resolution image if the amount of image frames in which the short-lived object appears is less than the number of image frames combined to form the super-resolution image. Another reason such short-lived objects might also not appear as objects in a super-resolution image is that due to their high velocity, such objects may appear distorted in the super-resolution image when the microscan images are combined thus making it difficult to ascertain if the distorted (and most probably blurred) element seen in the super-resolution image is indeed an object or not. It is noted though that due to the lower resolution of acquired microscan images, small targets or targets requiring a high resolution to even identify as potential moving objects may be missed by a movement analysis of acquired microscanned images.

An example of a slow moving target only detectable by motion detection of super-resolution images would be a small moving object that has significant overlap in pixel location between consecutive microscanned images. Such a moving object does not need to be physically small but within the imaged scene of observation needs to be small as compared to the field-of-view (herein FOV) of the scene, i.e. the object is represented in the imaged scene of observation by a few pixels, thus making it difficult for a motion detection algorithm to even determine that an object has moved between consecutive image frames. As example of such an object may be in a scene of observation, such as an airport terminal being imaged by a surveillance camera, wherein in the scene of observation there may be hundreds of people. The hand of a single person in such a scene of observation, moving his hand to reach for a weapon, such as a gun, might not be resolvable at all in an acquired microscanned image (due to its low resolution) and might only be resolvable with a super-resolution image (due to its high resolution). It is noted that a large object which moves very slowly (as mentioned above, wherein there is significant overlap of pixels between consecutive images) might also not be determined as a moving object if only analyzed using microscanned images. Analyzing the movement of such a slow and/or small moving target may yield no detection of a moving object if a movement analysis of consecutive acquired microscan images is used as there may be so much overlap of the moving object between consecutive microscan images due to the short amount of time it takes to acquire microscan images that no movement detection will be detected at all. In the case of a small moving object, an analysis of consecutive microscan images might also miss such objects because very few pixels actually make up such an object in the acquired microscan images. Such an object however may be detectable as a moving object via the high resolution and slower refresh rates of consecutive super-resolution images where movement of the object may not be negligible between consecutive super-resolution images. This may be even more the case when the disclosed technique is used with a pan-and-tilt system where the refresh rate of two consecutive super-resolution images at a given field and angle of observation is even slower.

Another understanding of the enhanced nature of the motion detection and object tracking of the disclosed technique is that each of the two described procedures can be used to detect moving objects which can go from being detectable by only one method to being detectable by only the other method. For example, a moving object which is initially fast moving in the scene of observation but then becomes slow moving and possibly small in size. According to the disclosed technique, continuity of the detection and tracking of the object can be maintained as movement and size characteristics of the target change over time. A further understanding of the enhanced nature of the motion detection and object tracking of the disclosed technique is that a target may be detectable using both the procedures shown, however unlike the prior art, the ability to determine a velocity and acceleration estimate from two or three acquired microscan images enhances the motion tracking available using the procedure of motion detection for super-resolution images since a motion detection algorithm can already be provided with a velocity and acceleration estimate of the moving object before a single super-resolution image has been formed. The added redundancy of detecting a moving object using two procedures simultaneously improves the PD of moving objects overall while also reducing the FAR as the detection of a moving object using one of the motion detection procedures can be used to validate the detection of the same moving object using the other motion detection procedure. This is particularly relevant in the case of a scene of observation containing a plurality of moving objects wherein moving objects might move in front of or behind each other over consecutive whole image frames. The added redundancy of detecting a moving object using the aforementioned two motion detection procedures according to the disclosed technique increases the probability that a motion detection algorithm can maintain the tracking of a moving object in the scene of observation over time even if the spatial and temporal characteristics of the moving objects change over time and even if the moving object seems to appear and disappear over consecutive image frames due to the moving object passing behind other objects and moving targets in the scene of observation. Thus in general, the spatial and temporal information extracted from a set of microscanned images, from a generated super-resolution image or from both can be used to improve the overall tracking of a moving object.

Motion detection systems and microscanning systems do not work off of a single image frame or a single acquired microscan image. Thus part of the enhancement in motion detection as shown in block 230 does not only come from the ability, according to the disclosed technique, to determine a velocity and acceleration estimate after two or three microscanned images but from the use of such velocity and acceleration estimates in detection and tracking algorithms. Having velocity and acceleration estimates of a moving target within two or three acquired microscan images generally improves the overall success rate of detection and tracking algorithms being able to correlate a movement path for moving objects between consecutive images (whether microscan images, regular images or super-resolution images). Better correlation of the movement of moving objects between consecutive images lowers the FAR and also allows for high probabilities of detection of a moving target to occur in less time. Thus for these reasons as well, the disclosed technique enables enhanced motion detection and object tracking. For example, the analysis of both a plurality of microscanned images as well as the super-resolution image formed from the plurality of microscanned images can be used to determine the presence and movement of a very fast moving object by increasing the ability of motion detection algorithms to correlate the movements of such an object even if it has little overlap between consecutive microscanned images.

It is noted that the instantaneous determination of velocity and acceleration estimates from two or three microscanned images or two or three super-resolution images in the disclosed technique does not represent the linear velocity and linear acceleration but rather the angular velocity and angular acceleration of moving objects. Angular velocity and acceleration can be estimated from successive microscan images or successive super-resolution images without any knowledge of the distance of the moving object from the image detector. In order to estimate the instantaneous linear velocity and linear acceleration of a moving object in a microscan image or a super-resolution image, the distance of the moving object from the image detector capturing the microscan images must be determined and together with the angular velocity and angular acceleration can be used to respectively determine the linear velocity and linear acceleration. According to the disclosed technique, the image detector used to acquire microscanned images can be coupled with an external source for determining the instantaneous distance between the image detector and a moving object in the scene of observation. The external source may be a geo-referencing device, a rangefinder and the like. The distance can also be determined using geo-referencing methods and techniques, using a parallax calculation and the like. The distance can further be determined using any known aerial photography or aerial surveillance system as is known in the art. In some embodiments of the disclosed technique, the instantaneous linear velocity and linear acceleration of the moving object are determined as well, using the methods listed above, for use with the disclosed technique in order to provide additional information about the moving object, such as being able to classify the moving object based on its instantaneous linear velocity and acceleration.

As explained in more detail below, for example in FIG. 8B, microscanned images $222_1$-$222_N$ alone can be analyzed to determine the presence of object motion in the microscanned images. Slight differences between consecutive microscanned images can be used to determine that an object in the imaged scene has moved. At least two microscanned images can then be used to determine an instantaneous angular velocity estimate of a detected moving object in the microscanned images and at least three microscanned images can be used to determine an instantaneous angular acceleration estimate of a detected moving object in the microscanned images. Very slow moving objects (e.g., moving less than 0.01 rad/sec), may not be detected by only analyzing microscanned images, thus according to the disclosed technique, as described above, a super-resolution image generated from a plurality of microscanned images is also analyzed for the detection of moving objects.

The prior art merely relates to the analysis of microscanned images for spatial information and for combining microscanned images into a super-resolution image. According to the disclosed technique, microscanned images as well as super-resolution images are analyzed for temporal information as well in order to enable motion detection and object tracking. Thus according to the disclosed technique, additional information and data are extracted from microscanned images and super-resolution images.

As mentioned above, microscanned images $222_1$-$222_N$ can be acquired in a number of different ways. One example was shown above in the apparatus of FIG. 1. According to the disclosed technique, any method or system used to generate microscanned images requires knowledge of the relative LOS shift of an image detector as well as the generation time of each microscan image within an image subset. In general, the main LOS of an imaging detector system is measured by an external device, such as inertial sensors, magnetic sensors and the like, positioned on a goniometer, for example. According to the disclosed technique, the shift in the LOS of the imaging detector during microscanning relative to the main LOS of the imaging detector is to be determined internally by a shift mechanism (as described above such as a mirror or optical element which is moved by an actuator). Thus any method or system where each image is captured at slightly different lines-of-sight, and the relative shift in the LOS between images can be determined can be used to generate microscanned images according to the disclosed technique. Knowledge of the relative LOS shift can be determined either by direct measurement or by image processing methods. For example, an encoder, an inertial measurement device and the like, either coupled with or integrated into an image detector, can be used to determine the LOS of the image detector as well as shifts in the LOS of the image detector. As another example, image correlation can be used as an image processing method for determining the relative shifts in LOS of each image subset (i.e., each microscan). In addition, microscan images require that an image detector shift slightly between each microscan image, as shown above in FIGS. 2A-2D.

The LOS shift of the image detector can be embodied either as a controlled LOS shift or an uncontrolled LOS shift. For example, a controlled LOS shift may be achieved by a LOS shifting mechanism, such as a motor, solenoid or actuator for slightly shifting the LOS of the image detector. As described above, this can be achieved by shifting the image detector itself, shifting an optical element which focuses light onto the image detector, shifting a mask to control where light beams impinge upon the surface of an image detector or any combination of the above. The shifting can also be achieved by used a mirror or a prism. An uncontrolled LOS shift can be achieved when the image detector interface is moved or vibrated with respect to the scene of observation thereby creating a slight shift in the LOS from which the image is captured. In an uncontrolled LOS shift, a separate microscanning element is not required as the vibrations or movements of the image detector themselves generate arbitrary and substantially constant shifts in the LOS of the image detector. As an example, microscanned images with an uncontrolled LOS shift can be embodied by an image detector placed on a platform. Such a platform will slightly vibrate and shake due to natural forces and certainly in the case where the platform is moving (as the motor causing the platform to move will cause vibrations). The platform may be for example a car, a truck, a tank or any known land or sea vehicle. The platform may also be for example a fixed-wing aircraft or a rotary-wing aircraft and can also include unmanned aerial vehicles, such as remotely-piloted vehicles and drones. The platform does not necessarily need to be mobile and can be a stationary platform such as an observation tower which nevertheless may slightly vibrate and shake due to natural forces (such as winds). The images detected by such an image detector will substantially be offset. In this embodiment of the disclosed technique, the image detector's electro-optic design must be designed accordingly to determine when consecutive detected images are detected at slightly different lines-of-sight. Thus each detected image from an uncontrolled LOS shift in an image detector is equivalent to a microscanned image detected through a controlled LOS shift in an image detector which may include a microscanning element. As described herein, microscanned images and the methods and systems of the disclosed technique which relate to microscanned images refer to images having slightly different lines-of-sight whether the LOS shift was either controlled or uncontrolled, and thus also refer to images received from image detectors which may not include a microscanner or LOS shifting mechanism but nevertheless can detect images having slightly different lines-of-sight. According to the disclosed technique, offset images can also be used to extract spatial and temporal information about moving objects captured in the offset images.

Figure 6:
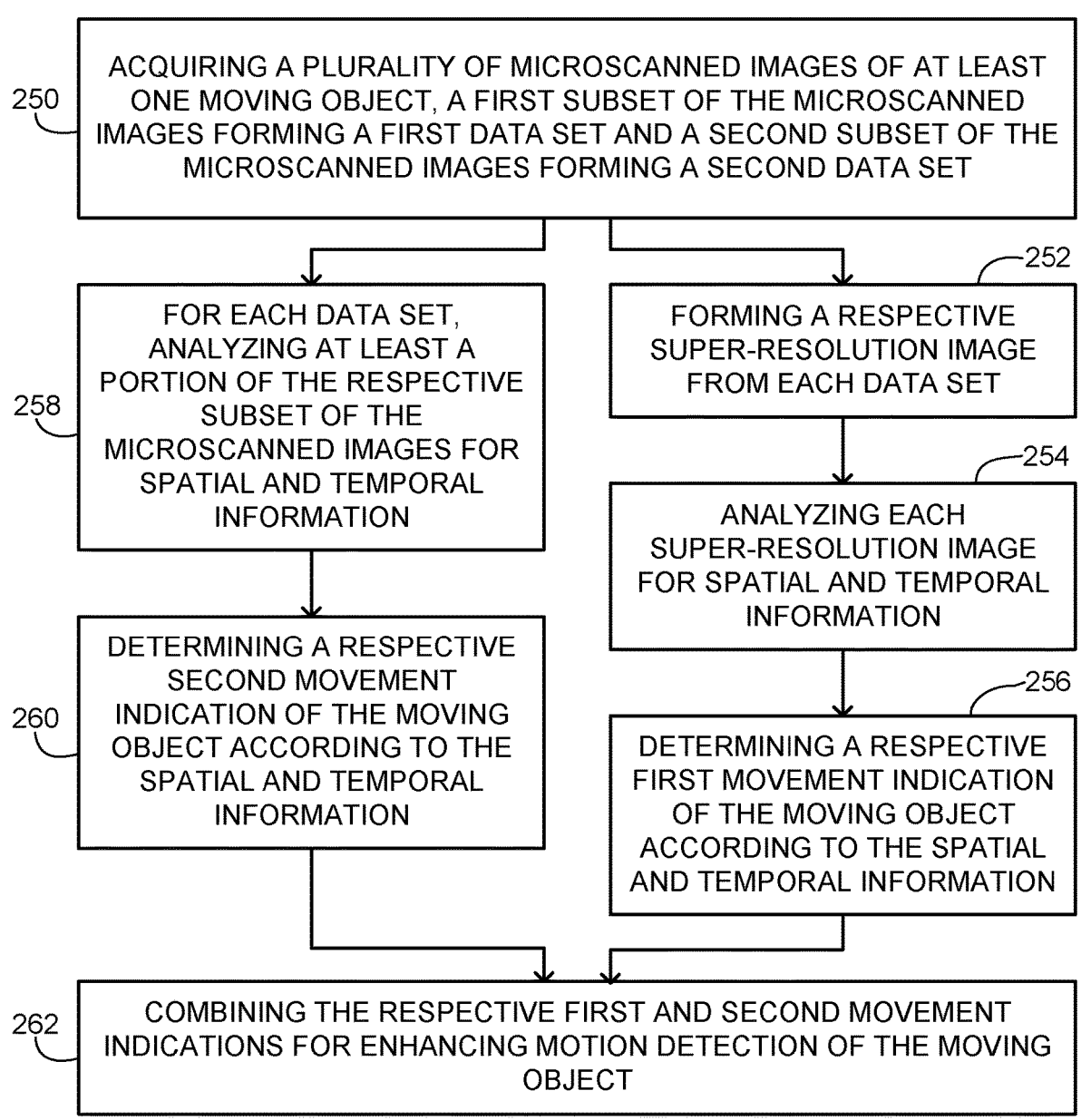
FIG. 6 is a schematic illustration of a method for enhancing motion detection and the tracking of objects using microscanned images, operative in accordance with a further embodiment of the disclosed technique.

Reference is now made to FIG. 6, which is a schematic illustration of a method for enhancing motion detection and the tracking of objects using microscanned images, operative in accordance with a further embodiment of the disclosed technique. The method of FIG. 6 is based on the block diagrams shown above in FIG. 5B. FIG. 6 shows a method for enhanced motion detection using microscanned images wherein the microscanned images are used to construct a super-resolution image and are also used individually. In a procedure 250 a plurality of microscanned images of at least one moving object is acquired. A first subset of the microscanned images forms a first data set and a second subset of the microscanned images forms a second data set. Each data set represents the raw image data captured on an image detector and can be used in various ways. In general, the raw image data of a data set represents the raw image data captured on the entire detector array of the image detector for a given image frame (for example, all the sub-frames shown above in FIGS. 2A-2D). The data sets can be analyzed spatially and temporally, as described below. In addition, the data sets can be used to construct a super-resolution image. The data sets can also be used to display microscanned images to a user. However each of these is merely an option and the data sets can remain as data sets without graphic representation to a user. In general, the data sets can be referred to as images not necessarily designated for graphic representation to a user. For example, in the field of computer vision, the generic term "images" may refer to data sets upon which manipulations and processing are performed even though those images are not displayed to a user until processing is complete. Thus in the disclosed technique, the term "images" or "microscanned images" may be used to refer to images or data sets upon which an analysis is executed or performed even though those images or data sets may not be graphically represented to a user. The plurality of microscanned images of the moving object can be divided into a plurality of data sets, however according to the disclosed technique, at minimum the plurality of microscanned images should be divided into two different data sets. In general, a data set represents a sufficient number of microscanned images for forming a super-resolution image frame. Thus in a typical scenario, the number of data sets is equal to the number of super-resolution image frames that can be constructed (as described below in procedure 252). In an imaging system where a detector does not pan and/or tilt and image a panoramic scene of observation, each data set represents the same scene of observation as acquired microscanned images. According to the disclosed technique, at minimum each data set should include at least two microscanned images from which temporal and spatial information can be extracted and which can be used to form a super-resolution image, as described below. With reference to FIG. 5B, plurality of microscanned images $222_1$-$222_N$ are acquired. With reference to FIG. 8B (as described below), of the microscanned images which are acquired, various subsets of microscan images can be formed. For example, a first set of microscan images 362A (FIG. 8B) includes a first subset of microscanned images of a moving object whereas a second set of microscan images 362B (FIG. 8B) includes a second subset of microscanned images of the moving object. As can be seen, the first subset and the second subset are different. Regardless, each subset is imaging the same scene of observation and thus the same stationary objects in each subset are imaged in both subsets.

In a procedure 252, a respective super-resolution image is formed from each data set. As mentioned above, each data set should include at least two microscanned images. With reference to FIG. 5B, plurality of microscanned images $222_1$-$222_N$ are formed into super-resolution image 224. With reference to FIG. 8B, a first set of microscan images 362A can be constructed into a first super-resolution image, a second set of microscan images 362B can be constructed into a second super-resolution image and a third set of microscan images 362C can be constructed into a third super-resolution image.

In a procedure 254, each super-resolution image is analyzed for spatial and temporal information, including an analysis of the movement of any objects between consecutive super-resolution images. Spatial information can include the position of any moving object detected in the super-resolution image. Procedure 254 is similar to step a) mentioned above regarding object motion detection and tracking, wherein procedure 254 executes step a) on at least two consecutive super-resolution images. Thus in procedure 254, potential moving objects between at least two consecutive super-resolution images are identified, including their respective positions in each super-resolution image. As explained above, such moving objects may be for example objects which move very slowly between consecutive image frames and/or require increased resolution and detail to ascertain that movement is actually occurring. In a procedure 256, a respective first movement indication of the moving object is determined according to the spatial and temporal information derived in procedure 254. Procedure 256 substantially represents step b) as mentioned above regarding object motion detection and tracking, wherein at least one tracking or track manager algorithm is used to establish a path of movement of the potentially moving objects identified in procedure 254 over consecutive super-resolution image frames. Procedure 256 is performed for each identified potentially moving object in procedure 254, however the first movement indication is only determined if a path of movement for the potential moving object between consecutive super-resolution images is determined by the at least one tracking or track manager algorithm according to the criteria and parameters of the used tracking or track manager algorithm. With reference to FIG. 5B, the spatial and temporal information represented by block 226 represents the analysis of the super-resolution images and the determination of a respective first movement indication in procedures 254 and 256.

In a procedure 258, at least a portion of a respective subset of the microscanned images is analyzed for spatial and temporal information. Procedure 258 is performed for each acquired data set in procedure 250. Thus in the case shown in procedure 250, procedure 258 is performed once for the first data set and once for the second data set. The spatial and temporal information derived in procedure 258 represents step a) as mentioned above regarding object detection and motion tracking in general and can be executed using known object tracking algorithms. In procedure 258 the data sets are representative of the acquired microscanned images. Procedure 258 is used to determine the presence of potential moving objects in the acquired microscan images and in general, each data set includes a plurality of microscanned images, thus an initial estimate of both velocity and acceleration can be determined for potentially moving objects. It is noted that the estimate of both the velocity and acceleration is an estimate of the angular velocity and angular acceleration of potentially moving objects. In general, in display systems of moving objects, changes in position of moving objects on the pixels of a display system represent the angular velocity of the movement component of the object which is perpendicular to the LOS of the image detector. Thus movement of an object as seen in consecutive images (whether they be microscanned images, regular images or super-resolution images) is correlated to the perpendicular component of the angular velocity of the moving object to the LOS of the image detector as well as the distance of the moving object from the moving detector. This explains why fast moving objects which are distant from an observation point appear to move slower than even slower moving objects which are closer to the observation point. Spatial information which is analyzed may be the position of the moving object in each microscanned image of each data set. Temporal information of the moving object may include the instantaneous velocity and acceleration of the moving object. As mentioned above, since procedure 258 is executed on data sets from microscanned images, very fast moving objects may be identified which would otherwise not be identified if procedure 258 was performed on a regular image frame or a super-resolution image as the acquisition (or refresh) rate of microscanned images is much higher than for regular images or super-resolution images. Thus procedure 258 is able to identify moving objects which might not be identified in procedure 254. With reference to FIG. 8B, a first set of microscan images 362A is analyzed for temporal and spatial information. As shown, an object 364 is detected and is analyzed over subsequent microscanned images in the first set to determine that the subsequent movements of moving objects 364', 364" and 364'" are indeed the same object which is moving. As seen, an initial estimate is made of the position of moving object 364 in each microscanned image. In addition, an initial estimate of the instantaneous velocity and acceleration of the moving object can be determined as shown by a reference number 372. It is noted that moving objects 364, 364', 364" and 364'" are shown with an offset in the vertical direction (i.e., Y-axis) to avoid clutter and increase clarity in the figure.

In a procedure 260, the spatial and temporal information of procedure 258 is used to determine a respective second movement indication of the moving object. Procedure 260 substantially represents step b) mentioned above regarding object motion detection and tracking methods, wherein at least one tracking or track manager algorithm is used to establish a path of movement of the potential moving objects identified in procedure 258 according to the criteria and parameters of the tracking or track manager algorithm. Procedure 260 is performed for each acquired data set. Since each acquired data set includes a plurality of microscanned images (at minimum two or three, but practically speaking many more), consecutive microscanned images in each data set can be used to determine the instantaneous velocity and acceleration of moving objects for which a second movement indication is determined. Thus unlike procedure 256, in procedure 258 the movement indication of a moving object in the acquired and analyzed data sets can include an estimate of the angular velocity and angular acceleration of the moving object. With reference to FIG. 5B, the spatial and temporal information derived, as shown in block 228, represents the analysis of the movement of potential moving objects and the determination of a second movement indication as shown in procedures 258 and 260. With reference to FIG. 8B, the movement of moving object 364 is analyzed spatially and temporally to determine the instantaneous angular velocity and angular acceleration of the moving object, as shown by a reference number 372, as well as a position estimate of moving object 364. Each subset of microscanned images can be analyzed spatially and temporally for determining an updated instantaneous velocity and acceleration, as shown by reference numbers 376 and 384 (both in FIG. 8B).

As can be seen, procedures 252-256 and procedures 258-260 are performed simultaneously or in parallel and both derive from the acquisition of a plurality of microscanned images forming at least two different data sets. As described above, procedures 252-256 are used to identify slow moving objects in a scene of observation where a high resolution is required to identify and determine that motion of the object is actually occurring. Procedures 258-260 are used to identify fast moving objects in a scene of observation where a low resolution may be sufficient to identify and determine that differences in motion of an object can be correlated as the same object which is moving fast. In addition, procedures 252-256 and 258-260 may produce movement indications of the same moving object. According to the disclosed technique, procedures 252-256 and 258-260 can be executed using known object motion detection and tracking algorithms, such as TDL, image differencing, background subtraction algorithms and background modeling and foreground detection algorithms including MOG, MOG2, KDE, GMG, running average, temporal median, PCA and Bayesian background modeling, optical flow estimation algorithms including the Lucas-Kanade method and the Horn-Schunck method, combinations of optical flow and image differencing algorithms, motion detection based on objection detection and recognition algorithms including machine learning approaches, SVMs, deep learning algorithms and CNNs, image registration algorithms for background modeling and image subtraction including correlation based registration algorithms, feature based registration algorithms including SIFT, SURF and BRIEF and pyramidal image registration.

In a procedure 262, the respective first movement indication from procedure 256 and the respective second movement indication from procedure 260 are combined for enhancing motion detection of the moving object. The two movement indications can be combined using known methods, for example weighted calculation methods and systems, such as a Kalman filter. In this procedure, the extracted spatial and temporal information and the first and second movement indications are used to positively identify a moving object in the acquired microscan images and also to predict where the moving object will appear in a subsequent microscan image or a subsequent image frame or super-resolution image frame.

This procedure thus enhances motion detection of a moving object by increasing the PD since moving objects which would only be identified by a movement analysis of super-resolution images (procedures 252-256) or which would only be identified by a movement analysis of microscanned images (procedures 258-260) can now be identified simultaneously. The combination of the two movement indications of both super-resolution images and microscanned images also enhances motion detection by lowering the FAR as the two movement indications can further be used to correlate that an identified moving object in the super-resolution image in procedure 256 is indeed a moving object as determined in the data set (i.e., representative of a set of microscanned images) in procedure 260 and vice-versa. Furthermore, as mentioned above, procedures 258 and 260 can be used to determine an instantaneous angular velocity and angular acceleration of a moving object between two and three consecutive microscanned images. Practically speaking, motion detection methods and systems, including the disclosed technique, do not function using only a single microscan image. However the determination of the position, instantaneous angular velocity and instantaneous angular acceleration of a moving object can improve the performance of algorithms used in procedures 254-256 and procedures 258-260, especially in correlating a path of movement of a potential moving object over consecutive frames (be they microscanned image frames as data sets or super-resolution image frames). The determination of the position, instantaneous velocity and instantaneous acceleration of a moving object can also be used in predicting where the moving object will be in a subsequent frame, thus further reducing the FAR and reducing the time required to issue a warning about a moving object that might be a threat (depending on the circumstance and context where the disclosed technique is used). The determination of the instantaneous velocity and instantaneous acceleration of the moving object from two and three consecutive microscan images thus also contributes to the enhancement of motion detection as described in procedure 262. With reference to FIG. 8B, the instantaneous velocity and instantaneous acceleration determined for each set of microscanned images can be used to predict the position of the moving object in a subsequent set of microscanned images. For example, $v_1$ and $a_1$ determined for a first set of microscan images 362A (FIG. 8B) can be used to predict the position of the moving object in a second set of microscan images 362B (FIG. 8B), shown as a predicted position of moving object 380. It is noted that the predicted position of moving object 380 is further along the image scene than the position of moving object 364''' in first set of microscan images 362A. The predicted position of the moving object in the second set based on the analysis of the microscanned images in the first set enhances the motion detection as well as the object tracking of the moving object according to the disclosed technique.

In accordance with another embodiment of the disclosed technique (not shown), only an analysis of the microscanned images is performed (i.e., only procedures 250, 258 and 260). In this embodiment, at least one data set including at least two microscanned images is analyzed for spatial and temporal information in order to extract an instantaneous angular velocity estimate of a moving object. Such an embodiment might be used when the disclosed technique is used in a photogrammetry system for generating a single large or panoramic image of a scene of observation comprising a plurality of images (such as described below in FIGS. 9-10B). Such an embodiment can also be used, as described below, for generating a single large or panoramic image of a scene of observation wherein moving objects have been removed and only non-moving elements in the microscanned images are shown in the panoramic image. Information about the background can be determined from different microscanned images such that interpolation algorithms can be used to generate a static image of an aerial photograph. The single large or panoramic image is substantially a still image comprised of a plurality of images. According to the disclosed technique as described above in FIG. 6, a position estimate of a moving object as well as movement information (such as a movement indication) and an instantaneous angular velocity estimate of the moving object can be determined from a plurality of microscanned images, even from a single data set of microscanned images, even when there is technically only a single panoramic image frame. In accordance with a further embodiment of the disclosed technique, at least one data set including at least two microscanned images can be used in a photogrammetry system for generating a single large or panoramic image without any moving objects in the generated image, even if there were moving objects identified in the microscanned images. In this embodiment, the static areas of the acquired images are used to construct a still image without any identified moving objects in the constructed image. Due to the slightly different perspectives on the image scene from the acquired microscanned images, image information about the background of a moving object can be derived from different microscanned images. Thus, an identified moving object can be removed from the image to get a clean static image of an aerial photograph without any moving objects. An example of how background information can be derived from microscanned images is given below in FIG. 14.

Figure 7:
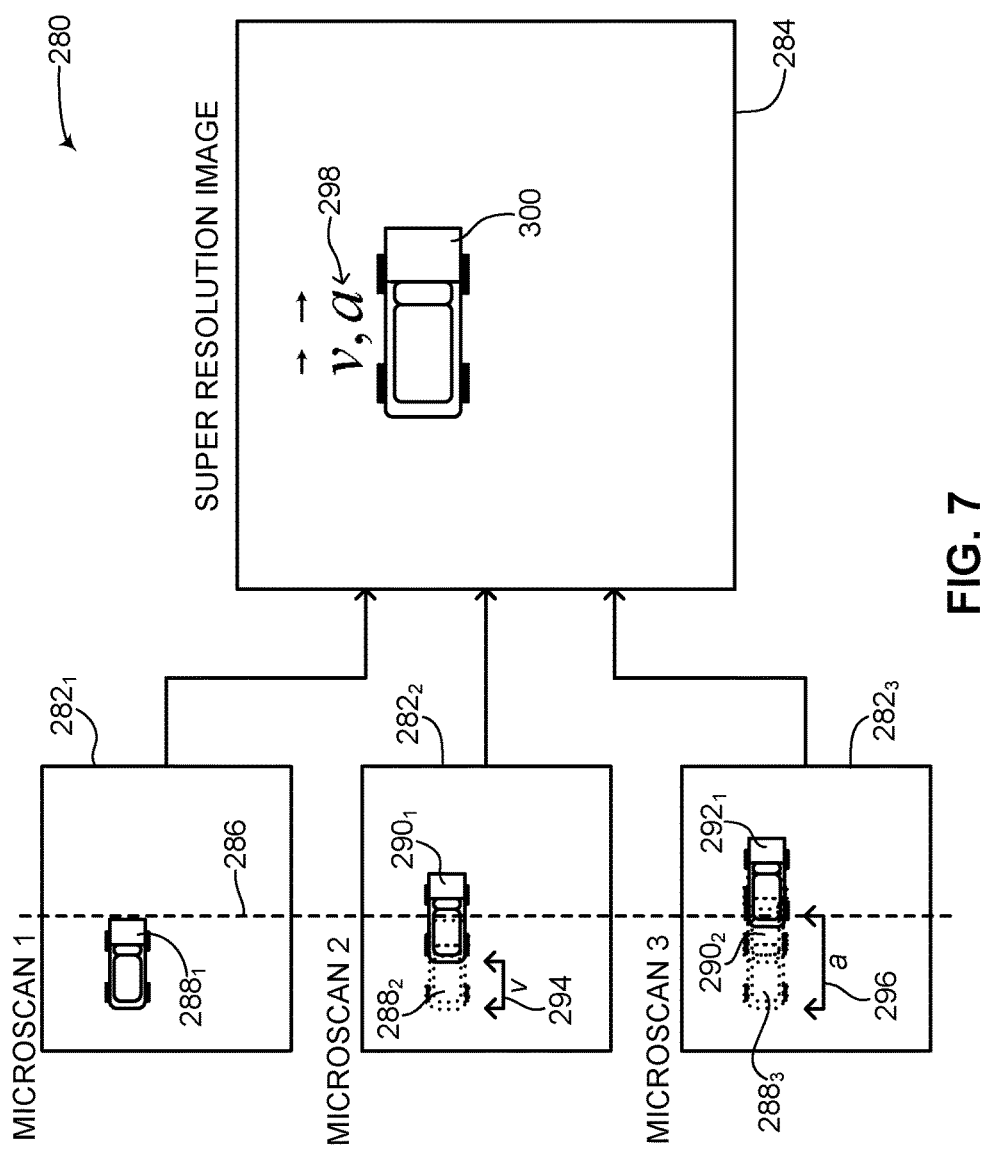
FIG. 7 is a graphic illustration of a first example using a plurality of microscanned images for enhancing motion detection, constructed and operative in accordance with a further embodiment of the disclosed technique.

Reference is now made to FIG. 7, which is a graphic illustration of a first example using a plurality of microscanned images for enhancing motion detection, generally referenced 280, constructed and operative in accordance with a further embodiment of the disclosed technique. FIG. 7 graphically shows how procedures 258 and 260 can be used to determine a position estimate and an instantaneous estimate of velocity and acceleration. It is noted that in procedures 258 and 260, images of the microscanned images may be formed however they are not images which have been processed and prepared for displaying to a user, as graphically shown in FIG. 7. These images may be images upon which processing and manipulations can be performed by the disclosed technique but are not meant for displaying. In procedures 258 and 260, a super-resolution image is not formed, however for the sake of explaining the disclosed technique, a super-resolution image is graphically shown in FIG. 7. The graphics shown in FIG. 7 are merely brought to better explain procedures 258 and 260 and should not be construed as limiting. As an example, three microscanned images of a scene are shown, a first microscan image $282_1$ (shown as microscan 1), a second microscan image $282_2$ (shown as microscan 2) and a third microscan image $282_3$ (shown as microscan 3). Each microscan image represents an image which is detected on a portion of a pixel for each pixel of an image detector (not shown). The LOS of the image detector to the scene is slightly changed or modified between microscan images, thereby generating slightly different images of the scene. Each one of microscan images $282_1$-$282_3$ shows a moving object which is captured in three slightly different positions. As an example, the moving object is shown as a vehicle and only one moving object is shown in the microscan images however the moving object may be any type or sort of moving object and a microscan image can include a plurality of moving objects. A reference line 286 which spans each of the shown microscan images is drawn to show the relative movement of the moving object between microscan images. An image detector may capture a plurality of microscanned images for forming a super-resolution image, wherein the plurality may be two microscan images, ten microscan images or even one hundred microscan images.

In microscan image $282_1$ a moving object $288_1$ is shown. In microscan image $282_2$ the moving object is now shown in an updated position $290_1$ with the previous position of moving object $288_1$ shown as a silhouetted position $288_2$. As can be seen, the moving object has advanced between microscan 1 and microscan 2. The movement and position of the moving object in each of microscan 1 and microscan 2 can be determined and the difference in position including the elapsed time between the capture of microscan 1 and microscan 2 can be used to determine the instantaneous angular velocity of the moving object. This is shown schematically via a double arrow 294, listing the letter 'v'.

In microscan image $282_3$ the moving object is again shown in an updated position $292_1$ with the previous positions of moving object $288_1$ shown as silhouetted positions $290_2$ (showing the position of the moving object in microscan 2) and $288_3$ (showing the position of the moving object in microscan 1). As can be seen, the moving object has advanced between microscan 2 and microscan 3. Using microscan images $282_1$-$282_3$, the movement, position and velocity of the moving object between each of microscans 1-3 can be determined and the difference in position and velocity including the elapsed time between the capture of microscans 1-3 can be used to determine the instantaneous angular acceleration of the moving object. This is shown schematically via a double arrow 296, listing the letter 'a'. Thus according to the disclosed technique, a minimum of two microscan images can be used to not only detect movement of objects in the microscan images but can also be used to determine the velocity of the moving object. Furthermore according to the disclosed technique, a minimum of three microscan images can be used to determine the acceleration of the moving object. Updated position $292_1$ can also be used to generate an updated determination of the velocity of the moving object. According to the disclosed technique, a super-resolution image may be formed minimally of two microscan images or three microscan images covering an entire image scene and in general, all the microscan images covering an entire image scene should be used when forming a super-resolution image. Thus in an imaging system where 9 microscan images cover an entire image scene, all 9 microscan images should be used in the construction of the super-resolution image. In an embodiment of the disclosed technique wherein the imaging system is used to construct a super-resolution image and also to enable a spatial and temporal analysis of the microscanned images, the imaging system should be designed such that at least two or at least three microscanned images cover the entire image scene. In the case of determining the velocity of a moving object, minimally at least two microscan images are required and in the case of determining the acceleration of a moving object, minimally at least three microscan images are required. In general, all the microscanned images of a given set of microscanned images are used to form a super-resolution image, however the aforementioned relates to the minimal number of microscanned images from which a super-resolution can be formed and from which spatial and temporal information can also be derived from. Due to the frame rate at which the microscan images are captured, the moving object overlaps between consecutive microscan images, thus enabling a temporal analysis to determine that the differences in the moving object between consecutive microscan images represent a single moving object and not different objects. It is noted that between two regular image frames or two super-resolution image frames constructed from microscan images, there may not be sufficient overlap of the moving object between consecutive images to enable a spatial and temporal analysis of the moving object to properly establish a path of movement of the moving object.

As described above in FIG. 6, acquired microscan images are analyzed for movement while also being used to construct a super-resolution image. Thus as shown, as the temporal information (position, velocity and acceleration) about the movement of the object in microscan images $282_1$-$282_3$ is extracted, the microscan images can be combined together to form a super-resolution image 284, which shows a higher resolution (i.e., super-resolution) image of a moving object 300. The super-resolution image is based on a combination of the captured moving object in the microscanned images (i.e., moving object $288_1$ and its two updated positions $290_1$ and $292_1$). As described below in FIGS. 12-14, based on the extracted temporal information from microscan images $282_1$-$282_3$, moving object 300 can be displayed with updated information regarding its angular velocity and acceleration, as shown by an arrow 298. Thus according to the disclosed technique, during the time it takes to construct a super-resolution image, an instantaneous estimate of the angular velocities and accelerations of moving objects, as well as an estimate of the positions of the moving objects, can be determined and once the super-resolution image is displayed, it can be displayed with the added information of a velocity and acceleration estimate for each detected and determined moving object.

Figure 8A:
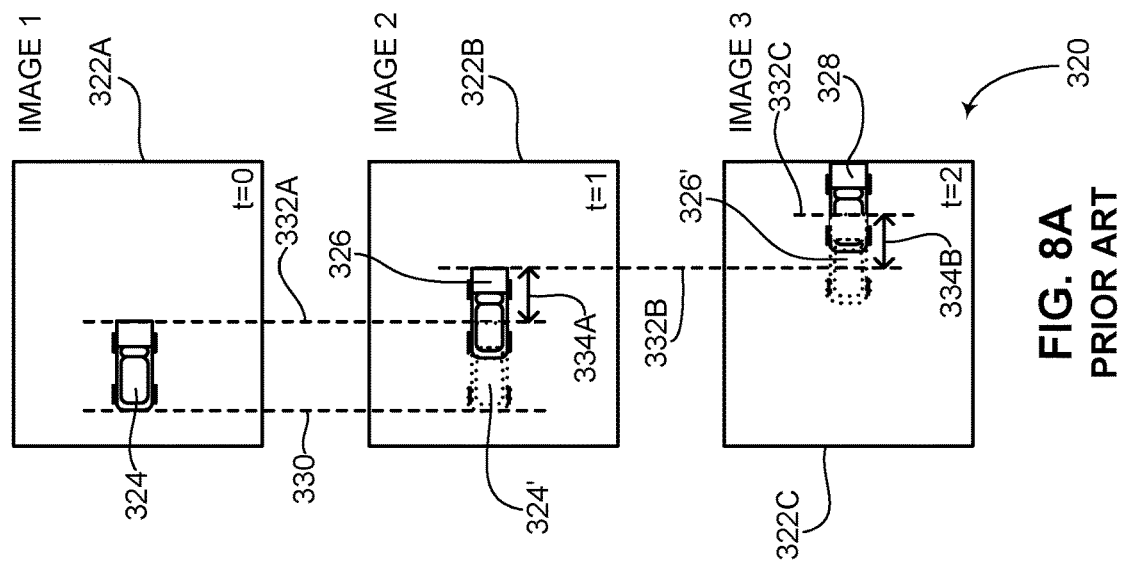
FIG. 8A is a graphic illustration of the prior art.

Reference is now made to FIG. 8A, which is a graphic illustration of the prior art, generally referenced 320. FIG. 8A shows how velocity estimates of moving objects are performed in known object tracking systems. For the purposes of illustration only three captured images are shown, a first image 322A (image 1), a second image 322B (image 2) and a third image 322C (image 3). Each image is captured by an image detector (not shown) of a tracking system. First image 322A is captured at time t=0, second image 322B is captured at time t=1 and third image 322C is captured at time t=2. In first image 322A a moving object 324 is detected and identified. Dotted lines 330, 332A, 332B and 332C which overlap the shown images are used to show the relative movement of moving object 324 between images. In first image 322A, dotted lines 330 and 332A delineate a length of moving object 324, shown as a vehicle, for example the vehicle's length. In second image 322B, the moving object has moved half the distance of its length. As shown, a moving object 324' shows the original position of the moving object in image 1 and a moving object 326 shows its current position in image 2. The distance moved by moving object 324 in image 1 and moving object 326 in image 2 is shown by an arrow 334A. The distance between dotted lines 332B and 332A is half the distance between dotted lines 332A and 330 in this example. The distance moved by the moving object between image 1 and image 2 and the difference in time between image 1 and image 2 is used to estimate the angular velocity of the moving object.

Based on the estimated velocity, the tracking system can make a prediction of where the moving object should be in image 3. As shown, a moving object 326' represents the estimated position of the moving object based on the velocity calculation performed using images 1 and 2. The distance moving object 326' has moved is shown by an arrow 334B representing a distance between dotted lines 332C and 332B, the same distance between dotted lines 332B and 332A. However as shown in image 3, the moving object has apparently accelerated (shown as a moving object 328) and its actual position is half a vehicle length longer than predicted by the tracking system as shown by moving object 326'. At this point, images 1-3 can be used to predict both the velocity and the acceleration of the moving object in a fourth image, however the lack of an estimate of the acceleration of the moving object in image 2 has led to an inaccurate prediction of the position of the moving object in image 3.

Figure 8B:
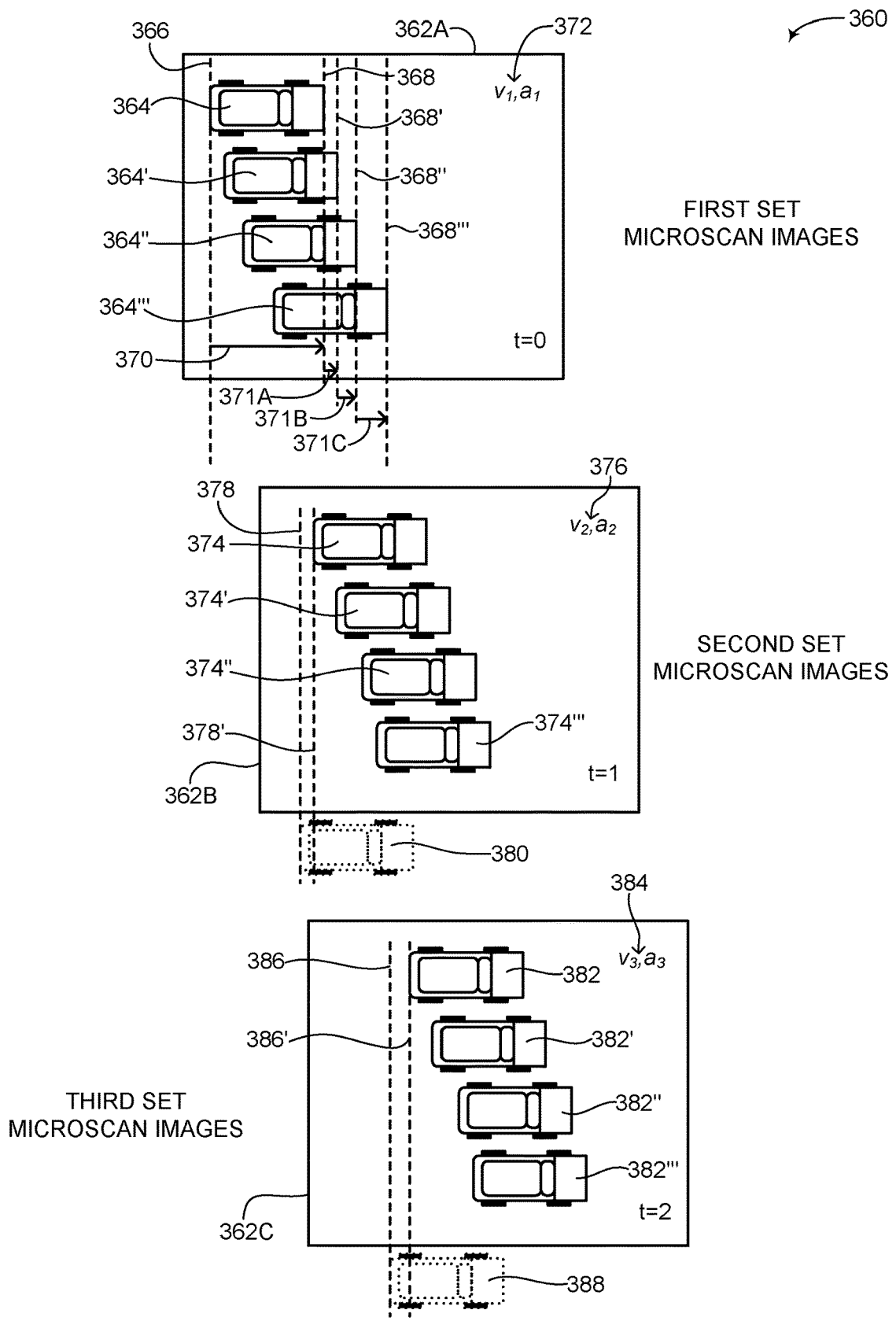
FIG. 8B is a graphic illustration of velocity and acceleration estimates for enhancing motion detection and the tracking of objects using microscanned images, constructed and operative in accordance with a further embodiment of the disclosed technique.

Reference is now made to FIG. 8B, which is a graphic illustration of velocity and acceleration estimates for enhancing motion detection and the tracking of objects using microscanned images, generally referenced 360, constructed and operative in accordance with a further embodiment of the disclosed technique. FIG. 8B shows how velocity and acceleration estimates are performed by a tracking system of the disclosed technique as compared to known tracking systems as shown in FIG. 8A. FIG. 8B shows three sets of microscan images, a first set 362A, a second set 362B and a third set 362C. Each set of microscan images can be combined together to form a super-resolution image at a given time. Each set of microscan images shows a plurality of microscan images captured of a moving object. For example, first set of microscan images 362A shows four microscan images of a moving object 364, second set of microscan images 362B shows four microscan images of the moving object in an updated position, shown as a moving object 374 and third set of microscan images 362C shows four microscan images of the moving object in a further updated position, shown as a moving object 382. Each set of microscan images shows four microscan images of the same moving object superposed on top of one another with each microscan image being positioned in a different vertically shifted position to clearly show the relative horizontal movement of the moving object between consecutive microscan images. As shown, first set 362A shows moving object 364 and its subsequent movement as a moving objet 364', a moving objet 364" and a moving objet 364'". An actual superposing of the four microscan images would show moving objects 364, 364', 364" and 364'" overlapping each other giving the impression of a blurred moving object. As mentioned, the overlapping of the moving object has been shifted vertically to show the different positions of the moving object within a given set of microscanned images. Second set 362B shows moving object 374 and its subsequent movement as a moving objet 374', a moving objet 374" and a moving objet 374'". Third set 362C shows moving object 382 and its subsequent movement as a moving objet 382', a moving objet 382" and a moving objet 382'". Note that the different sets of microscanned images are drawn one below the other for convenience. Moving object 364'" in the first set of microscanned images continues its movement in the second set of microscanned images and is thus drawn further to the right as moving object 374. The same is true for moving object 374'" and the third set of microscanned images showing moving object 382.

In first set of microscan images 362A, a first dotted line 366 is shown delineating a starting position of moving object 364. A set of subsequent dotted lines 368, 368', 368" and 368'" delineate a respective end position of each of moving objects 364, 364', 364" and 364'". A distance between first dotted line 366 and dotted line 368 is shown an arrow 370. A distance between each of dotted lines 368, 368', 368" and 368'", graphically showing the acceleration of the moving object in the first set of microscans, is shown via a respective plurality of arrows 371A, 371B and 371C. Even though first set of microscan images 362A are shown being captured at a time t=0, each microscan image is captured at a slightly different time. The difference in position between moving object 364' and moving object 364 can be used to determine an instantaneous velocity of the moving object, as can the difference in position between moving object 364" and moving object 364' and between moving object 364'" and moving object 364". Furthermore, the difference in position between moving object 364" and moving object 364 can be used to determine an instantaneous acceleration of the moving object as can the difference between moving object 364'" and moving object 364'. These differences can also be used to determine updated velocity estimates of the moving object per microscan image. As shown, the lengths of plurality of arrows 371A-371C are all different and the relative difference between their respective lengths is also different, implying that moving object 364 accelerates within first set 362A. Using the method as described above in FIG. 6 (in particular, procedures 258 and 260), the various velocity and acceleration calculations between the microscan images in first set 362A can be used to determine a current velocity and acceleration of moving object 364, shown as $v_1$ and $a_1$ by reference number 372. As noted above, even though the moving object is graphically shown having linear movement, its change in position is a result of the perpendicular component of its angular velocity in relation to the LOS of the image detector which generated each of the microscanned images.

Using the estimated velocity and acceleration calculations as shown in first set 362A, a prediction of where the moving object will be in second set 362B can be made. A second dotted line 378 shows the start position of a predicted position of a moving object 380 whereas a subsequent dotted line 378' shows the actual start position of moving object 374. As shown in first set 362A, similar calculations and determinations of the instantaneous velocity and acceleration can be made in second set 362B using the various positions of moving objects 374, 374', 374" and 374'". These calculations are not shown in second set 362B as they were shown in first set 362A to keep second set of microscan images 362B less cluttered in FIG. 8B. Second set 362B shows a plurality of microscan images which together can be combined into a super-resolution image taken at time t=1. An updated current velocity and acceleration calculation $v_2$ and $a_2$ shown by a reference number 376 is listed taking into account all the instantaneous velocity and acceleration calculations which are possible in second set 362B as described above regarding first set 362A.

Just between first set 362A and second set 362B at least two differences between the disclosed technique and the prior art as shown in FIG. 8A can be seen. A first difference is that within a single image frame (for example, first set of microscan images 362A), an estimate of the angular velocity and angular acceleration of a moving object can be performed such that already in a second image frame (for example, second set of microscan images 362B) a prediction of the position, angular velocity and angular acceleration of a moving object can be made. In the prior art, at least two image frames are required to determine a velocity such that a prediction of the position and velocity can be made in a third image frame, whereas according to the disclosed technique, the microscan images forming a first image frame (such as a super-resolution image) can be used to predict a position, velocity and acceleration in a second image frame. A second difference is that the disclosed technique provides a significant increase in accuracy of the prediction of position, velocity and acceleration over the prior art. As can be seen in second set 362B, the difference in position between moving object 374 and the predicted position of moving object 380 is significantly smaller as compared with the position of moving object 328 (FIG. 8A) and the estimated position of moving object 326' (FIG. 8A). Even though in FIG. 8A there is still overlap between moving objects 326 (FIG. 8A) and 328 and a prior art system may identify those moving objects as the same moving object, in a slower frame rate system (and/or with a faster moving object) this overlap might not exist thus a prior art system might not identify these two objects as actually being the same moving object.

Using the estimated velocity and acceleration calculations as shown in second set 362B, an updated prediction of where the moving object will be in third set 362C can be made. A third dotted line 386 shows the start position of a predicted position of a moving object 388 whereas a subsequent dotted line 386' shows the actual start position of moving object 382. As shown in first set 362A, similar calculations and determinations of the instantaneous velocity and acceleration can be made in third set 362C using the various positions of moving objects 382, 382', 382" and 382'". Similar to second set 362B, these calculations are not shown in third set 362C to keep third set of microscan images 362C less cluttered in FIG. 8B. Third set 362C shows a plurality of microscan images which together can be combined into a super-resolution image taken at time t=2. An updated current velocity and acceleration calculation $v_3$ and $a_3$ shown by a reference number 384 is listed taking into account all the instantaneous velocity and acceleration calculations which are possible in third set 362C as described above regarding first set 362A. As can be seen, by using an updated calculation of the velocity and acceleration of the moving object in second set 362B, the difference between the predicted position of moving object 388 compared to the actual position of moving object 382 is minimal as compared to the prior art calculation as shown in FIG. 8A. This minimal difference improves the ability to recognize that images of moving objects belong to the same physical moving object, and thus improves the tracking of the moving object by improving the execution of a detection or tracking algorithm for correlating a logical path movement of a moving object over consecutive microscan images. As mentioned above, FIG. 8B graphically illustrates how velocity and acceleration estimates can be derived from acquired microscan images, however actual microscan images for display do not need to be formed to make such determinations. In FIG. 6 procedures 258 and 260, estimating the velocity and acceleration of potential moving objects, as part of analyzing each data set for spatial and temporal information, is performed on data sets or images which represent the microscan images however such images are not meant for displaying to a user.

Figure 9:
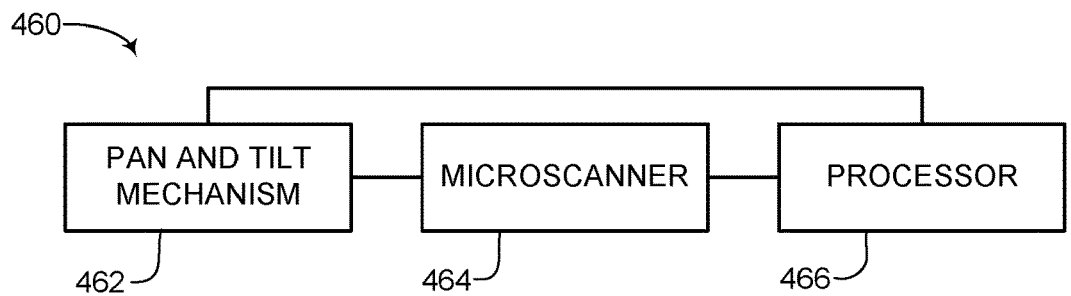
FIG. 9 is a schematic illustration of a system for increased situational awareness using super-resolution images, constructed and operative in accordance with a further embodiment of the disclosed technique.

Reference is now made to FIG. 9, which is a schematic illustration of a system for increased situational awareness using super-resolution images, generally referenced 460, constructed and operative in accordance with a further embodiment of the disclosed technique. System 460 enables wide area situational awareness to be implemented using a single image detector that can capture microscan images and form super-resolution images. Situational awareness systems are used for surveillance and generally require wide area coverage (i.e., wider than is possible with a single image detector at a fixed position) while also generating high resolution images. Prior art situational awareness systems can achieve high resolution images with wide area coverage by either employing a cluster of high resolution image detectors or via the use of a sophisticated pan-and-tilt mechanism using a single high resolution image detector. The first system of the prior art involves an increase in costs since high resolution image detectors are expensive (such as high resolution mid-wavelength infrared (MWIR) sensors) and this system requires many of them to achieve wide area coverage. The second system of the prior art also involves an increase in costs since the pan-and-tilt mechanism may be expensive to ensure that a desired refresh rate of the surveyed scene is achieved. Such an approach might also reduce the system's overall reliability. The disclosed technique as shown in system 460 obviates the need for expensive high resolution image detectors and expensive pan-and-tilt mechanisms, thereby providing a cost effective simple scanning mechanism combined with a super-resolution image generated by a rapid acquisition sensor, as described below.

System 460 includes a pan-and-tilt mechanism 462, a microscanner 464 and a processor 466. Microscanner 464 is coupled with both pan-and-tilt mechanism 462 and with processor 466. Pan-and-tilt mechanism 462 is also coupled with processor 466. Pan-and-tilt mechanism 462 can be an off-the-shelf product and does not need to be of excessive quality as explained below. Microscanner 464 can be any image detector capable of performing microscanning, such as apparatus 100 (FIG. 1), a system capable of implementing the various steps shown in block diagram 220 (FIG. 5B) or any other known microscanning image detector. Microscanner 464 may be a high frequency microscanner, a high frequency detector or even a combination of the two, where high frequency means an image capture frequency of 100 Hz or higher. Microscanner 464 can any known combination of an image detector and at least one optical element, and any other elements needed, if necessary, to acquire microscan images (such as a LOS shifting mechanism). It is noted as well that in one embodiment, microscanner 464 does not need to be part of an image detector and may be implemented using a moving mask and does not need to be limited to microscanners which optically shift the line-of-sight between the image detector and the scene of observation.

Microscanner 464 is used to capture a plurality of microscanned images of a portion of a wide area scene to be surveyed. The plurality of microscanned images are provided to processor 466 which can derive a plurality of super-resolution images based on the microscanned images. Once microscanner 464 has captured sufficient microscanned images (i.e., at least two) of the wide area scene to be surveyed to form a super-resolution image, pan-and-tilt mechanism 462 moves microscanner 464 to another portion of the wide area scene. Microscanner 464 then captures another plurality of microscanned images and provides them to processor 466 for forming another super-resolution image. Once pan-and-tilt mechanism 462 has moved microscanner 464 to capture microscanned images of the entire wide area scene and processor 466 has generated super-resolution images of different portions of the wide area scene, processor 466 stitches together all the super-resolution images generated to generate a panoramic super-resolution image of the wide area scene to be surveyed. Pan-and-tilt mechanism 462 then moves microscanner 464 back to its initial position for generating an updated plurality of microscanned images and super-resolution images of the wide area scene.

It is noted that in an alternative (not shown) to system 460, the microscanner and the pan-and-tilt mechanism can be replaced by a pan-and-tilt mechanism (not shown) without a dedicated microscanner. In such a setup, a regular image detector can be used having a smaller FOV in which the pan-and-tilt mechanism uses its scanning mechanism to perform step-and-stare scanning at the same resolution and FOV of system 460. For example, if system 460 performs a 3×3 microscanning pattern wherein each detector pixel receives 9 different sub-pixel images, the alternative system described above may be designed such that the image detector has a FOV three times smaller (in each dimension) than the FOV of system 460 and the pan-and-tilt mechanism would then perform a 3×3 scanning pattern of the whole FOV for each pan-and-tilt position. Such a scanning pattern would thus be equivalent to the scanning pattern of a microscanner thereby enabling an image to be formed over the same FOV without a microscanner. In this embodiment, a regular and basic image detector can be used (thus obviating the need for an expensive high resolution image detector) however an expensive pan-and-tilt mechanism will be required in order to properly execute the scanning pattern of the image detector such that it is equivalent to the scanning pattern of a microscanner. It is noted that the disclosed technique as compared to this embodiment provides for a significantly higher capture rate of images because with step-and-stare scanning only several captured images are possible per second. The disclosed technique also enables the capabilities of enhanced VMD described above in FIGS. 5B and 6 as compared to VMD on a super-resolution image formed using the above mentioned embodiment.

By using a microscanner to capture images of the wide area scene, the use of a plurality of expensive image detectors (IR or visible) can be obviated since the microscanner can produce high resolution images via image processing in processor 466 without requiring special, complex and/or expensive detectors and/or lenses. Furthermore, since a microscanner is used to capture images of the wide area scene, each formed image includes many more pixels than in a standard pan-and-tilt system, thus fewer capture positions are required to cover the entire wide area scene. This can be translated into a simpler pan-and-tilt system as compared to the prior art. For example, known in the art are wide area motion imaging systems which use an image detector having a pixel array of 640×480 pixels. Such a known system may include gimbals to pan and tilt the image detector to cover a wide area scene and may enable the imaging system to pan and tilt between 81 different stare positions to generate a panoramic image having an effective resolution of around 2.7 megapixels. In order to enable 81 different stare positions with a reasonable refresh rate of a few hertz, such an imaging system requires a high-end and complex gimbals to accurately and rapidly move the image detector over the various stare positions. In this respect, the refresh rate of the imaging system is the rate at which the imaging system can pan and tilt between its different stare positions and return to an initial stare position. Thus in the example given above, the refresh rate is the time it takes the imaging system to cycle through all 81 stare positions before returning to its initial stare position. In contrast, using the disclosed technique with a similar image detector having a pixel array of 640×480 pixels, wherein the image detector captures microscanned images in a 3×3 pattern (thus 9 microscan images per stare position), each stare position can produce a super-resolution image having an effective resolution of around 2.7 megapixels. Thus with around 9 different stare positions, the imaging system of the disclosed technique can cover the same wide area scene as compared to the prior art, either at a substantially higher refresh rate (since fewer stare positions have to be cycled through for the imaging system to return to its initial stare position) and/or with a simpler, less expensive and smaller gimbals. In addition, by using a microscanner which captures microscanned images of the wide area, thus shortening the integration time (as well as the f-number) as compared to a regular image detector, more flexibility can be afforded regarding the stability requirements of such a system. Based on the above explanations, an off-the-shelf pan-and-tilt mechanism can be used to change the capture position of the microscanner, thus obviating the need for an expensive pan-and-tilt mechanism. All that is required of the microscanner in this embodiment of the disclosed technique is that it be of sufficiently high quality to accurately construct a high quality image of the wide area scene. Thus according to the disclosed technique, situational awareness of a wide area scene can be implemented using microscanned images resulting in a cost effective detection system and thus increasing the situational awareness capabilities of a detection system.

It is noted that system 460 can be used with the method described above in FIG. 6. However in such an embodiment, the analysis of consecutive super-resolution images for a respective first movement indication (procedures 254 and 256 in FIG. 6) must be executed for consecutive super-resolution images which are constructed when the microscanner is in the same position and field-of-view vis-à-vis the wide area scene. Thus, if microscanner 464 is moved by pan-and-tilt mechanism 462 between five different positions, only consecutive super-resolution images in the same position are analyzed to determine a respective first movement indication. Thus after a first super-resolution image is constructed, four more super-resolution images will be constructed before a second super-resolution is constructed in the same position as the initial super-resolution image. Such an operation increases the time required to determine a first movement indication according to the scanning rate of pan-and-tilt mechanism 462.

Figure 10A:
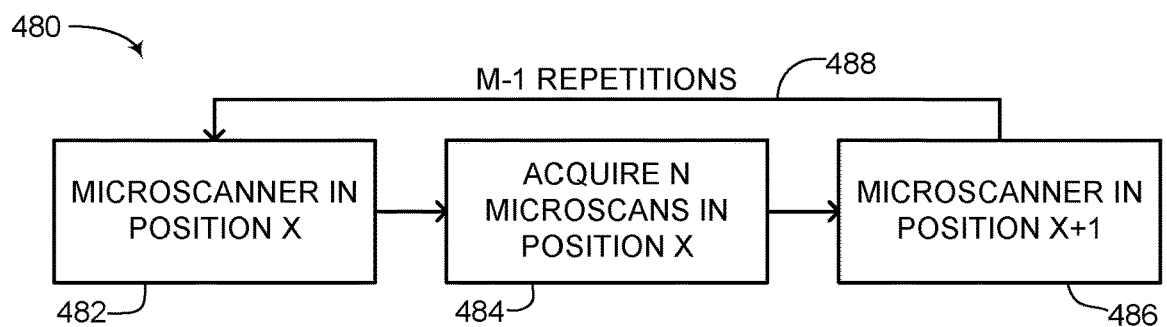
FIGS. 10A and 10B are block diagram illustrations of a method for increased situational awareness capabilities using super-resolution images, constructed and operative in accordance with another embodiment of the disclosed technique.
Figure 10B:
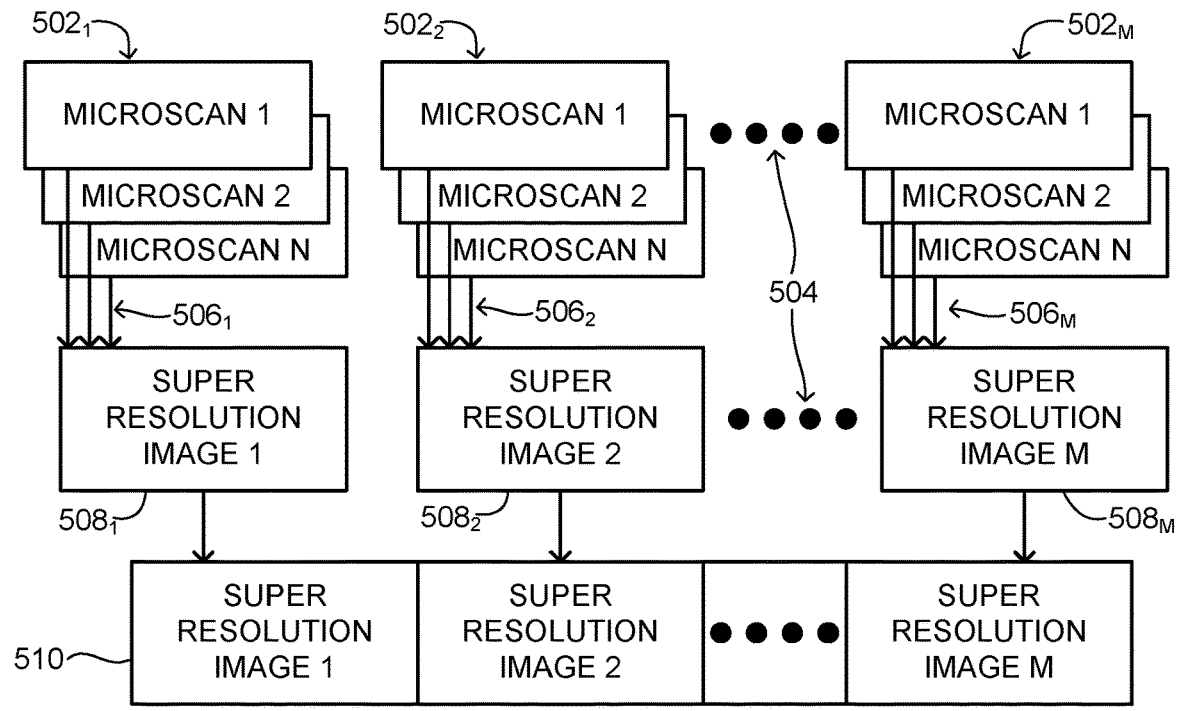

Reference is now made to FIGS. 10A and 10B, which are block diagram illustrations of a method for increased situational awareness capabilities using super-resolution images, generally referenced 480 and 500 respectively, constructed and operative in accordance with another embodiment of the disclosed technique. Both of block diagrams 480 and 500 graphically show the method described above in FIG. 9, implemented by system 460 (FIG. 9). With reference to FIG. 10A, a block 482 shows that a microscanner is positioned in a first position to capture images of a wide area scene. This position is denoted as position X. In a block 484, N microscanned images are acquired of the wide area scene in position X, where N is at least 2. In a block 486, the microscanner is moved to position X+1 where again N microscanned images are acquired of the wide area scene. This process is repeated M−1 times, as shown by an arrow 488, until the entire wide area scene has been imaged. In general, M is also at least 2. Thus as shown, N microscanned images are captured at each position M such that N×M microscanned images are captured in total of the wide area scene. As shown in greater detail below in FIG. 10B, at each position M, the N microscan images which are captured are generated into a respective super-resolution image, thus forming M super-resolution images of the wide area scene. The M super-resolution images can then be stitched together to form a panoramic super-resolution image of the entire wide area scene to be surveyed. By using super-resolution images to implement situational awareness, fewer images are required to be stitched together to cover an entire wide area scene as compared with prior art methods. The requirement of fewer images can be translated into a simpler scanning mechanism as compared with the prior art thereby increasing the situational awareness capabilities of a detection system. For example, the microscanner in a given position might perform a 3×3 microscanning pattern and the pan-and-tilt mechanism might change the FOV of the entire system over a 3×3 area (meaning three pan positions and three tilt positions). Such a system would be equivalent to a prior art situational awareness system without a microscanner performing 81 scans of a scene of observation. A pan-and-tilt mechanism capable of scanning 81 different positions in a short amount of time to continuously update a panoramic image of a scene of observation is complex and expensive. The disclosed technique only requires the pan-and-tilt mechanism to scan between 9 different positions, thus resulting in a simpler scanning mechanism as compared to the prior art.

With reference to FIG. 10B, a plurality of N acquired microscan images at M positions is shown. For example, block $502_1$ shows N microscan images at a first position, block $502_2$ shows N microscan images at a second position and block $502_M$ shows N microscan images at an $M^{th}$ position. A plurality of ellipses 504 is shown delineating that the plurality of microscanned images can be acquired at a plurality of positions. The N microscan images at each position are respectively combined into a super-resolution image at the given position at which the plurality of microscanned images was captured. This is graphically shown by plurality of arrows $506_1$, $506_2$ and $506_M$. Block $502_1$ of N microscan images is formed into a first super-resolution image $508_1$, block $502_2$ of N microscan images is formed into a second super-resolution image $508_2$ and block $502_M$ of N microscan images is formed into an $M^{th}$ super-resolution image $508_M$. As shown, the M super-resolution images can be combined into a panoramic super-resolution image 510 of the wide area scene to be surveyed.

The system and methods described in FIGS. 9-10B relate to step-and-stare surveillance systems and methods. It is noted that step-and-stare surveillance systems and methods cycle through a finite number of stare positions or FOVs, since in theory such systems could have endless different stare positions. The various stare positions are usually pre-defined and may slightly overlap and the imaging system in such a setup "steps" (i.e., moves) cyclically, or periodically, from stare position (i.e., FOV) to stare position in a pre-defined order. The refresh rate of such an imaging system is thus the periodic rate at which the imaging system cyclically steps through each of its stare positions and then returns to an initial stare position before cycling through all the stare positions again. In the case of the disclosed technique, each step of the pan-and-tilt mechanism moves the LOS of the entire imaging system to a different portion of the wide area scene to be imaged, wherein in each position, microscanned images are captured in order to form a super-resolution of that portion. The stare time at each step is the amount of time required by the microscanner to acquire sufficient microscanned images to form a super-resolution image. The entire imaging system is moved over M positions to cover the entire wide area to be surveyed and is then moved over the same M positions to repeatedly update the panoramic super-resolution image of the wide area to be surveyed, thus implementing increased situational awareness capabilities through the use of microscanned images. The disclosed technique described above in FIGS. 9-10B relates to all kinds of wide area scenes to be surveyed and can be a panoramic image as well as an aerial photogrammetry image.

Figure 11A:
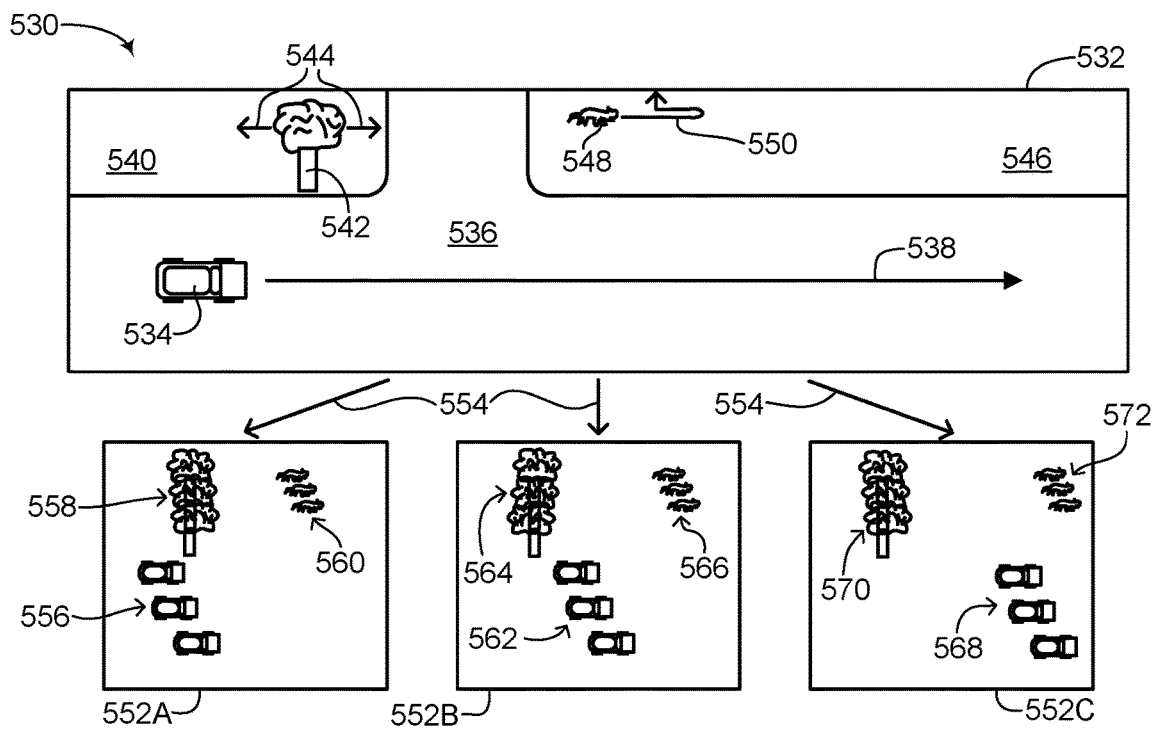
FIGS. 11A-11C are graphic illustrations showing issues in generating super-resolution video from a plurality of microscanned images, constructed and operative in accordance with a further embodiment of the disclosed technique.
Figure 11B:
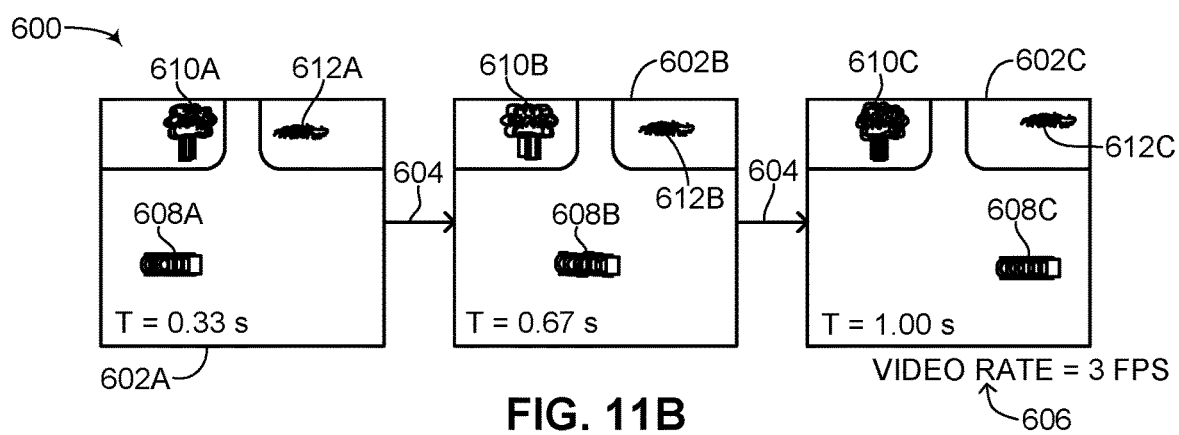
Figure 11C:
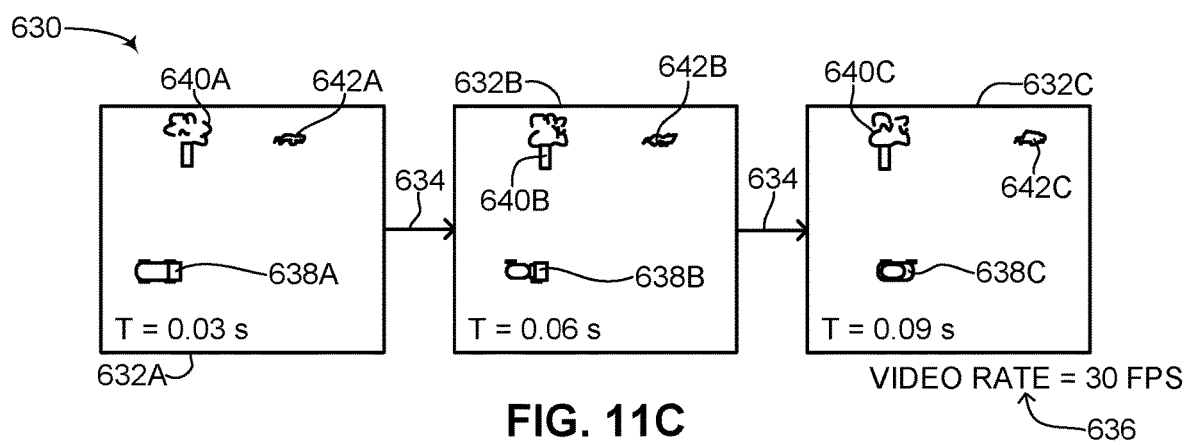

Reference is now made to FIGS. 11A-11C, which are graphic illustrations showing issues in generating super-resolution video from a plurality of microscanned images, constructed and operative in accordance with a further embodiment of the disclosed technique. With reference to FIG. 11A, generally referenced 530, shown is a scene of observation 532 which includes a plurality of moving objects. FIG. 11A shows a road 536, a first sidewalk 540 and a second sidewalk 546. A vehicle 534 is shown moving on road 536 along the path shown by an arrow 538. A tree 542 is shown on first sidewalk 540 which is blowing in the wind. The swaying motion of tree 542 is shown via a plurality of arrows 544. An animal 548 is shown on second sidewalk 546. Animal 548 is shown moving along the path shown by an arrow 550. Using an image detector (not shown) capable of microscanning, three sets of captured microscanned images are shown via a plurality of arrows 554, a first set of microscanned images 552A, a second set of microscanned images 552B and a third set of microscanned images 552C. Each set of captured microscanned images show three microscanned images each of which have been superposed and positioned in slightly different vertical positions to avoid overlap of the microscanned images and to show the slight differences in movement of each one of the plurality of moving objects. In first set of microscanned images 552A, vehicle 534 is shown advancing in the direction of arrow 538 as denoted by an arrow 556, tree 542 is shown swaying in a rightward direction of one of plurality of arrows 544 as denoted by an arrow 558 and animal 548 is shown advancing in the direction of arrow 550 as denoted by an arrow 560. In second set of microscanned images 552B, vehicle 534 is shown advancing further in the direction of arrow 538 as denoted by an arrow 562, tree 542 is shown now swaying in a leftward direction of the other one of plurality of arrows 544 as denoted by an arrow 564 and animal 548 is shown further advancing in the direction of arrow 550 as denoted by an arrow 566. This is shown by arrow 566 in second set of microscanned images 552B where each microscan image shows animal 548 further advancing forward. In third set of microscanned images 552C, vehicle 534 is again shown advancing further in the direction of arrow 538 and has almost exited the captured image frames as denoted by an arrow 568. Tree 542 is shown now swaying again in a rightward direction as denoted by an arrow 570 and animal 548 is shown further advancing in the direction of arrow 550 as denoted by an arrow 572. As can be seen in third set of microscanned images 552C, animal 548 has now also almost exited the captured image frames.

As described above, the data sets forming the three sets of microscanned images shown can be used to generate super-resolution images and can also be used to enhance motion detection of vehicle 534, tree 542 and animal 548 as well as object tracking once those moving objects have been detected. According to the disclosed technique, since each set of microscanned images comprises a plurality of captured images showing slightly different movement of moving objects, it should be possible to play the microscanned images as video and thereby use an image detector with microscanning capabilities to generate video of moving objects. However simply playing microscanned images as video presents two different tradeoffs, neither of which is ideal. Reference is now made to FIG. 11B, generally referenced 600, which shows a first tradeoff in playing microscanned images as video. In this tradeoff, microscanned images in each of the microscanned images are combined to generate super-resolution images which are then played as video. FIG. 11B shows three image frames which are to be played as video, a first image frame 602A, a second image frame 602B and a third image frame 602C. First image frame 602A represents a super-resolution image formed from first set of microscanned images 552A (FIG. 11A), second image frame 602B represents a super-resolution image formed from second set of microscanned images 552B (FIG. 11A) and third image frame 602C represents a super-resolution image formed from third set of microscanned images 552C (FIG. 11A). First, second and third image frames 602A-602C are played in succession as shown by a plurality of arrows 604. The first tradeoff or challenge with playing super-resolution images as video is that the processing time for generating a super-resolution image from microscanned images may be too high to generate a fast enough video rate for a human viewer to properly perceive a continuously moving object. In general, a video rate of about 30 frames per second (herein abbreviated FPS) is required in order for human viewers to perceive consecutively shown images of a moving object as video. In the example shown in FIG. 11B, it takes about a third of a second to generate a super-resolution image from each set of microscanned images. Therefore, first image frame 602A is shown at a time of 0.33 seconds, second image frame 602B is shown at a time of 0.67 seconds and third image frame 602C is shown at a time of 1.00 seconds. This results in a video rate of 3 FPS which will not be perceived by a human viewer as continuous video, as shown by an arrow 606. Playing the three super-resolution images as video will show high quality images of the movement of objects moving in the scene of observation but due to the low video rate, the moving objects in the captured microscan images as video will appear to jump across the image frames. Another challenge or issue in playing super-resolution images as video is that the process of generating super-resolution images in which there are moving objects within a single data set of microscanned images may cause blurring of the moving objects in the generated super-resolution image. This issue can also be referred to as image artifacts. Even though combining microscanned images together into a single image may increase the sampling frequency, such an image will only be artifact free if none of the objects in the combined image move over the time period the microscanned images are captured which form the combined image. In object detection and tracking systems, such an assumption of the movement of objects is unreasonable as objects may move from microscan image to microscan image. As shown in first image frame 602A, the vehicle is shown as a blurred vehicle 608A, the tree is shown as a blurred tree 610A and the animal is shown as a blurred animal 612A. Likewise for second image frame 602B, the vehicle is shown as a blurred vehicle 608B, the tree is shown as a blurred tree 610B and the animal is shown as a blurred animal 612B and for third image frame 602C, the vehicle is shown as a blurred vehicle 608C, the tree is shown as a blurred tree 610C and the animal is shown as a blurred animal 612C. Thus playing super-resolution images as video which is derived from sets of microscanned images may lead to video which includes image artifacts and which is played at too slow a video rate for video to be perceived and viewed by human viewers.

Reference is now made to FIG. 11C, generally referenced 630, which shows a second tradeoff in playing microscanned images as video. In this tradeoff, the microscanned images in each set of microscanned images are played continuously as video. FIG. 11C shows three image frames which are to be played as video, a first image frame 632A, a second image frame 632B and a third image frame 632C. First, second and third image frame 632A-632C represent the three microscanned images shown in first set of microscanned images 552A (FIG. 11A) and are played in succession as shown by a plurality of arrows 634. In this tradeoff or challenge, image frames may be shown at a fast enough video rate for a human viewer to properly perceive a continuously moving object, for example at 30 FPS as shown by an arrow 636. As shown first image frame 632A is shown at a time of 0.03 seconds, second image frame 632B is shown at a time of 0.06 seconds and third image frame 632C is shown at a time of 0.09 seconds. However, since microscanned images are low resolution images as compared to high resolution images, the resolution of the shown video may be compromised and of low quality when increased in size to fill the viewing area of a screen. In the example shown in FIG. 11C, each microscanned image is played at a thirtieth of a second (i.e., resulting in a video rate of 30 FPS), however the image quality of each microscanned image is of lower resolution as compared to high resolution images, thus resulting is lower image quality. As shown, in first image frame 632A, the vehicle is shown as a low quality image of vehicle 638A, the tree is shown as a low quality image of tree 640A and the animal is shown as a low quality image of animal 642A and compared to the original images shown in FIG. 11A, the low quality images shown in FIG. 11C are missing some of the image data. Likewise for second image frame 632B, the vehicle is shown as a low quality image of vehicle 6388, the tree is shown as a low quality image of tree 640B and the animal is shown as a low quality image of animal 642B and for third image frame 632C, the vehicle is shown as a low quality image of vehicle 638C, the tree is shown as a low quality image of tree 640C and the animal is shown as a low quality image of animal 642C. On the one hand, playing microcanned images individually as video enables video to be played at a proper video rate for human viewers without any image artifacts, however the played video will be of lower quality and may not discern sufficient details in object detection and motion tracking systems to be of substantial use, for example for security systems.

According to the disclosed technique, a system and method are disclosed wherein microscan images can be rapidly updated and presented to a viewer without image artifacts and with sufficient resolution quality thus providing the viewer with the semblance of contiguous movement and continuous imagery as expected in video. The disclosed technique relies on the viewer's innate ability to interpolate rapid imagery both temporally and spatially. According to the disclosed technique, consecutive microscan images are displayed to a user, thereby improving the perceived quality of moving objects in the viewed video, however without image artifacts and with sufficient resolution quality. In addition, the disclosed technique enables super-resolution images to be displayed without any blurring of moving objects in the constructed super-resolution image.

Figure 12:
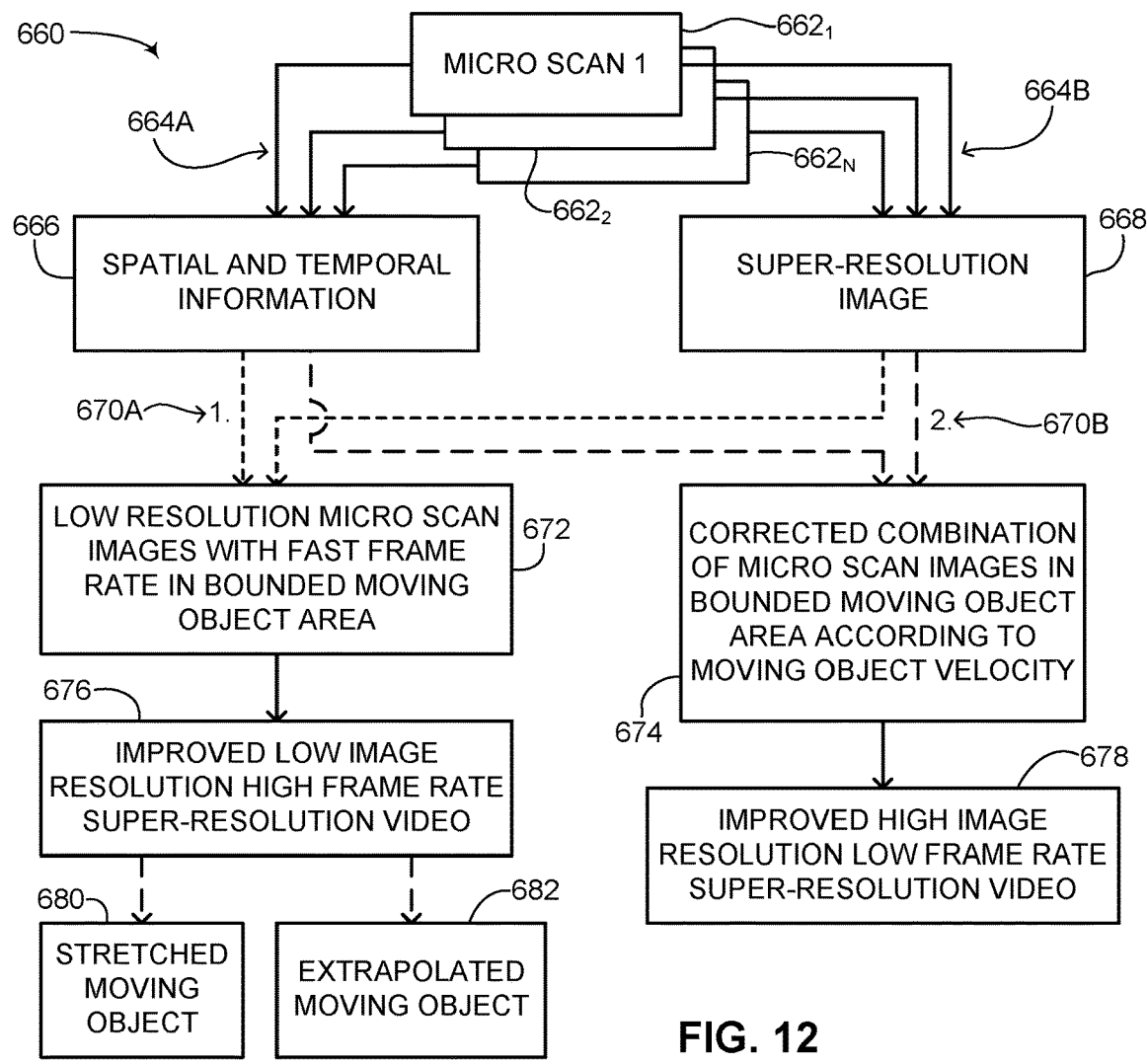
FIG. 12 is a block diagram illustration of a method for presenting enhancing motion detection and the tracking of objects using microscanned images, operative in accordance with another embodiment of the disclosed technique.

Reference is now made to FIG. 12, which is a block diagram illustration of a method for presenting enhancing motion detection and the tracking of objects using microscanned images, generally referenced 660, operative in accordance with another embodiment of the disclosed technique. The general method shown in FIG. 12 shows two separate methods for overcoming the issues of generating and displaying super-resolution images and video as presented above in FIGS. 11A-11C. In one method, hybrid super-resolution video is constructed displaying a super-resolution background with a portion of the video displaying high frame rate targets (e.g., fast moving objects) in the imaged scene of observation at low resolution. In this hybrid presentation, high frame rate video of identified moving targets is displayed at low resolution in a portion of the displayed images whereas the background (which is assumed to be static) is displayed as a super-resolution image. This is described in FIG. 12 as a first method 670A and in further detail below in FIGS. 13A and 13B. In another method, a hybrid super-resolution image is constructed with reduced image artifacts taking into account the instantaneous velocity estimates of any moving objects. In this hybrid presentation, low frame rate video is displayed at high resolution over the entire displayed image. This is described in FIG. 12 as well as a second method 670B and in further detail below in FIG. 14.

Block diagram 660 of FIG. 12 is somewhat similar to block diagram 220 (FIG. 5B) and shows the general steps of how microscanned images, used to form a super-resolution image can be displayed without image artifacts and also can be used to show video of moving objects within a super-resolution image. As shown, a plurality of microscanned images $662_1$-$662_N$ is acquired. Plurality of microscanned images $662_1$-$662_N$ can represent M sets of microscanned images where each set is sufficient for constructing a super-resolution image. For example, each set may include at minimum two microscanned images or as many as N microscanned images for forming a super-resolution image. Regardless of what N is equal to, each set of microscanned images should cover the entire scene of observation to be imaged. As described above, microscanned images $662_1$-$662_N$ can be acquired in a number of different ways and do not necessarily need to come from a microscanner. According to the disclosed technique, microscanned images $662_1$-$662_N$ are used for two simultaneous procedures shown by a first plurality of arrows 664A and a second plurality of arrows 664B and can then be used based on those two simultaneous procedures for two separate methods for displaying a super-resolution image and video as per the disclosed technique. It is noted that the procedures of the two methods can occur in parallel, meaning that the amount of time required to execute each method may be different however regardless the methods can be executed simultaneously. The first method, shown by an arrow 670A and marked as method 1., enables the display of improved super-resolution video at a high video frame rate (albeit at low image resolution) wherein the background portion of the video is displayed at super-resolution while also displaying high frame rate targets in the imaged scene of observation at low resolution. The second method, shown by an arrow 670B and marked as method 2., enables the display of improved super-resolution video at a low video frame rate (albeit at high image resolution).

In the procedure following first plurality of arrows 664A, microscanned images $662_1$-$662_N$ are individually analyzed for spatial and temporal information, as shown by a block 666. In this procedure, microscanned images $662_1$-$662_N$ are not formed into a super-resolution image but are individually analyzed as separate images for spatial and temporal information using object motion detection and tracking algorithms. This includes determining potential moving objects between consecutive microscanned images and also determining movement paths of potential moving objects to determine that a potential moving object is indeed a moving target. As described above, performing object motion detection and tracking on microscanned images is a faster process than standard object motion detection and tracking on regular images since the refresh rate for a single microscanned image is higher than the refresh rate of a single image frame. Thus performing object motion detection and tracking on microscanned images according to the disclosed technique enables the detection of rapid and short-lived targets as well as fast moving targets. As described above (see FIGS. 5B and 6), the spatial and temporal information derived from at least two microscan images can include information about the instantaneous angular velocity and (with at least three microscan images) the instantaneous angular acceleration of any identified moving target in block 666 as well as a movement indication of each potential moving object in the microscanned images.

Simultaneously or in parallel, in the set of procedures following second plurality of arrows 664B, microscanned images $668_1$-$662_N$ are combined into a super-resolution image 668. As mentioned above, combining microscanned images into a super-resolution image is known in the art. Super-resolution image 668 schematically represents the super-resolution image(s) formed from the microscanned images schematically shown as plurality of microscanned images $662_1$-$662_N$. Thus super-resolution image 668 represents at least one super-resolution image. In the block method shown, super-resolution image 668 is not a displayed image yet and merely represents the formed image from the microscanned images which if presented as is may include image artifacts and blurred moving objects.

The result of block 668 is a super-resolution image whereas the result of block 666 is at least one moving target indication derived from a movement analysis of the microscanned images of blocks $662_1$-$662_N$ which might include an estimate of the instantaneous angular velocity and instantaneous angular acceleration of identified moving targets even after the analysis of only two or three individual microscanned images. As shown in FIG. 12, the spatial and temporal information of block 666 and the super-resolution image of block 668 can be used for a first method, shown by arrow 670A, for displaying low resolution high frame rate super-resolution video or for a second method, shown by arrow 670B, for displaying high resolution low frame rate super-resolution video. The methods shown by arrows 670A and 670B do not need to be executed simultaneously and can be executed separately on different processor and/or displayed on different display units or generated by different display generators (not shown).

In the first method, as shown by arrow 670A, the moving target indications from block 666 are used to identify regions in super-resolution image 668 where a moving target may be present. Those regions are then bounded. When the super-resolution image is to be displayed to a user, the unbounded regions, which represent areas in the super-resolution image where there are no moving targets based on block 666, are displayed to the user based on the pixel information in super-resolution image 668 for the duration of time it takes to generate the next super-resolution image (for example, 0.33 seconds), thus showing those unbounded regions at a higher resolution compared to the native resolution of the image detector which initially captured microscanned images $662_1$-$662_N$. The unbounded regions are displayed at a standard video frame rate however they are only updated once the next super-resolution image has been generated. In the bounded regions of the super-resolution image, the low resolution microscanned images of the moving objects and targets are displayed at a standard video frame rate (for example at 0.03 seconds per microscan image), thus displaying the microscanned images as video within the bounded regions of the super-resolution image. This is shown in a block 672. The result of this type of displaying to the user is a hybrid improved super-resolution video, as shown by a block 676 having low image resolution but a high video frame rate for high frame rate targets. The super-resolution video is a hybrid since the unbounded regions (in general background portions of the video) are repeatedly displayed as still high resolution images based on the super-resolution image whereas the bounded regions are displayed as video based on the microscanned images.

According to the disclosed technique, by displaying areas of the scene of observation in which there are no moving objects as derived from the super-resolution image, a high resolution video can be played without image artifacts and without the perception that the video rate is not at a sufficiently high video rate for smooth human viewing. By displaying areas of the scene of observation in which there are moving objects as derived from microscan images, moving objects can be shown at a high video rate and also at a relatively high resolution (compared to the prior art)

since the microscan images do not need to be increased to fill the size of the viewing screen and can be shown at their native size when captured on a portion of the image detector array (not shown). Even though the resulting video of the moving object may not be completely smooth and may show the moving object with some jumps between super-resolution images, within the time it takes to generate a subsequent super-resolution image, the moving objects can be shown as smooth video. According to the disclosed technique, the number of microscan images captured which are used to generate a super-resolution image can either be stretched or squeezed to fit within the amount of time required to generate a next super-resolution image from the microscan images. Using the examples shown above in FIGS. 11B and 11C, if a super-resolution image can be shown as video at a video rate of 3 FPS and microscanned images can be shown as video at a video rate of 30 FPS, that means that for every super-resolution image shown, 10 microscan images of moving objects can be shown per super-resolution image. If the set of microscan images forming each super-resolution is indeed 10 microscan images, then the same unbounded areas of the super-resolution image are each repeatedly shown 10 times at a video rate of 30 FPS until the next super-resolution is generated whereas the bounded areas of the super-resolution image show each microscan image (showing the moving object) once, also at a video rate of 30 FPS. In the case of more than 10 microscanned images per super-resolution image, the microscanned images can be played at a video rate higher than 30 FPS (thereby squeezing them all into the time the super-resolution image is shown) such that within the time the super-resolution image is shown (for example 0.33 seconds) all the microscanned images making up the respective super-resolution image are shown. In the case of fewer than 10 microscanned images per super-resolution image, the microscanned images can be played at a video rate lower than 30 FPS, for example by showing the same microscan image twice or multiple times (and thus stretching them into the time the super-resolution image is shown), such that within the time the super-resolution image is shown (for example 0.33 seconds) all the microscanned images making up the respective super-resolution image are shown.

Blocks 672 and 676 as shown relate in general to a case where microscanned images $662_1$-$662_N$ are acquired from a single LOS position, meaning where microscanned images are not acquired in a pan and tilt system. In the case of microscanned images $662_1$-$662_N$ being acquired in a pan and tilt system (not shown), blocks 666 and 668 are performed sequentially for each set of microscanned images captured as each LOS position of the pan and tilt system. As described above pan and tilt systems can be used to generate a wide-area image or a panoramic image of a scene of observation wherein microscanned images are captured from either non-overlapping or slightly overlapping LOS positions. As an example, a pan and tilt system may have 3 pan positions and 3 tilt positions, thus resulting in a 3×3 square matrix of 9 different LOS positions from which microscanned images are acquired according to the disclosed technique, with LOS positions changing such that LOS position X is refreshed every second (i.e., each LOS position captured microscanned images for $\frac{1}{9}^{th}$ of a second). In addition, there may not be a direct correlation between the number of LOS positions of the pan and tilt system with the number of microscanned images acquired at each position. For example, a pan and tilt system having 9 different positions might acquire 16 microscanned images at each LOS position. When blocks 672 and 676 are performed for microscanned images at a first LOS position of the aforementioned pan and tilt system, the improved super-resolution video at the first LOS position might not get updated for another second until the pan and tilt system returns to the first LOS position. However there might not be sufficient data acquired from the microscanned images to display a moving object continuously from the first LOS position until the pan and tilt system returns to the first LOS position and provides refreshed information from newly acquired microscanned images.

According to the disclosed technique, as shown in blocks 680 and 682, two different methods can be used in the case of a pan and tilt system to give a user the perception of a moving object still moving within the super-resolution video shown in a given LOS position up until updated super-resolution video can be generated in the same LOS position. Blocks 680 and 682 are shown using dotted lines to indicate that these blocks are optional and might only be necessary when the method of FIG. 12 is used with a pan and tilt system (also known as a step-and-stare system). In block 680, the super-resolution video shown in the bounded moving object area is stretched out over the time a pan and tilt system cycles through its different LOS positions before returning to its initial position. Such a technique might result in the moving object appearing to jump between refreshed images and video at a given LOS position. Using the example mentioned above, assuming the pan-and-tilt system cycles through 9 different positions, if the microscanned images in blocks $662_1$-$662_N$ at each LOS position are acquired at a rate of 300 Hz (with 16 microscans per LOS position) and the pan and tilt system changes LOS position at a rate of 9 Hz (thus each second the system returns to its original LOS position since the system cycles through 9 positions each second), the 16 microscans acquired at a given LOS position can initially show video of a moving object for $\frac{1}{9}^{th}$ of a second. However the video shown at the given LOS position will appear as a still image for $\frac{8}{9}^{th}$ of a second until the pan and tilt system returns to the given LOS position. In block 680, within the bounded moving object area, the acquired microscanned images at the given LOS position are stretched out timewise to cover the entire second (i.e., 9 Hz) until the pan and tilt system returns to the given LOS position and acquires updated microscanned images. As mentioned above, even with the stretching out of the playing of the acquired microscanned images as video within the bounded moving object area, there might nonetheless be jumps in the position of the moving object when the updated microscanned images are used to display the moving object in an updated bounded moving object area.

In block 682, based on the spatial and temporal information of block 666, the position of the object shown in the bounded moving object area is extrapolated to show smooth and substantially continuous video from the time a given LOS position acquires microscanned images until the pan and tilt system returns to the given LOS position and provides updated acquired microscanned images. A filter, such as a Kalman filter, can be used regarding the extrapolation to ensure that the displayed extrapolated position of the moving object in the bounded area remains close to the actual updated position of the moving object each time the given LOS position is updated and refreshed with newly acquired microscanned images. In this block, the determined estimates of the angular velocity and angular acceleration of the moving object are used to predict and simulate the dynamic movement of the object even though there is no direct information captured regarding the position of the moving object at a given LOS position when the pan and tilt system is at the other LOS positions. Using the example above, the estimated velocity and acceleration determined for a moving object which is displayed as video in the bounded moving object area for $\frac{1}{5}^{th}$ of a second is used to extrapolate the position of the moving object over the next $\frac{4}{5}^{th}$ of a second and show continuous video of the moving object moving until updated microscan images can be displayed and until an updated estimate of the velocity and acceleration can be determined based on the updated acquired microscanned images. As mentioned above, in this approach, care needs to be taken when predicting the position of the moving object during the time the pan and tilt system is at other LOS positions, since over-extrapolation may lead to the moving object as displayed being far off its actual position in the next updated acquired microscanned images. This might also result in the moving object appearing to jump each time the pan and tilt system cycles through its LOS positions and returns to its initial position. As stated above, a Kalman filter or a similar type of numerical estimation algorithm can be used to determine how much of the extrapolation should be used when displaying the video of the moving object in the bounded moving object area so that the updated position of the moving object is not too far off the updated position of the moving object determined from the updated microscanned images when the pan and tilt system returns to the first LOS position.

In the second method, as shown by arrow 670B, the moving target indications from block 666 are used to identify regions in super-resolution image 668 where a moving target may be present. Those regions are then bounded. Based on the instantaneous velocity estimates of potential moving targets from the microscanned images, a decision can be made as to where in the super-resolution image each moving target should be placed. In general, the moving target is placed in the super-resolution image in the position it was captured in from the microscanned images, with one of the microscanned images acting as an anchoring point of where in the super-resolution image the moving target should be placed. Data and information on the moving target from the other microscanned images can then be used to generate the super-resolution image of the moving target at the position of the anchoring point. Pixel information about a moving target from each set of microscanned images can be combined together to form a corrected image of the moving target. In the bounded regions of the super-resolution image, the moving target is displayed in a single position for the duration of time it takes to construct the super-resolution image, where the moving target image is derived from a corrected combination of the microscanned images and the single position is based upon the instantaneous velocity estimates of the moving target in the microscanned images. This enables the moving target to be displayed in the super-resolution image without any image blur or image artifacts. This is shown in a block 674. In the unbounded regions, the super-resolution image can be displayed based on the microscanned images, where pixel information from the microscan images can be used to fill in regions where a moving target was identified in a given microscan image but where in the super-resolution image itself, the moving target is not displayed. This is shown more clearly below in FIG. 14. This displaying results in an improved super-resolution image having no image artifacts and no image blurring since the spatial and temporal information of each microscan image is used to position a moving target in a single position in the super-resolution image, thus correcting for image artifacts and any blurring of a moving target in the super-resolution image. Thus as shown in a block 678, corrected and improved super-resolution images as described in block 674 can be shown sequentially as video resulting in high image resolution yet low video frame rate super-resolution video. An example of blocks 674 and 678 is the surveillance approach known as WAMI (wide-area motion imagery) which is considered a type of video having a low video frame rate (usually having a refresh rate of around 1 Hz or higher). It is noted however that WAMI is merely an example of blocks 674 and 678 and that other approaches can be used to implement blocks 674 and 678.

Figure 13A:
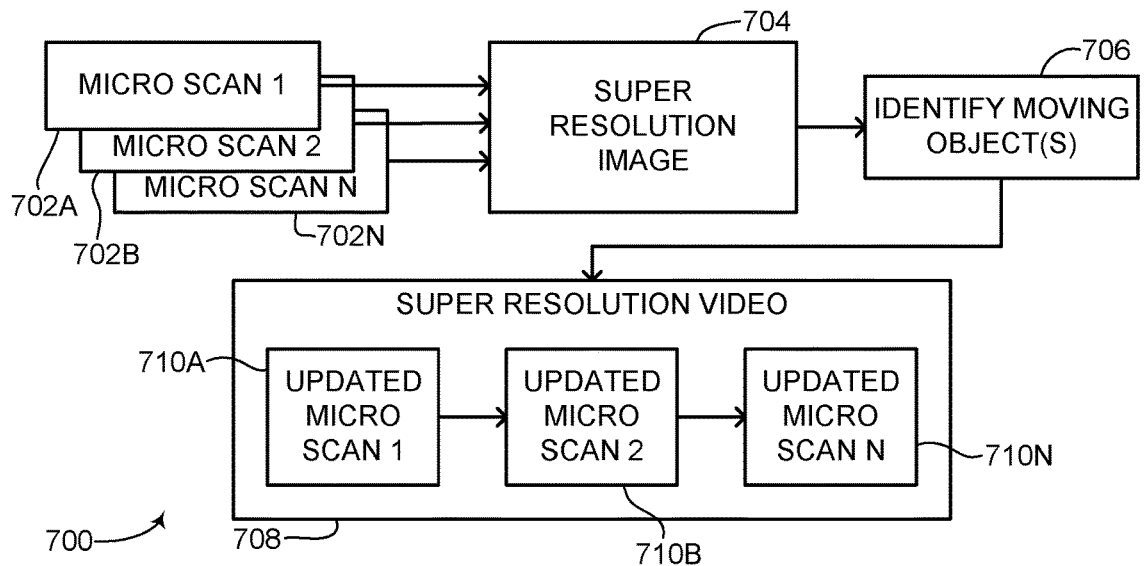
FIG. 13A is a block diagram illustration of a method for generating low image resolution high video frame rate super-resolution video from a plurality of microscanned images based on FIG. 12, constructed and operative in accordance with a further embodiment of the disclosed technique.

Reference is now made to FIG. 13A, which is a block diagram illustration of a method for generating low image resolution high video frame rate super-resolution video from a plurality of microscanned images based on FIG. 12, generally referenced 700, constructed and operative in accordance with a further embodiment of the disclosed technique. The method shown in FIG. 13A provides a solution to the tradeoffs and challenges of playing video using microscanned images described above in FIGS. 11B and 11C and enables super-resolution quality video to be played at a high (and proper for smooth human viewing) video frame rate such as 30 FPS. As shown in FIG. 13A are a plurality of microscanned images shown as blocks 702A, 702B and 702N. The captured microscanned images are formed into a super-resolution image 704. Using the disclosed technique as described above in FIG. 5B or using other image processing techniques for identifying moving objects in image frames, moving objects within the microscanned images and within the super-resolution image are identified. This is shown in a block 706. Identified moving objects in the super-resolution image are bounded by a shape, such as a box. Within the bounded shape, the microscanned images forming the super-resolution image are played consecutively as video however the area outside the bounded shape, which does not include moving objects, is shown as the super-resolution image. This is shown schematically in block 708. The super-resolution image is shown at the video rate at which super-resolution images can be generated however within the bounded area of each super-resolution image, the microscanned images are played consecutively at a much higher video rate. This is shown as a first updated microscan image 710A, a second updated microscan image 710B and so on until updated microscan image 710N. Thus within block 708, identified moving objects in microscanned images are shown at a high video rate albeit at a low resolution, however in the remainder of block 708 where no moving objects were identified the displayed image is displayed at a low video rate albeit at a high resolution (i.e., as a super-resolution image).

The embodiment shown above in FIG. 13A may have a higher overall latency due to the construction and displaying of a super-resolution image however the overall high resolution of a super-resolution image will be maintained as the video sequences of the microscan images will be displayed at their native resolution within a bounded area in the super-resolution image. It is noted that in the embodiment of FIG. 13A, moving objects within the bounded area may appear to jump between their position in the last microscanned image displayed in a video sequence for a given super-resolution image and their position in the first microscanned image displayed in the next video sequence for a subsequent super-resolution image.

Figure 13B:
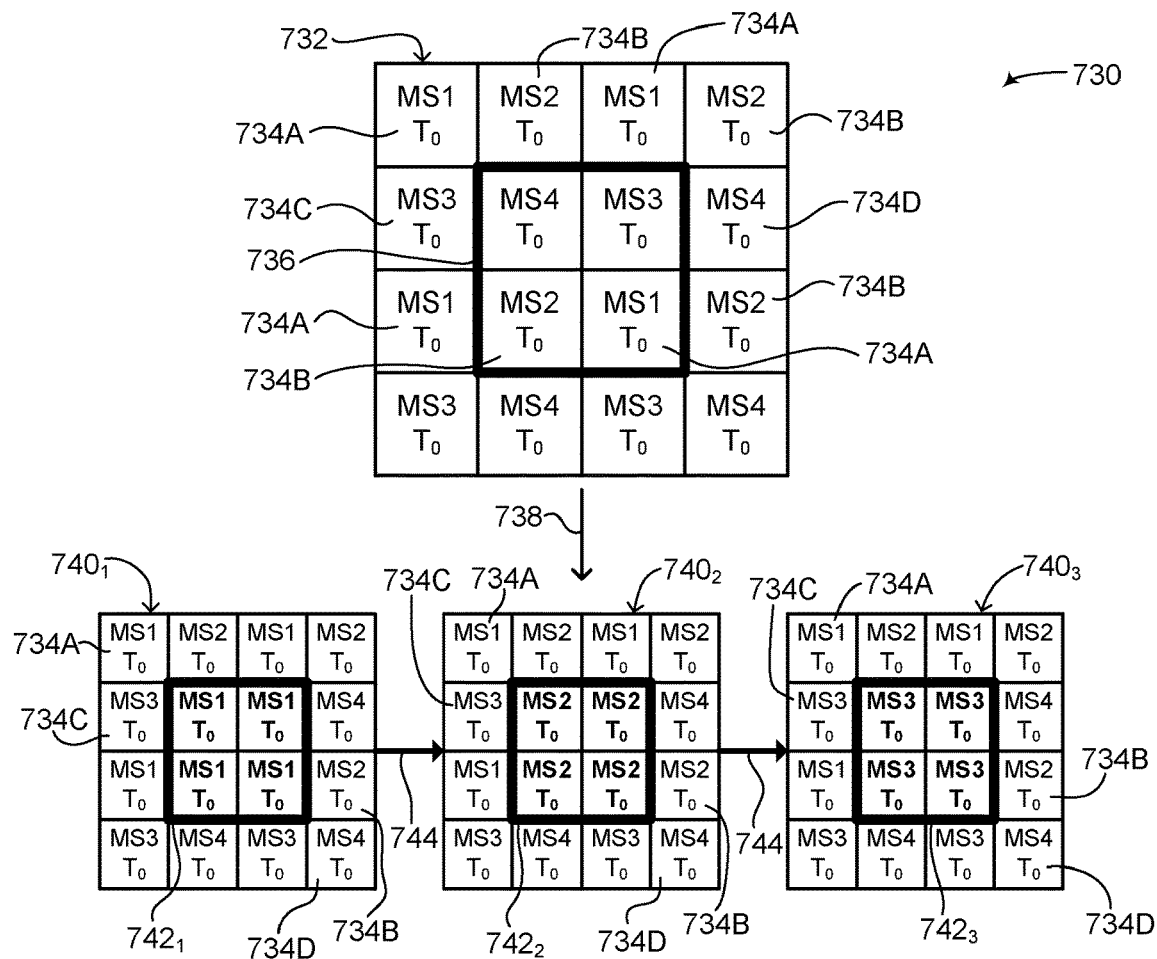
FIG. 13B is a schematic illustration showing some example image frames used in the method of FIG. 13A, constructed and operative in accordance with another embodiment of the disclosed technique.

Reference is now made to FIG. 13B, which is a schematic illustration showing some example image frames used in the method of FIG. 13A, generally referenced 730, constructed and operative in accordance with another embodiment of the disclosed technique. FIG. 13B shows a super-resolution image 732 which is comprised of a plurality of microscan images. In the example shown, four microscan images are used to generated super-resolution image 732, a first microscan image 734A (shown as MS1), a second microscan image 734B (shown as MS2), a third microscan image 734C (shown as MS3) and a fourth microscan image 734D (shown as MS4). Super-resolution image 732 is schematically shown as being made up of 16 different pixel regions as an example, with every four staggered pixel regions being filled by a different microscan image. In order to avoid clutter in FIG. 13B not every pixel region is numbered with a reference number. As shown, super-resolution image 732 is shown at a time of $T_0$. The time shown is the time at which the super-resolution image is generated and not the time at which microscan images are captured (which is at a faster rate). Super-resolution image 732 is derived as shown in blocks 702A-702N and 704 (FIG. 13A). Also shown in super-resolution image 732 is a bounded area 736 in which a moving object (not shown) has been identified, which was shown as block 706 (FIG. 13A).

Once bounded area 706 has been identified, super-resolution video of the captured images (microscan images and super-resolution images) can be displayed according to the disclosed technique. This is shown via an arrow 738 which shows three example video frames, a first video frame $740_1$, a second video frame $740_2$ and a third video frame $740_3$. The succession of video frames is shown via a plurality of arrows 744. As can be seen in this example, each video frame comprises two sections which correspond to the sections of super-resolution image 732. One section is the bounded area as designated in super-resolution image 732 and shown respectively as bounded areas $742_1$, $742_2$ and $742_3$ which each correspond to a respective one of video frames $740_1$-$740_3$. The other section is the unbounded area (not specifically referenced with a reference number). For each video frame, the unbounded area remains static and the same microscan image is shown in each pixel region for the length of time it takes to generate another super-resolution image. Thus as can be seen and as indicated, the upper left hand corner region of each video frame shows first microscan image 734A at $T_0$ and the lower right hand corner region of each video frame shows fourth microscan image 734D at $T_0$. Since this part of the super-resolution image does not include a moving object, these parts can be shown in each video frame at a video rate of 30 FPS. However in the bounded areas, each video frame shows a subsequent microscan image thereby presenting the movement of the moving object (not shown) as video at a video rate of 30 FPS. In video frame $740_1$, bounded area $742_1$ shows first microscan image 734A (MS1), in video frame $740_2$, bounded area $742_2$ shows second microscan image 734B (MS2) and in video frame $740_3$, bounded area $742_3$ shows third microscan image 734C (MS3). The microscan images will be continuously shown in the bounded area until the next set of captured microscan images have been processed into an updated super-resolution image which will then replace the unbounded areas and will be shown at a time of $T_1$. As shown in bounded area $742_1$, MS1 at $T_0$ covers four times the area of the original microscan image captured in super-resolution image 732. MS1 thus needs to be interpolated to cover a larger area in video frame $740_1$. The same is true regarding MS2 and MS3. According to the disclosed technique microscanned images such as first microscan image 734A, second microscan image 734B and third microscan image 734C can be increased in size to fill the respective areas of bounded areas $742_1$-$742_3$ using image interpolation techniques, digital zoom techniques and the like. As mentioned above, the time shown is not the time at which microscanned images are captured since the time required to generate a super-resolution image might not be equivalent to the time it takes to capture the microscanned images (for example in a pan-and-tilt system). Within a given set of microscan images played within a bounded area in a super-resolution image, smooth video of the moving object as captured by microscan images can be displayed. The spatial and temporal updates of the microscan images in the bounded area are interpolated by a user viewing the images as continuous movement (i.e., as video) while the high image resolution of a super-resolution image is maintained in the unbounded regions where there are no moving objects. Depending on how fast the moving object moves, when the super-resolution image is updated, a jump in the position of the moving object may be perceived. It is noted that in the bounded areas, the presentation of the movement of the moving object (not shown) at a video rate of 30 FPS represents a high video frame rate, however the image resolution of the moving object will be low as compared to the static images shown in the unbounded area.

Figure 14:
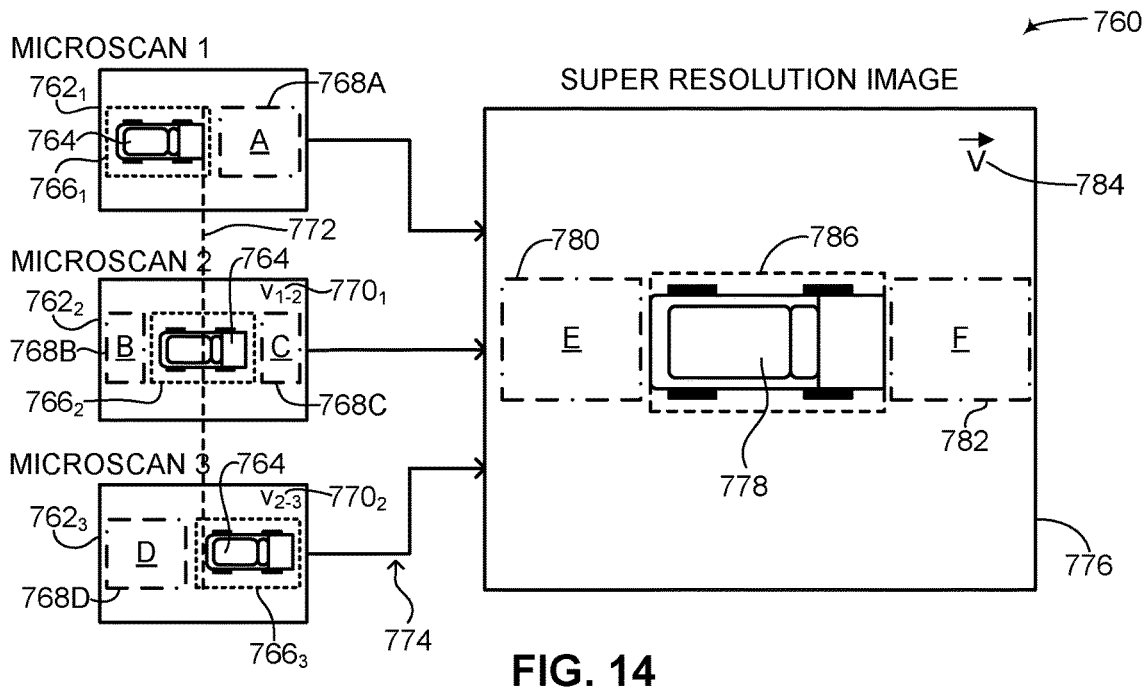
FIG. 14 is a schematic illustration showing the presentation of high image resolution low video frame rate super-resolution video using the method of FIG. 12, constructed and operative in accordance with a further embodiment of the disclosed technique.

Reference is now made to FIG. 14, which is a schematic illustration showing the presentation of high image resolution low video frame rate super-resolution video using the method of FIG. 12, generally referenced 760, constructed and operative in accordance with a further embodiment of the disclosed technique. FIG. 14 represents the method for displaying super-resolution images of the disclosed technique when there is a moving object detected in the microscan images such that the displayed super-resolution image will be shown without any image artifacts or image blurring. Updated displayed super-resolution images can be shown in sequence thereby generating super-resolution video. The main difference between the video displayed according to this method and the video displayed in the method shown as FIGS. 13A and 13B is that in this method, each video frame shows a super-resolution at a high image resolution with substantially no image artifacts and no image blurring. However each video frame will be shown as a low video frame rate, for example at 3 FPS or even lower. This is different than the method shown in FIGS. 13A and 13B where moving objects are shown with a high video frame rate however each video frame shows a low image resolution microscanned image. Shown are three microscan images, a first microscan image $762_1$ (microscan 1), a second microscan image $762_2$ (microscan 2) and a third microscan image $762_3$ (microscan 3). Each microscan image captures a moving object 764 and as can be seen, moving object 764 changes positions within each microscan image as shown by a dotted reference line 772. As mentioned above in FIG. 11B, simply constructing a super-resolution image from microscan images $762_1$-$762_3$ will result in a blurred image since moving object 764 changes position from microscan image to microscan image. In each microscan image, moving object 764 is identified and a bounded area is formed around each moving object. In first microscan image $762_1$, a bounded area $766_1$ surrounds moving object 764, in second microscan image $762_2$, a bounded area $766_2$ surrounds moving object 764 and in third microscan image $762_3$, a bounded area $766_3$ surrounds moving object 764.

A plurality of arrows 774 shows that the three shown microscan images are combined into a single super-resolution image 776 to be displayed to a user. A bounded area 786 is identified in the super-resolution image where the moving object is to be displayed. Moving object 764 is displayed as a super-resolution moving object 778. The image formed in bounded area 786 is derived from each of the images of moving object 764 in microscan images $762_1$-$762_3$ and can be achieved using image processing algorithms that utilize pixel interpolation. Thus the images of moving object 764 are corrected and combined into the image of moving object 778 which is displayed in bounded area 786. As shown in second microscan image $762_2$, an instantaneous angular velocity estimate $770_1$ ($v_{1-2}$) of moving object 764 can be made between the first two microscan images and as shown in third microscan image $762_3$, an instantaneous angular velocity estimate $770_2$ ($v_{2-3}$) of moving object 764 can be made between the second and third microscan images. Both velocity estimates $770_1$ and $770_2$ can be used to determine where in super-resolution image 776 moving object 778 should be displayed. By selecting a particular position for moving object 778 to be displayed in super-resolution image 776, moving object 778 is actually displayed as a still image derived from the different images of moving object 764 captured in microscan images $762_1$-$762_3$ along with a weighted estimate of the angular velocity of moving object 778 for the super-resolution image, shown by an arrow 784.

Super-resolution image 776 shows two bounded areas E and F, referenced as bounded areas 780 and 782. Bounded area 780 was covered by moving object 764 in microscan 1 whereas bounded area 782 was covered by moving object 764 in microscan 3. Bounded areas 780 and 782 can be filled in super-resolution image 776 by interpolating pixels from the microscan images where the moving object is not located. In the example shown, microscan 1 has a bounded area 768A, microscan 2 has two bounded areas 768B and 768C and microscan 3 has a bounded area 768D. Each of these bounded areas 768A-768D represents regions of the microscan images which include pixel information possibly not present in other microscan images due the movement of moving object 764. Once the position of moving object 778 is selected as bounded area 786 in super-resolution image 776, bounded area 780 can be filled using pixel information from bounded areas 768B and 768D whereas bounded area 782 can be filled using pixel information from bounded areas 768A and 768C. Bounded areas 780 and 782 are thus filled in by interpolating pixel information from microscan images $762_1$-$762_3$. In this respect, a super-resolution image can be constructed and displayed to a user without image artifacts and without a moving object shown as a blurred image. Such constructed super-resolution images having a high image resolution can be consecutively displayed to a user at a low video frame rate.

Figure 15A:
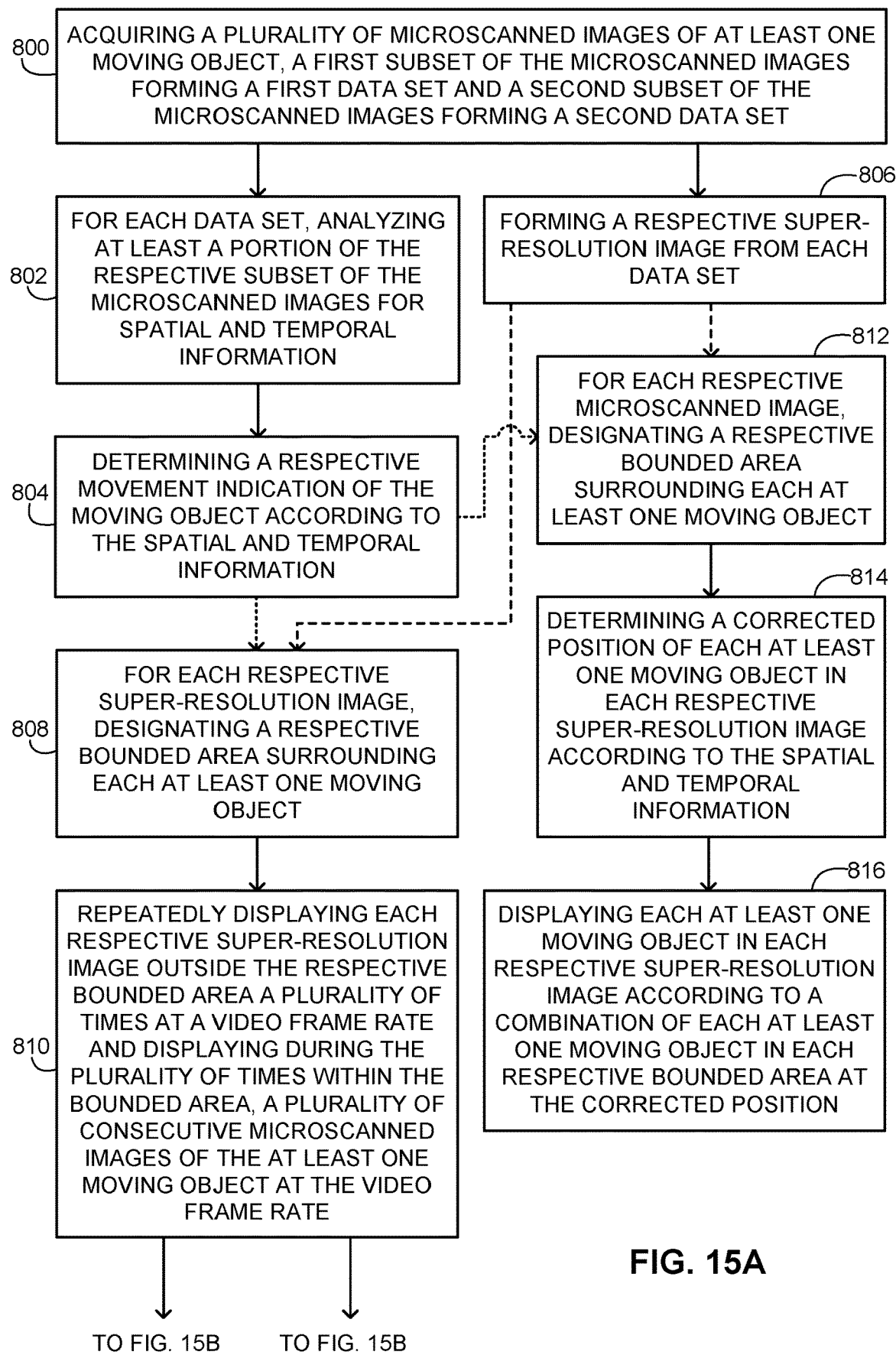
FIGS. 15A and 15B are schematic illustrations of a method for presenting and displaying enhanced motion detection and the tracking of objects using microscanned images to a user, operative in accordance with another embodiment of the disclosed technique.
Figure 15B:
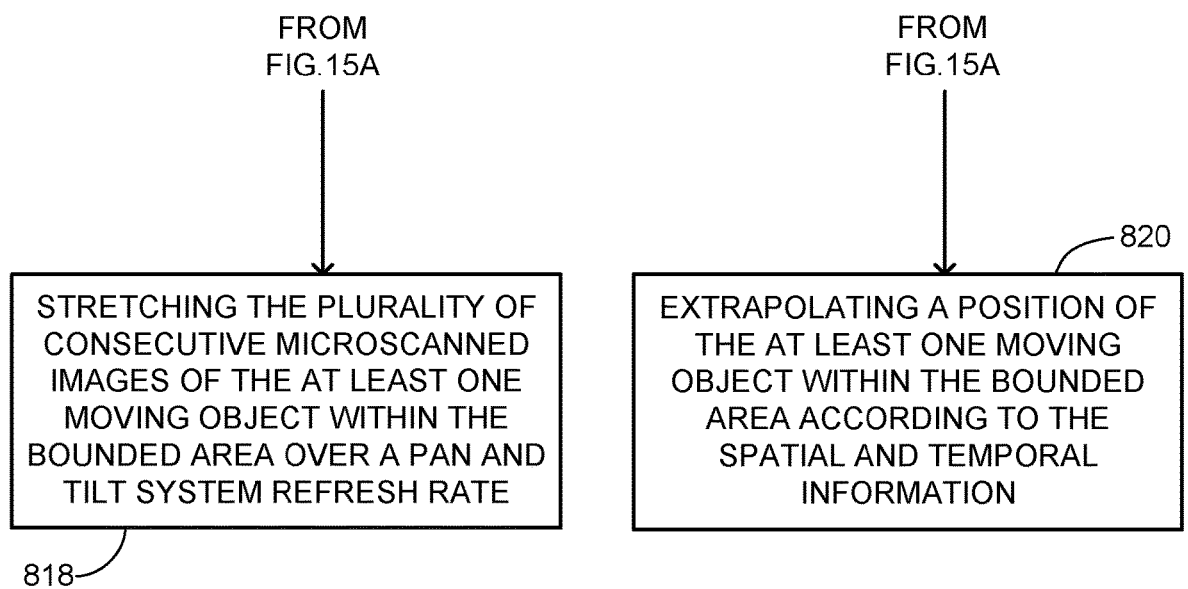

Reference is now made to FIGS. 15A and 15B, which are a schematic illustration of a method for presenting and displaying enhanced motion detection and the tracking of objects using microscanned images to a user, operative in accordance with another embodiment of the disclosed technique. FIGS. 15A-15B show a method based on the block diagrams and illustrations in FIGS. 12-14. In general, the right hand column of procedures (such as procedures 812, 814 and 816) are for displaying high image resolution in a low video frame rate super-resolution still video, thus displaying at least one moving object with no image artifacts at a selected location in super-resolution video and is substantially similar to what was shown in blocks 674 and 678 in FIG. 12. The left hand column of procedures (such as procedures 808, 810, 818 and 820) are for displaying low image resolution high video frame rate super-resolution video and is substantially similar to what was shown in blocks 672, 676, 680 and 682 in FIG. 12.

In a procedure 800, a plurality of microscanned images of at least one moving object is acquired. Procedure 800 is similar to procedure 250 (FIG. 6). A first subset of the microscanned images forms a first data set and a second subset of the microscanned images forms a second data set. The data sets are without graphic representation to a user but are nonetheless considered images. The plurality of microscanned images of the moving object can be divided into a plurality of data sets, however according to the disclosed technique, at minimum the plurality of microscanned images should be divided into two different data sets. In general, a data set represents a sufficient number of microscanned images for forming a super-resolution image frame. Thus in a typical scenario, the number of data sets is equal to the number of super-resolution image frames that can be constructed (as described below in procedure 806). In an imaging system where a detector does not pan and image a panoramic scene of observation, each data set represents the same scene of observation as acquired microscanned images. According to the disclosed technique, at minimum each data set should include at least two microscanned images from which temporal and spatial information can be extracted and which can be used to form a super-resolution image, as described below. With reference to FIG. 13A, plurality of microscanned images 702A-702N are acquired.

In a procedure 802, at least a portion of a respective subset of the microscanned images is analyzed for spatial and temporal information. Procedure 802 is similar to procedure 258 (FIG. 6). Procedure 802 is performed for each acquired data set in procedure 800. Thus in the case shown in procedure 800, procedure 802 is performed once for the first data set and once for the second data set. The spatial and temporal information derived in procedure 802 represents step a) as mentioned above regarding object detection and motion tracking in general and can be executed using known object tracking algorithms. Procedure 802 is executed on a data set representative of the acquired microscanned images. Procedure 802 is used to determine the presence of potential moving objects in the acquired microscan images and in general, each data set includes a plurality of microscanned images, thus an initial estimate of both angular velocity and angular acceleration can be determined for potentially moving objects. Spatial information which is analyzed may be the position of the moving object in each microscanned image of each data set. Temporal information of the moving object may include the instantaneous angular velocity and instantaneous angular acceleration of the moving object. With reference to FIG. 12, microscanned images $662_1$-$662_N$ are individually analyzed for spatial and temporal information, as shown by block 666. In this procedure, microscanned images $662_1$-$662_N$ are not formed into a super-resolution image but are individually analyzed as separate images for spatial and temporal information using object motion detection and tracking algorithms.

In a procedure 804, the spatial and temporal information of procedure 802 is used to determine a movement indication of the moving object. Procedure 804 is similar to procedure 260 (FIG. 6). Procedure 804 substantially represents step b) mentioned above regarding object motion detection and tracking methods, wherein an attempt is made to establish and correlate a path of movement of the potential moving objects identified in procedure 802. Procedure 804 is performed for each acquired data set. Since each acquired data set includes a plurality of microscanned images (at minimum two or three, but practically speaking many more, such as four, nine, sixteen and the like), consecutive microscanned images in each data set can be used to determine the instantaneous velocity and instantaneous acceleration of moving objects for which a movement indication is determined. In procedure 804 the movement indication of a moving object in the acquired and analyzed data sets can include an estimate of the angular velocity and angular acceleration of the moving object. With reference to FIG. 13A, moving objects within the microscanned images and within the super-resolution image are identified, as shown in block 706.

In a procedure 806, a respective super-resolution image is formed from each data set. Procedure 806 is similar to procedure 252 (FIG. 6). It is noted that in this procedure, the super-resolution image is not yet displayed to a user or viewer. As mentioned above, each data set should include at least two microscanned images. With reference to FIG. 12, microscanned images $662_1$-$662_N$ are combined into a super-resolution image 668. With reference to FIG. 13A, plurality of microscanned images 702A-702N are formed into super-resolution image 704. As shown in FIG. 15A, after procedure 800, procedures 802 and 804 can occur simultaneously or in parallel as procedure 806 is executed. In the method of FIGS. 15A-15B, after procedures 804 and 806 have been executed, the method can either progress via procedures 808, 810, 818 and 820 (as described below regarding the displaying of a hybrid super-resolution video) or via procedures 812, 814 and 816 (also as described below regarding the displaying of a super-resolution image which can be displayed as low video frame rate super-resolution video). Regardless, each of procedures 808 and 812 require both of procedures 804 and 806 to have been executed before either procedure can be executed. The different paths via which the method of FIGS. 15A-15B progresses after procedures 804 and 806 are shown by different dotted lines in FIG. 15A. Likewise, the method shown can progress with procedures 808, 810, 818 and 820 simultaneously or in parallel as the method progresses with procedures 812, 814 and 816. This might be the case when the displaying of super-resolution video according to the disclosed technique is displayed on at least two different display surfaces or on at least two different portions of a common display surface, wherein the displayed super-resolution video of procedures 808 and 810 (and optionally of procedures 818 and/or 820) is displayed on one display surface (or one portion of a single display surface) and the displayed super-resolution video of procedures 812, 814 and 816 is displayed on another display surface (or another portion of a single display surface).

In a procedure 808, for each respective super-resolution image formed in procedure 806, a respective bounded area is designated surrounding each at least one moving object based on the respective movement indication(s) of procedure 804. The bounded area may have any suitable shape for demarcating where a moving object may be in the super-resolution image. With reference to FIG. 12, the moving target indications from block 666 are used to identify regions in super-resolution image 668 where a moving target may be present. Those regions are then bounded. In a procedure 810, each respective super-resolution image is displayed to a user as follows. For areas in each respective super-resolution image outside the respective bounded areas or regions determined in procedure 808, the super-resolution image is repeatedly displayed a plurality of times at a video frame rate. For example, if a super-resolution image can be constructed within 3 FPS (frames per second) and a video frame rate of 30 FPS is desired, then areas outside the bounded areas and regions of each super-resolution image repeatedly display the same image ten times for each super-resolution image until a subsequent super-resolution can be constructed. In procedure 810, within the bounded areas or regions, a plurality of consecutive microscanned images of the at least one moving object is displayed at the video frame rate. Using the same example above, within each bounded area of a given super-resolution image, ten microscanned images of the moving object are displayed as video within the time it takes to construct another super-resolution image. In procedure 810, a hybrid super-resolution image with microscanned images played as video in the bounded areas is displayed to a user, thereby providing a super-resolution image without image artifacts while also presenting microscanned images of a moving object as video at the native pixel resolution at which the microscanned images were acquired. Thus a super-resolution background is displayed with a portion of the video showing high frame rate targets in the imaged scene of observation at low resolution. With reference to FIG. 12, when the super-resolution image is to be displayed to a user, the unbounded regions, which represent areas in the super-resolution image where there are no moving targets based on block 666, are displayed to the user based on the pixel information in super-resolution image 668 for the duration of time it takes to generate the super-resolution image (for example, 0.33 seconds), thus showing those unbounded regions at a higher resolution compared to the native resolution of the image detector which initially captured microscanned images $662_1$-$662_N$. In the bounded regions of the super-resolution image, the low resolution microscanned images of the moving objects and targets are displayed at a fast frame rate (for example at 0.03 seconds per microscan image), thus displaying the microscanned images as video within the bounded regions of the super-resolution image. This is shown in a block 672. The result of this type of displaying to the user is a hybrid improved super-resolution video, as shown by a block 676. The super-resolution video is a hybrid since the unbounded regions are displayed as low frame rate video (like still images between the frames of the low frame rate video) based on the super-resolution image whereas the bounded regions are displayed as high frame rate video based on the microscanned images. Regardless the images are displayed at a standard video frame rate except that the unbounded regions display the same super-resolution background until an updated super-resolution image is formed whereas the bounded regions display the microscanned images showing the movement of moving objects in the imaged scene. With reference to FIG. 13A, within the bounded shape, the microscanned images forming the super-resolution image are played consecutively as video however the area outside the bounded shape, which does not include moving objects, is shown like a super-resolution image. This is shown schematically in block 708. The super-resolution image is shown at the video rate at which super-resolution images can be generated however within the bounded area of each super-resolution image, the microscanned images are played consecutively at a much higher video rate.

As shown in FIG. 15A, after procedure 810, the method continues to procedures 818 and 820 which are shown in FIG. 15B. It is noted that procedures 818 and 820 are optional procedures and are relevant in the case that the method of FIGS. 15A and 15B is used in a pan and tilt system for acquiring microscanned images to form a wide-area video image and/or a panoramic video image. It is noted that procedures 818 and 820 represent different procedures for showing continuous video of a determined moving object in procedure 810 while a pan and tilt system cycles through its different LOS positions. Likewise, procedures 818 and 820 can also be executed simultaneously or in parallel and displayed on different display units or generated by different display generators (or different portions of the same display unit).

In a procedure 818, the plurality of consecutive microscanned images of the at least one moving object within the bounded area is stretched out over the refresh rate of a pan and tilt system. As mentioned above, the refresh rate of a pan and tilt system is the amount of time required for the system to pan and tilt through all its different stare positions before returning to an initial stare position. The microscanned images of the moving object within the bounded area are thus played consecutively at a video frame rate such that they cover sufficient time in the bounded area until the pan and tilt system returns to the same LOS position at which the previous microscanned images showing the moving object were acquired. With reference to FIG. 12, in block 680, within the bounded moving object area, the acquired microscanned images at the given LOS position are stretched out timewise to cover the entire second (i.e., 9 Hz) until the pan and tilt system returns to the given LOS position and acquires updated microscanned images.

In a procedure 820, a position of the at least one moving object within the bounded area is extrapolated according to the spatial and temporal information as determined in procedure 804. Within the bounded area, the movement of the moving object is extrapolated for the duration of a pan and tilt refresh rate based on the determined velocity and acceleration estimates of the moving object, thereby displaying the moving object having continuous smooth movement each time updated microscanned images are acquired at a given LOS position of the pan and tilt system. As mentioned above, a Kalman filter and the like can be used to determine how much extrapolation should be used to minimize differences in the moving object's actual position as determined from updated acquired microscanned image and as predicted according to the extrapolation of the moving object's movement based on the velocity and acceleration estimates. With reference to FIG. 12, in block 682, based on the spatial and temporal information of block 666, the position of the object shown in the bounded moving object area is extrapolated to show smooth and substantially continuous video from the time a given LOS position acquires microscanned images until the pan and tilt system returns to the given LOS position and provides updated acquired microscanned images. A filter, such as a Kalman fitler, can be used regarding the extrapolation to ensure that the displayed extrapolated position of the moving object in the bounded area remains close to the actual updated position of the moving object each time the given LOS position is updated and refreshed with newly acquired microscanned images.

Returning back to FIG. 15A, in a procedure 812, a bounded area is designated surrounding each at least one moving object based on the movement indication of procedure 804 for each microscanned image. The designation can also include bounded regions adjacent to the bounded areas surrounding each moving object. With reference to FIG. 14, in each microscan image, moving object 764 is identified and a bounded area is formed around each moving object. In first microscan image $762_1$, a bounded area $766_1$ surrounds moving object 764, in second microscan image $762_2$, a bounded area $766_2$ surrounds moving object 764 and in third microscan image $762_3$, a bounded area $766_3$ surrounds moving object 764. Microscan 1 has a bounded area 768A, microscan 2 has two bounded areas 768B and 768C and microscan 3 has a bounded area 768D. Each of these bounded areas 768A-768D represents regions of the microscan images which include pixel information possibly not present in other microscan images due the movement of moving object 764.

In a procedure 814, a corrected position of each at least one moving object in each super-resolution image is determined according to the spatial and temporal information analyzed in procedure 802. In this procedure, the respective super-resolution image of procedure 806 is still not displayed to the user or viewer. Using the spatial and temporal information about each moving object, for example based on the instantaneous velocity estimates of the moving object between each two consecutive microscanned images, a corrected position of the moving object is determined for each super-resolution image. Therefore instead of averaging the position of the moving object based on its different positions in the microscanned images and data sets forming a respective super-resolution image, or combining all the microscanned images together which would form a blurry image of the moving object, as shown above in FIG. 11B, a corrected position of the moving object is determined where it will be displayed as a still object in the super-resolution image. With reference to FIG. 14, bounded area 786 is identified in the super-resolution image where the moving object is to be displayed. Moving object 764 is displayed as a super-resolution moving object 778. The image formed in bounded area 786 is derived from each of the images of moving object 764 in microscan images $762_1$-$762_3$. Thus the images of moving object 764 are corrected and combined into the image of moving object 778 which is displayed in bounded area 786. Both velocity estimates $770_1$ and $770_2$ can be used to determine where in super-resolution image 776 moving object 778 should be displayed. By selecting a particular position for moving object 778 to be displayed in super-resolution image 776, moving object 778 is actually displayed as an image derived from the different images of moving object 764 captured in microscan images $762_1$-$762_3$ along with a weighted estimate of the velocity of moving object 778 for the super-resolution image, shown by an arrow 784.

In a procedure 816, each at least one moving object is displayed in each respective super-resolution image using the spatial and temporal information of the corrected position determined in procedure 814. In this procedure, the at least one moving object in each of the microscanned images are combined and used to display the moving object as a still object in the super-resolution image at the determined corrected position. The moving object displayed as a still object is not only displayed without image blur or image smear but also displayed at a higher resolution due to the combination of the microscanned images. According to the disclosed technique, a correction algorithm is used in procedure 816 to resample and interpolate each identified moving object in the microscanned images into the respective determined correction position for each identified moving object in the super-resolution image. The identified moving object is thus displayed in the super-resolution image using high-resolution sampling of the microscanned images thereby cancelling the blur and smear effect caused by sampling the identified moving object at different times and different positions for each microscan image.

The correction algorithm of the disclosed technique includes the following procedures. As described above in procedure 812 regarding designating a bounded area around each moving object, in a first procedure (not shown) once a moving object has been identified in a microscan image, at least two consecutive microscanned images are used to determine an estimate of the instantaneous angular velocity of the moving object and at least a third consecutive microscan image is used to determine an estimate of the instantaneous angular acceleration of the moving object. In a second procedure (not shown), a determination is made of the position of the moving object in each microscan image forming a respective super-resolution image, the determination being based upon the estimates of the instantaneous angular velocity and acceleration of the moving object. In a third procedure (not shown), based on the determined position of the moving object in each microscan image, the pixels forming each moving object in all the microscan images are resampled into the respective super-resolution image at the determined corrected position, thereby forming a higher resolution image of the moving object within the super-resolution image.

In an alternative to the methods shown and described visually in FIGS. 13A, 13B and 14, the bounded areas of identified moving objects in the microscanned images can be combined to increase the available pixel information of each identified moving object. In this embodiment, the aforementioned correction algorithm is performed for each bounded area using the position of the moving object in each microscan image. As an example, if 9 microscan images are used to form a super-resolution image, then the identified moving object is resampled 9 times as per the above mentioned correction algorithm, each iteration of the correction algorithm resampling the bounded areas of the microscanned images at each respective determined position of each identified moving object for each microscan image. In this respect, not only can the unbounded areas in the microscanned images be formed and displayed as a super-resolution image, the bounded areas as well can be formed as super-resolution images and played consecutively to show video of the identified moving object at a high image resolution as well as a high video frame rate. Thus higher resolution images of the moving object at each position in the microscanned images can be displayed taking into account all the pixel data from all the microscanned images forming a super-resolution image. The pixel data comes from the different positions of the identified moving object in the bounded area of each microscanned images and the resampling of all the microscanned images at each different position of the identified moving object.

Thus the identified moving object in each microscan image can be enhanced and displayed at super-resolution as super-resolution video. Using the position of each identified moving object determined from each microscan image, identified moving objects can be displayed at a high video frame rate while also being displayed at a high resolution (i.e., super-resolution). Thus unlike the embodiment shown in FIGS. 13A and 13B, the image resolution of moving objects in the bounded areas will be similar to the static images shown in the unbounded areas, at a high resolution. This alternative embodiment is possible due to the difference in the image capture rate of microscanned images, which can be for example around 180 Hz, versus the refresh rate of a display, which is around 30 Hz. The rapid capture rate of microscan images thus enables the captured microscan images to be used to display an identified moving object in each microscan image at super-resolution while also having sufficient time to display the identified moving object as video in the bounded areas within the super-resolution image shown in the unbounded areas. In comparison to the method mentioned above in FIG. 13B, in this alternative embodiment, instead of resampling all the microscan images into a respective super-resolution image at a single determined corrected position, all the microscan images are resampled into each position of the moving object in each microscan image, thus enabling super-resolution video for static as well as moving objects to be displayed.

Areas of the super-resolution image where the moving object could have been placed can be filled in by the pixel information of the designated bounded areas adjacent to the bounded areas surrounding each moving object as determined in procedure 812. In this respect, procedure 816 displays a super-resolution image of a moving object without any image artifacts by positioning the moving object per super-resolution image at a given corrected position within each respective super-resolution image. Displayed super-resolution images of the moving object as per procedure 816 can be displayed sequentially to displaying super-resolution video wherein the image resolution is high but the video frame rate is low. With reference to FIG. 14, by selecting a particular position for moving object 778 to be displayed in super-resolution image 776, moving object 778 is actually displayed as a still image derived from the different images of moving object 764 captured in microscan images $762_1$-$762_3$ along with a weighted estimate of the velocity of moving object 778 for the super-resolution image, shown by an arrow 784. Super-resolution image 776 shows two bounded areas E and F, referenced as bounded areas 780 and 782. Bounded area 780 was covered by moving object 764 in microscan 1 whereas bounded area 782 was covered by moving object 764 in microscan 3. Bounded areas 780 and 782 can be filled in in super-resolution image 776 by interpolating pixels from the microscan images where the moving object is not located.

The method of FIGS. 15A and 15B relates to how super-resolution images can be displayed without image artifacts when there are moving objects present in the microscan images from which the super-resolution image is constructed. The method can either present super-resolution video with a high video frame rate yet a low image resolution (as per procedures 808 and 810 and optionally procedures 818 and 820) or super-resolution video with a high image resolution yet a low video frame rate (as per procedure 812-816).

It will be appreciated by persons skilled in the art that the disclosed technique is not limited to what has been particularly shown and described hereinabove.

The invention claimed is:

1. A video display system for displaying super-resolution video of at least one moving object without image artifacts using a plurality of microscanned images, said video being displayed having a microscan image video frame rate higher than a video frame rate of super-resolution video, comprising:

an image detector, for acquiring said plurality of microscanned images of said at least one moving object;

a processor, coupled with said image detector, for designating a first subset of said plurality of microscanned images as a first data set and a second subset of said plurality of microscanned images as a second data set; and a display generator, coupled with said processor, wherein for each respective data set of said first and second data sets, said processor analyzes at least a portion of said respective subset of said plurality of microscanned images of said respective data set for spatial and temporal information;

wherein said processor determines a respective movement indication of said at least one moving object according to said spatial and temporal information;

wherein in parallel said processor forms said first subset into a respective first super-resolution image and said second subset into a respective second super-resolution image;

wherein for each respective super-resolution image of said first and second super-resolution images, said processor designates a respective bounded area surrounding said at least one moving object;

wherein said display generator repeatedly generates each said respective super-resolution image outside said respective bounded area a plurality of times at said video frame rate of super resolution video and generates during said plurality of times within said respective bounded area, a plurality of consecutive microscanned images of said at least one moving object at said microscan image video frame rate; and wherein said plurality of consecutive microscanned images of said at least one moving object is displayed at a low image resolution within said respective bounded area.

2. The video display system according to claim 1, further comprising a pan-and-tilt mechanism, coupled with said image detector, for acquiring said plurality of microscanned images of said at least one moving object at a periodic plurality of fields-of-view (FOVs), said pan-and-tilt mechanism being operated using a step-and-stare method having a periodic refresh rate lower than a refresh rate at which said plurality of microscanned images are acquired by said image detector.

3. The video display system according to claim 2, wherein said processor executes an operation selected from the list consisting of:
   stretching said plurality of consecutive microscanned images of said at least one moving object within said respective bounded area over said periodic refresh rate; and
   extrapolating a position of said at least one moving object within said respective bounded area according to said spatial and temporal information during said periodic refresh rate when said plurality of microscanned images of said at least one moving object is acquired at said periodic plurality of FOVs.

4. The video display system according to claim 1, wherein said display generator interpolates said plurality of consecutive microscanned images to fill said respective bounded area.

5. The video display system according to claim 4, wherein said display generator interpolates using a technique selected from the list consisting of:
   image interpolation techniques; and
   digital zoom techniques.

6. The video display system according to claim 1, further comprising a microscanner, coupled with said image detector, said microscanner comprising a shifting mechanism, for shifting a line-of-sight (LOS) of said image detector in a controlled manner for acquiring said plurality of microscanned images.

7. The video display system according to claim 1, further comprising a platform, said image detector being mounted on said platform, said platform experiencing vibrations thereby causing random changes in a line-of-sight (LOS) of said image detector in an uncontrolled manner for acquiring said plurality of microscanned images.

8. The video display system according to claim 1, further comprising a pan-and-tilt mechanism, coupled with said image detector, for shifting an orientation of said image detector from a first field-of-view (FOV) to a second FOV.

9. The video display system according to claim 8, wherein said pan-and-tilt mechanism can shift said orientation in at least one axis of said image detector.

10. The video display system according to claim 8, wherein said pan-and-tilt mechanism shifts said orientation of said image detector using a setup selected from the list consisting of:
    a mechanical setup; and
    an optical setup.

11. The video display system according to claim 1, further comprising a pan-and-tilt mechanism, coupled with said image detector, for shifting a line-of-sight (LOS) of said image detector in a controlled manner for acquiring said plurality of microscanned images.

12. A video display system for displaying super-resolution video of at least one moving object without image artifacts using a plurality of microscanned images, said video being displayed having a high image resolution, comprising:
    an image detector, for acquiring said plurality of microscanned images of said at least one moving object;
    a processor, coupled with said image detector, for designating a first subset of said plurality of microscanned images as a first data set and a second subset of said plurality of microscanned images as a second data set; and
    a display generator, coupled with said processor,
    wherein for each respective data set of said first and second data sets, said processor analyzes at least a portion of said respective subset of said plurality of microscanned images of said respective data set for spatial and temporal information;
    wherein said processor determines a respective movement indication of said at least one moving object according to said spatial and temporal information;
    wherein said processor combines said first subset into a respective first super-resolution image and said second subset into a respective second super-resolution image;
    wherein for each respective microscanned image of said plurality of microscanned images said processor designates a respective bounded area surrounding said at least one moving object;
    wherein said processor determines a respective corrected position of said at least one moving object in each said respective super-resolution image according to said spatial and temporal information;
    wherein said display generator generates said at least one moving object in each said respective super-resolution image according to said processor combining said at least one moving object in each said respective bounded area of each said respective microscanned image of said plurality of microscanned images at each said respective corrected position; and
    wherein said display generator generates consecutive respective super-resolution images.

13. The video display system according to claim 12, wherein said processor determines each said respective corrected position by selecting one microscanned image of said plurality of microscanned images in each said respective data set as an anchoring point in each said respective super-resolution image for displaying said at least one moving object.

14. The video display system according to claim 12, wherein said processor executes said combining using at least one image processing algorithm involving pixel interpolation.

15. The video display system according to claim 12, further comprising a pan-and-tilt mechanism, coupled with said image detector, for shifting an orientation of said image detector from a first field-of-view (FOV) to a second FOV.

16. The video display system according to claim 15, wherein said pan-and-tilt mechanism can shift said orientation in at least one axis of said image detector.

17. The video display system according to claim 15, wherein said pan-and-tilt mechanism shifts said orientation of said image detector using a setup selected from the list consisting of:
a mechanical setup; and
an optical setup.

18. A video display system for displaying super-resolution video of at least one moving object without image artifacts using a plurality of microscanned images, said video being displayed having a high image resolution, comprising:
an image detector, for acquiring said plurality of microscanned images of said at least one moving object;
a processor, coupled with said image detector, for designating a first subset of said plurality of microscanned images as a first data set and a second subset of said plurality of microscanned images as a second data set; and
a display generator, coupled with said processor,
wherein for each respective data set of said first and second data sets, said processor analyzes at least a portion of said respective subset of said plurality of microscanned images of said respective data set for spatial and temporal information;
wherein said processor determines a respective movement indication of said at least one moving object according to said spatial and temporal information;
wherein said processor combines said first subset into a respective first super-resolution image and said second subset into a respective second super-resolution image;
wherein for each respective microscanned image of said plurality of microscanned images said processor designates a respective bounded area surrounding said at least one moving object;
wherein for each said respective data set, said processor determines a position of said at least one moving object in each said respective microscanned image of said plurality of microscanned images according to said spatial and temporal information;
wherein said processor resamples each said respective bounded area using each said determined respective position of said at least one moving object; and
wherein said display generator generates said at least one moving object in each said respective super-resolution image according to said processor resampling each said respective bounded area of each said respective microscanned image of said plurality of microscanned images at each said determined respective position.

19. The video display system according to claim 18, further comprising a pan-and-tilt mechanism, coupled with said image detector, for shifting an orientation of said image detector from a first field-of-view (FOV) to a second FOV.

20. The video display system according to claim 19, wherein said pan-and-tilt mechanism can shift said orientation in at least one axis of said image detector.

21. The video display system according to claim 19, wherein said pan-and-tilt mechanism shifts said orientation of said image detector using a setup selected from the list consisting of:
a mechanical setup; and
an optical setup.

* * * * *